United States Patent [19]
Rolchigo et al.

[11] Patent Number: 5,707,517
[45] Date of Patent: Jan. 13, 1998

[54] IMMERSIBLE ROTARY DISC FILTRATION DEVICE

[75] Inventors: Philip M. Rolchigo, Warren; Leonard T. Hodgins, Closter; Chang W. Jen, Piscataway; Malcolm R. Kahn, Franklin Lakes; Guanghua Yu, Rockaway, all of N.J.

[73] Assignee: Membrex, Inc., Fairfield, N.J.

[21] Appl. No.: 562,817

[22] Filed: Nov. 27, 1995

[51] Int. Cl.⁶ .................................................. B01D 33/15
[52] U.S. Cl. .................... 210/232; 210/321.67; 210/324; 210/330; 210/332
[58] Field of Search ................... 210/232, 321.64, 210/321.67, 330, 331, 332, 334, 97, 98, 110

[56] References Cited

U.S. PATENT DOCUMENTS

| | | |
|---|---|---|
| 1,762,560 | 6/1930 | Morton . |
| 3,455,821 | 7/1969 | Aremaa et al. . |
| 3,477,575 | 11/1969 | Nemec et al. . |
| 3,884,813 | 5/1975 | Donovan et al. . |
| 4,025,425 | 5/1977 | Croopnick et al. . |
| 4,066,546 | 1/1978 | Sasaki . |
| 4,132,649 | 1/1979 | Croopnick et al. . |
| 4,216,094 | 8/1980 | Solum . |
| 4,311,589 | 1/1982 | Brumfield . |
| 4,330,405 | 5/1982 | Davis et al. . |
| 4,376,049 | 3/1983 | Valentine . |
| 4,592,848 | 6/1986 | Pabst . |
| 4,708,797 | 11/1987 | Baur et al. . |
| 4,717,485 | 1/1988 | Brunsell et al. . |
| 4,781,835 | 11/1988 | Bahr et al. . |
| 4,790,942 | 12/1988 | Shmidt et al. . |
| 4,867,878 | 9/1989 | Rashev . |
| 4,876,013 | 10/1989 | Shmidt et al. . |
| 4,906,379 | 3/1990 | Hodgins et al. . |
| 4,911,847 | 3/1990 | Shmidt et al. . |
| 4,950,403 | 8/1990 | Hauff et al. . |
| 5,000,848 | 3/1991 | Hodgins et al. . |
| 5,143,630 | 9/1992 | Rolchigo . |
| 5,254,250 | 10/1993 | Rolchigo et al. . |

FOREIGN PATENT DOCUMENTS

| | | |
|---|---|---|
| 258313 | 11/1967 | Austria . |
| 0 226 659 | 7/1987 | European Pat. Off. . |
| 0 227 084 | 7/1987 | European Pat. Off. . |

(List continued on next page.)

OTHER PUBLICATIONS

Aqua Technology Resource Management, Inc., "How to Keep Your Fluid Processing Budget from Going to Waste," 3–page brochure.

(List continued on next page.)

*Primary Examiner*—David A. Reifsnyder
*Attorney, Agent, or Firm*—Bryan Cave LLP

[57] ABSTRACT

Rotary disc filtration devices and filtration processes using those devices are disclosed. The devices have one or more fluid filtration gaps into which fluid to be filtered into permeate and retentate is placed. Each fluid filtration gap is defined by a disc and a filter, one of which rotates with respect to the other. The filter is carried on a filter member. The discs and interleaved filter members may be suspended from the top of the device, the top may rest on a vessel containing the fluid to be filtered, the discs may be attached to a single shaft for rotation, and the filter members may be suspended from a sleeve around the shaft, which sleeve keeps the filters centered with respect to the discs. Removal of the device's top removes the discs and filter members together, facilitating maintenance. Each filter member may have a peripheral lip and the lips of adjacent filter members may be sufficiently close to one another to substantially restrict the flow of retentate out of the fluid filtration gap. Retentate flowing out of each fluid filtration gap may be directed into the vessel to counteract the tendency of the fluid in the vessel to rotate in the same direction as the discs are rotated, or the retentate may be recycled directly to the fluid filtration gaps. The liquid level in the vessel may be held constant using a dual-pipe system and three-head peristaltic pump.

108 Claims, 16 Drawing Sheets

FOREIGN PATENT DOCUMENTS

| | | |
|---|---|---|
| 0 304 833 | 3/1989 | European Pat. Off. . |
| 0 324 865 | 7/1989 | European Pat. Off. . |
| 0 338 433 | 10/1989 | European Pat. Off. . |
| 0 443 469 | 8/1991 | European Pat. Off. . |
| 0 532 237 | 3/1993 | European Pat. Off. . |
| 343 144 | 10/1921 | Germany . |
| 1057015 | 2/1967 | United Kingdom . |
| WO 93/12859 | 7/1993 | WIPO . |

OTHER PUBLICATIONS

Aqua Technology Resource Managment, Inc., 4–page brochure (untitled) discussing "Technology Background," Overcoming Concentration Polarization, etc.

Fodor, "Mechanical Seals: Design Solutions for Trouble Free Sterile Applications," *Bioprocess Engineering Symposium*, The American Society of Mechanical Engineers (1990), pp. 89–98.

Ingersoll–Rand, "Upgrade your entire filtering and/or washing operation with the new Artisan Dynamic Thickener/Washer," Bulletin No. 4081, 4 pages (Feb. 1986).

Ingersoll–Rand, "Patented filter/wash capability permits simultaneous washing and filtering," Bulletin No. 4060, 4 pages (Aug. 1983).

Lebeck, *Principles and Design of Mechanical Face Seals*, pp. 17–20, 107, 146 (John Wiley & Sons, Inc. 1991).

Molga and Wronski, "Dynamic Filtration in Obtaining of High Purity Materials—Modelling of the Washing Process," *Proceedings of the Royal Flemish Society of Engineers*, Antwerp, Belgium, Oct. 1988, vol. 4, pp. 69–77.

Murkes and Carlsson, *Crossflow Filtration—Theory and Practice*, pp. 69–99, John Wiley & Sons, New York (1988).

Parkinson, "Novel Separator Makes Its Debut," *Chemical Engineering* (Jan. 1989), 1–page reprint by Aqua Technology Resource Management, Inc.

Rudniak and Wronski, "Dynamic Microfiltration in Biotechnology," *Proceedings 1st Event: Bioprocess Engineering*, Institute of Chemical and Process Engineering, Warsaw University of Technology, Warsaw, Poland, Jun. 26–30, 1989.

Schweigler and Stahl, "High Performance Disc Filter for Dewatering Mineral Slurries," *Filtration and Separation*, Jan./Feb., pp. 38–41 (1990).

Shirato, Murase, Yamazaki, Iwata, and Inayoshi, "Patterns of Flow in a Filter Chamber during Dynamic Filtration with a Grooved Disk," *International Chem. Eng.*, vol. 27, pp. 304–310 (1987).

Snowman, "Sealing Technology in Lyophilizers," in *Bioprocess Engineering Symposium*, The American Society of Mechanical Engineers (1989), pp. 81–86.

Todhunter, "Improving the Life Expectancy of Mechanical Seals in Aseptic Service," *Bioprocess Engineering Symposium*, The American Society of Mechanical Engineers (1989), pp. 97–103.

Watabe, "Experiments on the Fluid Friction of a Rotating Disc with Blades," *Bulletin of JSME*, vol. 5, No. 17, pp. 49–57 (1962).

Wisniewski, "Anticipated Effects of Seal Interface Operating Conditions on Biological Materials," *Bioprocess Engineering Symposium*, The American Society of Mechanical Engineers (1989), pp. 87–96.

Wronski, "Filtracja dynamiczna roztworow polimerow," *Inz. i Ap. Chem.*, No. 1, pp. 7–10 (1983).

Wronski, Molga, and Rudniak, "Dynamic Filtration in Biotechnology," *Bioprocess Engineering*, vol. 4, pp. 99–104 (1989).

Wronski and Mroz, "Power Consumption in Dynamic Disc Filters," *Filtration & Separation*, Nov./Dec., pp. 397–399 (1984).

Wronski and Mroz, "Problems of Dynamic Filtration," *Reports of the Institute of Chemical Engineering*, Warsaw Techn. Univ., T.XI, z.3–4, pp. 71–91 (1982).

Wronski, Rudniak, and Molga, "Resistance Model for High–Shear Dynamic Microfiltration," *Filtration & Separation*, Nov./Dec., pp. 418–420 (1989).

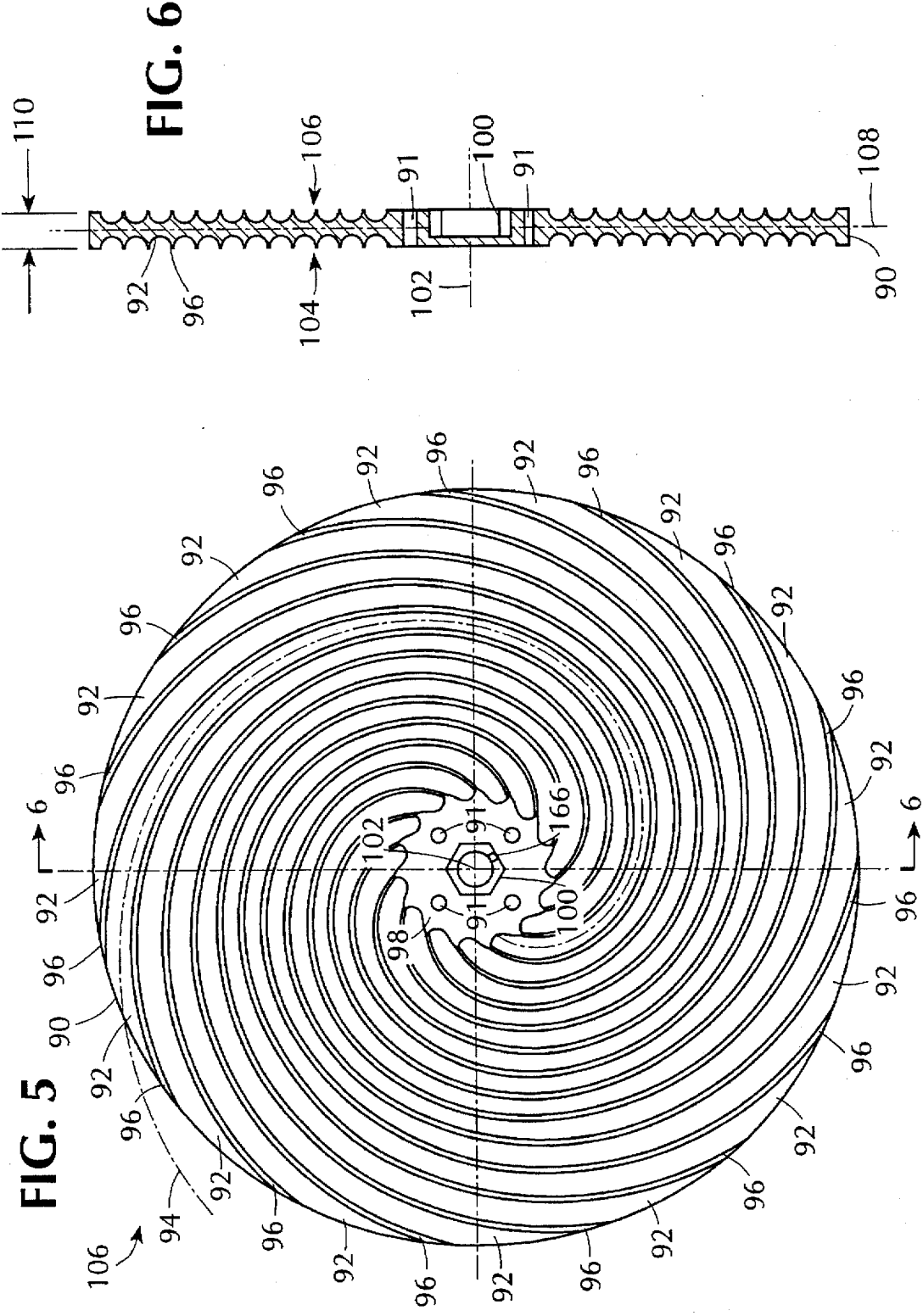

FIG. 18
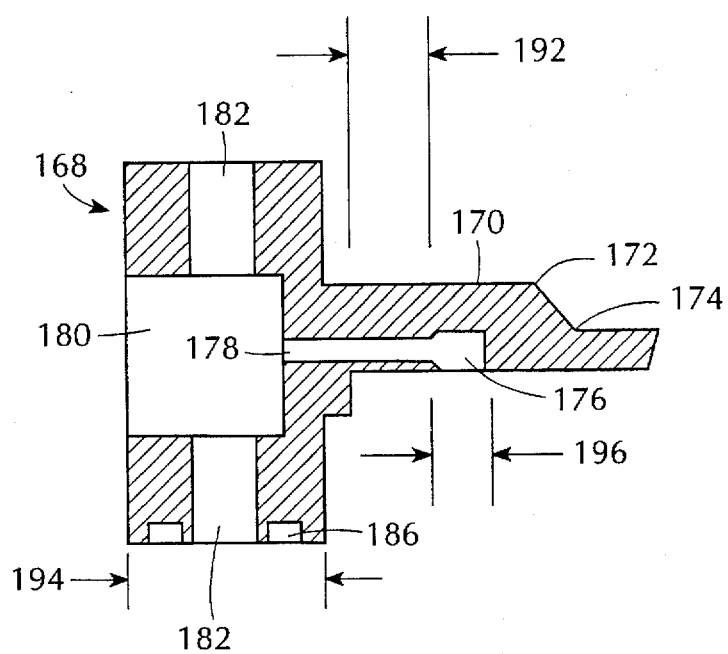
FIG. 19
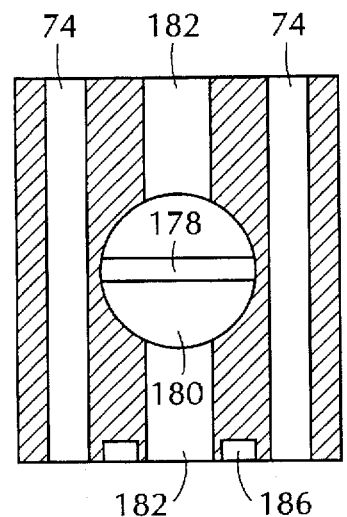
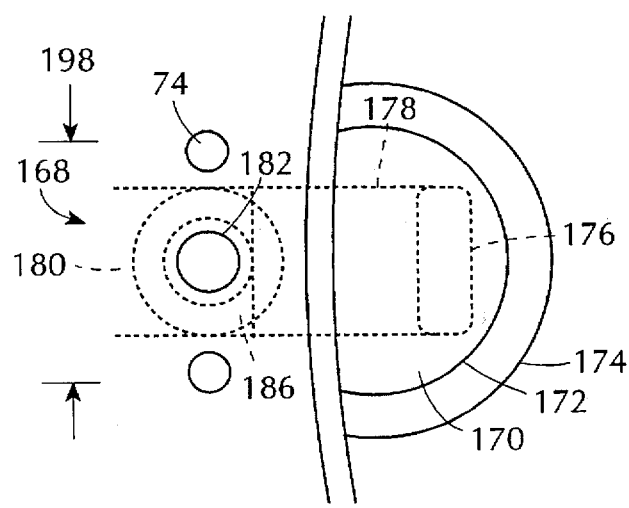
FIG. 20
FIG. 21
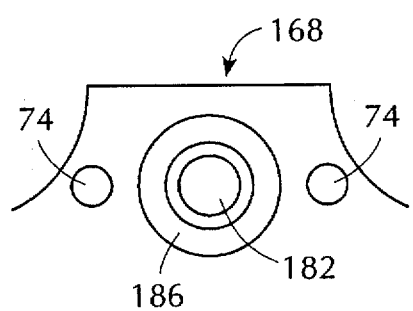

IMMERSIBLE ROTARY DISC FILTRATION DEVICE

BACKGROUND OF THE INVENTION

1. Technical Field

This invention concerns the field of filtration and more specifically, rotary disc filtration devices.

2. Background Art

Filtration devices are used to separate one or more components of a fluid from other components. Common processes carried out in such devices include classic filtration, microfiltration, ultrafiltration, reverse osmosis, dialysis, electrodialysis, pervaporation, water splitting, sieving, affinity separation, affinity purification, affinity sorption, chromatography, gel filtration, and bacteriological filtration. As used herein, the term "filtration" includes all of those separation processes as well as any other processes using a filter that separate one or more components of a fluid from the other components of the fluid.

Filtration processes make use of the greater filter permeability of some fluid components than others. As used herein, the term "filter" includes any article made of any material that allows one or more components of a fluid to pass through it to separate those components from other components of the fluid. Thus, the term "filter" includes metallic and polymeric cloth filters, semipermeable membranes and inorganic sieve materials (e.g., zeolites, ceramics). A filter may have any shape or form, for example, woven or non-woven fabrics, fibers, membranes, sieves, sheets, films, and combinations thereof.

The components of the fluid that pass through the filter comprise the "permeate" and those that do not pass (i.e., are rejected by the filter or are held by the filter) comprise the "retentate." The valuable fraction from the filtration process may be the retentate or the permeate or in some cases both may be valuable.

A common technical problem in all filtration devices is blinding or clogging of the filter. Permeate passing through the filter from the fluid layer adjacent to the feed side of the filter leaves a retentate layer adjacent to or on that side of the filter having a different composition than that of the bulk feed fluid. This material may bind to the filter and clog its pores (that is, foul the filter) or remain as a stagnant boundary layer, either of which hinders transport of the components trying to pass through the filter to the permeate product side of the filter. In other words, mass transport per unit area through the filter per unit time (i.e., flux) is reduced and the inherent sieving capability of the filter is adversely affected.

Generally, fouling of the filter is chemical in nature, involving chemisorption of substances in the feed fluid onto the filter's internal (pore) and external surface area. Unless the chemical properties of the filter surface are altered to prevent or reduce adsorption, frequent and costly filter replacement or cleaning operations are necessary.

One of the most common causes of fouling arises from the low surface energy (e.g., hydrophobic nature) of many filters. U.S. Pat. Nos. 4,906,379 and 5,000,848, which are assigned to Membrex, Inc., assignee of the present application, disclose chemical modification to increase the surface free energy (e.g., hydrophilicity) of filter surfaces. (All of the documents identified, discussed, or otherwise referenced in this application are incorporated herein in their entirety for all purposes.) In general, however, relatively little attention has been given to modifying surface chemistry to reduce filter fouling.

In contrast to the chemical nature of most fouling problems, the formation of a boundary layer near the surface of the filter is physical in nature, arising from an imbalance in the mass transfer of feed fluid components towards the filter surface as compared to the back-transfer from the boundary layer to the bulk feed fluid. Some form of force (for example, mechanical, electro-kinetic) must be used to promote the desired mass transfer away from the filter surface. Unfortunately, few strategies have been developed that promote adequate back-mixing to reduce the boundary layer or prevent its formation.

The most common strategy is called "cross-flow" filtration ("CFF") or "tangential flow" filtration ("TFF"). In principle, the feed fluid is pumped across (i.e., parallel to) the outer surface of the filter at a velocity high enough to disrupt and back-mix the boundary layer. In practice, however, cross-flow has several disadvantages. For example, equipment must be designed to handle the higher flow rates that are required, and such higher flow rates generally require recirculating retentate. However, recirculation can injure certain materials that may be present in the fluid (e.g., cells, proteins) and make them unsuitable for further use (e.g., testing).

A different approach to eliminating the stagnant boundary layer involves decoupling the feed flow rate from the applied pressure. With this approach, a structural element of the filtration device, rather than the feed fluid, is moved to effect back-mixing and reduction of the boundary layer. The moving body may be the filter itself or a body located near the filter element.

Some of the rare moving-body devices that have enhanced filtration without energy inefficient turbulence are exemplified in U.S. Pat. No. 4,790,942, U.S. Pat. No. 4,876,013, and U.S. Pat. No. 4,911,847 (assigned to Membrex, Inc.). These three patents each disclose the use of filtration apparatus comprising outer and inner cylindrical bodies defining an annular gap for receiving a feed fluid. The surface of at least one of the bodies defining the gap is the surface of a filter, and one or both of the bodies may be rotated. Induced rotational flow between these cylinders is an example of unstable fluid stratification caused by centrifugal forces. The onset of this instability can be expressed with the aid of a characteristic number known as the Taylor number. Above a certain value of the Taylor number, a vortical flow profile comprising so-called Taylor vortices appears. This type of secondary flow causes highly efficient non-turbulent shear at the filter surface(s) that reduces the stagnant boundary layer thickness and, thus, increases the permeate flux.

In contrast to classic cross-flow filtration, the devices of U.S. Pat. No. 4,790,942, U.S. Pat. No. 4,876,013, and U.S. Pat. No. 4,911,847 allow the shear rate near the filtration surface and the transmembrane pressure to be independently controlled. Furthermore, because those two operating parameters are independent and high feed rates are not required to improve the permeate flux, the feed rate can be adjusted to avoid non-uniform transmembrane pressure distributions. Accordingly, mechanically agitated systems of this type enable precise control over the separation.

Rotary disc filtration devices also allow shear rate near the filtration surface and transmembrane pressure to be independently controlled. In such devices feed fluid is placed between the disc and oppositely disposed filtration surface that define the fluid filtration gap and one or both of the disc and filtration surface are rotated. See, e.g., U.S. Pat. Nos. 5,143,630 and 5,254,250 (both assigned to Membrex, Inc.).

Additional documents concerning rotary discs, filtration, rotary disc filtration devices, other filtration devices using mechanical agitation, and seals include: U.S. Pat. No. 1,762, 560; U.S. Pat. No. 3,455,821; U.S. Pat. No. 3,477,575; U.S. Pat. No. 3,884,813; U.S. Pat. No. 4,025,425; U.S. Pat. No. 4,066,546; U.S. Pat. No. 4,132,649; U.S. Pat. No. 4,216,094; U.S. Pat. No. 4,330,405; U.S. Pat. No. 4,376,049; U.S. Pat. No. 4,708,797; U.S. Pat. No. 4,717,485; U.S. Pat. No. 4,781,835; U.S. Pat. No. 4,867,878; U.S. Pat. No. 4,950,403; Austrian Patentschrift 258313; European Published Application Nos. 0 226 659, 0 227 084, 0 304 833, 0 324 865, 0 338 433, 0 443 469, and 0 532 237; German Patentschrift 343 144; PCT Published Application WO 93/12859; U.K. 1,057,015; Aqua Technology Resource Management, Inc., "How to Keep Your Fluid Processing Budget from Going to Waste," 3-page brochure; Aqua Technology Resource Management, Inc., 4-page brochure (untitled) discussing "Technology Background," "Overcoming Concentration Polarization," etc.; Fodor, "Mechanical Seals: Design Solutions for Trouble Free Sterile Applications," *Bioprocess Engineering Symposium*, The American Society of Mechanical Engineers (1990), pages 89–98; Ingersoll-Rand, "Upgrade your entire filtering and/or washing operation with the new Artisan Dynamic Thickener/Washer," Bulletin No. 4081, 4 pages (2/86); Ingersoll-Rand, "Patented filter/wash capability permits simultaneous washing and filtering," Bulletin No. 4060, 4 pages (8/83); Lebeck, *Principles and Design of Mechanical Face Seals*, pages 17–20, 107, 146 (John Wiley & Sons, Inc. 1991); Molga and Wronski, "Dynamic Filtration in Obtaining of High Purity Materials—Modelling of the Washing Process," *Proceedings of the Royal Flemish Society of Engineers*, Antwerp, Belgium, October 1988, Volume 4, pages 69–77; Murkes and Carlsson, *Crossflow Filtration—Theory and Practice*, pages 69–99, John Wiley & Sons, N.Y. (1988); Parkinson, "Novel Separator Makes Its Debut," *Chemical Engineering* (January 1989), 1-page reprint by Aqua Technology Resource Management, Inc.; Rudniak and Wronski, "Dynamic Microfiltration in Biotechnology," *Proceedings 1st Event: Bioprocess Engineering*, Institute of Chemical and Process Engineering, Warsaw University of Technology, Warsaw, Poland, Jun. 26–30, 1989; Schweigler and Stahl, "High Performance Disc Filter for Dewatering Mineral Slurries," *Filtration and Separation*, January/February, pages 38–41 (1990); Shirato, Murase, Yamazaki, Iwata, and Inayoshi, "Patterns of Flow in a Filter Chamber during Dynamic Filtration with a Grooved Disk," *International Chem. Eng.*, Volume 27, pages 304–310 (1987); Showman, "Sealing Technology in Lyophilizers," in *Bioprocess Engineering Symposium*, The American Society of Mechanical Engineers (1989), pages 81–86; Todhunter, "Improving the Life Expectancy of Mechanical Seals in Aseptic Service," *Bioprocess Engineering Symposium*, The American Society of Mechanical Engineers (1989), pages 97–103; Watabe, "Experiments on the Fluid Friction of a Rotating Disc with Blades," *Bulletin of JSME*, Volume 5, number 17, pages 49–57 (1962); Wisniewski, "Anticipated Effects of Seal Interface Operating Conditions on Biological Materials," *Bioprocess Engineering Symposium*, The American Society of Mechanical Engineers (1989), pages 87–96; Wronski, "Filtracja dynamiczna roztworow polimerow," *Inz. i Ap. Chem.*, number 1, pages 7–10 (1983); Wronski, Molga, and Rudniak, "Dynamic Filtration in Biotechnology," *Bioprocess Engineering*, Volume 4, pages 99–104 (1989); Wronski and Mroz, "Power Consumption in Dynamic Disc Filters," *Filtration & Separation*, November/December, pages 397–399 (1984); Wronski and Mroz, "Problems of Dynamic Filtration," *Reports of the Institute of Chemical Engineering*, Warsaw Techn. Univ., T.XI, z.3–4, pages 71–91 (1982); and Wronski, Rudniak, and Molga, "Resistance Model for High-Shear Dynamic Microfiltration," *Filtration & Separation*, November/December, pages 418–420 (1989).

Conventional rotating disc filter devices utilize stacked filter disc arrangements. Historically, most of these devices comprise disc filters that are rotated by a central drive shaft to which the filter elements are attached. Some rotating disc devices utilize stationary filter discs separated from each other by rotary elements attached to the shaft. Murkes and Carlsson, *Crossflow Filtration—Theory and Practice*, John Wiley & Sons, New York (1988), FIG. 3.15 at page 91. In this type of device a unitary stationary filter element surrounds the central rotating drive shaft. Accordingly, to change filters requires disassembly of the device followed by sequential removal of rotors and filters from the stacked array. For example, to remove the nth filter requires removing n−1 rotors and filters. This obviously is a disadvantage of such a design because of the labor and downtime involved.

On the other hand, devices in which the filter-holding means is an integral part of the segmented vessel housing (e.g., containment vessel wall) also have drawbacks. See, e.g., Murkes and Carlsson, above, FIGS. 3.11 to 3.14 (pages 87–90). As in the previous case, to change the nth filter requires removal of n−1 segments as well as rotors. Also, scale-up is limited by engineering tolerances. Furthermore, adding more segments to increase the capacity of the device requires additional seals, thereby increasing the risk of device failure. Moreover, the segmented vessel must be designed to withstand the necessary pressure to drive the filtration. There are however some rotary disc filtration devices in which the filter unit is segmented to permit removal of filter units without disassembling the entire device. See, e.g., U.S. Pat. Nos. 5,143,630 and 5,254,250.

The effectiveness of rotating disc filtration devices depends in large part upon the flowpaths of the feed, retentate, and permeate fluids. Means to overcome the potential for buildup of rejected species caused by flowpath limitations may involve changing either the rotating disc design (e.g., adding blades or grooves), or changing the feed pathways, or both. Such pathways may involve hollow rotating shafts having ports (or nozzles) to direct the feed to either or both sides of the filter members.

Fluid leaving the fluid filtration gap that does not pass through the filter (i.e., the retentate) typically has rotational energy that has been imparted by the rotating disc or filter. This energy can cause fluid in the filtration vessel outside of the fluid filtration gap to move (e.g., swirl) and interfere with the desired flow patterns in the vessel. Such moving liquid may also entrain gas, which may then interfere with filtration if that gas is carried back into the fluid filtration gap.

In conventional disc filters where either the permeate or the feed fluid is routed within the rotating shaft, seals must be provided to keep permeate from mixing with feed fluid. Seals can have no moving parts (stationary seals) or can have moving parts (mechanical seals, e.g., dynamic seals). Some types can act as either stationary or mechanical seals (for example, O-rings and face seals).

Mechanical seals typically exhibit at least some leakage and must be replaced at regular intervals. See the Lebeck, Wisniewski, Todhunter, Fodor, and Snowman documents cited above. Alternatively, fluidic magnetic seals, which have zero leakage, tolerate only small pressure differences and the ferro fluid used in the seal must be compatible with the process fluid. See the Lebeck document cited above. Accordingly, it is desirable to avoid such seals for separating permeate and feed fluid.

Despite all the development work concerning rotary disc filtration devices, the need still exists for rotary disc filtration devices that are relatively simpler and less expensive to manufacture (e.g., because of simpler design and fewer parts requiring manufacture to high tolerances); that are relatively simpler and less expensive to maintain (e.g., because of simpler design); that are relatively simpler and quicker to assemble and disassemble (e.g., for initial production and maintenance); that need not use mechanical seals or that can use low-cost seals (because the seal is not wetted by process fluid, e.g., because the liquid level is below the place the seal is or would otherwise be); that can operate at relatively high transmembrane pressure without requiring pressure vessels; that can reduce or eliminate undesirable flow patterns in the vessel caused by retentate leaving the fluid filtration gap; that are multi-functional, allowing filtration with concomitant flotation and/or settling (which is useful if the feed fluid contains solids, such as metal particles, e.g., in a system for cleaning machined parts where the cleaner is to be separated from the dirt and grease and recycled); that do not need additional equipment (e.g., a pump) to pump feed fluid into the fluid filtration gap; that allow simplified and accurate control of the liquid level in the body of fluid to be filtered; and that have some or all of these features and advantages and that can be used in many different ways, for example, for in situ processing (e.g., for sampling or producing a stream for testing).

SUMMARY OF THE INVENTION

A device that has these features and provides those and other advantages that will be apparent to those skilled in the art has now been developed.

Broadly, in one aspect this invention concerns a rotary disc filtration device for filtering fluid from a body of fluid having an uppermost fluid level into permeate and retentate, the device comprising:

(a) a first member;

(b) one or more discs, each disc being suspended from the first member;

(c) one or more filter members, at least one filter member having a filter, each filter being oppositely disposed to a disc to define a fluid filtration gap therebetween in which gap the fluid to be filtered is placed during filtration, there being one or more fluid filtration gaps, fluid passing through each filter from a fluid filtration gap being the permeate and fluid not passing from a fluid filtration gap through a filter being the retentate, each filter member being suspended from the first member;

(d) rotating means for rotating at least one of each disc and filter defining a fluid filtration gap with respect to each other; and (e) rotatable suspension means for suspending from the first member the one or more discs or filter members so that at least one of each disc and filter defining a fluid filtration gap can rotate with respect to each other, the rotatable suspension means being above the uppermost fluid level of the body of fluid to be filtered.

In another aspect this invention concerns a rotary disc filtration device for filtering fluid from a body of fluid having an uppermost fluid level into permeate and retentate, the device comprising:

(a) a first member;

(b) one or more discs, each disc being suspended from the first member;

(c) one or more filter members, at least one filter member having a filter, each filter being oppositely disposed to a disc to define a fluid filtration gap therebetween in which gap the fluid to be filtered is placed during filtration, there being one or more fluid filtration gaps, fluid passing through each filter from a fluid filtration gap being the permeate and fluid not passing from a fluid filtration gap through a filter being the retentate, the filter member defining at least one fluid filtration gap having restriction means for restricting the flow of retentate out of at least one fluid filtration gap into the body of fluid;

(d) rotating means for rotating at least one of each disc and filter defining a fluid filtration gap with respect to each other; and (e) rotatable suspension means for suspending from the first member the one or more discs or filter members so that at least one of each disc and filter defining a fluid filtration gap can rotate with respect to each other.

In another aspect this invention concerns a rotary disc filtration device for filtering fluid from a body of fluid having an uppermost fluid level into permeate and retentate, the device comprising:

(a) a first member;

(b) one or more discs, each disc being suspended from the first member;

(c) one or more filter members, at least one filter member having a filter, each filter being oppositely disposed to a disc to define a fluid filtration gap therebetween in which gap the fluid to be filtered is placed during filtration, there being one or more fluid filtration gaps, fluid passing through each filter from a fluid filtration gap being the permeate and fluid not passing from a fluid filtration gap through a filter being the retentate;

(d) rotating means for rotating at least one of each disc and filter defining a fluid filtration gap with respect to each other;

(e) rotatable suspension means for suspending from the first member the one or more discs or filter members so that at least one of each disc and filter defining a fluid filtration gap can rotate with respect to each other;

(f) means for locating at least one of the one or more fluid filtration gaps within the body of fluid, the filter member defining that fluid filtration gap having restriction means for restricting the flow of retentate out of that fluid filtration gap into the body of fluid; and (g) feed fluid means for placing fluid from the body of fluid into one or more fluid filtration gaps, the feed fluid means comprising (i) an opening in at least one filter member for the inflow of fluid from the body of fluid, (ii) means for fluidly connecting the opening in the at least one filter member with at least one fluid filtration gap, and (iii) means to position the at least one filter member in the body of fluid so that fluid to be filtered can flow from the body of fluid through the opening in the at least one filter member to the at least one fluid filtration gap.

In another aspect this invention concerns a rotary disc filtration device for filtering fluid from a body of fluid having an uppermost fluid level into permeate and retentate, the device comprising:

(a) a removable first member;

(b) one or more discs, each disc being rotatably suspended from the removable first member by rotatable suspension means, the rotatable suspension means being above the uppermost fluid level of the body of fluid to be filtered;

(c) one or more filter members, at least one filter member having a filter, each filter being oppositely disposed to a disc to define a fluid filtration gap therebetween in which gap the fluid to be filtered is placed during filtration, there being one or more fluid filtration gaps, fluid passing through each filter from a fluid filtration gap being the permeate and fluid not passing from a fluid filtration gap through a filter being the retentate, each filter member being non-rotatably suspended from the removable first member;

(d) rotating means for rotating at least one disc defining a fluid filtration gap, the rotating means comprising a shaft having a longitudinal axis on which shaft the one or more discs are mounted;

(e) means for locating at least one of the one or more fluid filtration gaps within the body of fluid, the filter member defining that fluid filtration gap having near its periphery restriction means for restricting the flow of retentate out of that fluid filtration gap into the body of fluid;

(f) feed fluid means for placing fluid from the body of fluid into one or more fluid filtration gaps, the feed fluid means comprising (i) an opening in at least one filter member for the inflow of fluid from the body of fluid, (ii) means for fluidly connecting the opening in the at least one filter member with at least one fluid filtration gap, and (iii) means to position the at least one filter member in the body of fluid so that fluid to be filtered can flow from the body of fluid through the opening in the at least one filter member to the at least one fluid filtration gap; and (g) means for maintaining the one or more filter members substantially centered with respect to the longitudinal axis of the shaft.

In another aspect this invention concerns a process for filtering fluid from a body of fluid into permeate and retentate, said process comprising:

(a) providing a rotary disc filtration device of the invention;

(b) placing fluid to be filtered into one or more fluid filtration gaps of the device; and (c) rotating at least one of each disc and filter defining one or more of the fluid filtration gaps with respect to each other.

In preferred embodiments, each disc is generally planar and has two major faces and a filter is "oppositely disposed" to each major face of the disc, thereby forming two fluid filtration gaps with each disc. In other preferred embodiments, three or more fluid filtration gaps are defined by pluralities of discs and filter members. In still other preferred embodiments, the discs are mounted on a vertical shaft for rotation, the fluid filtration gaps are contained within the body of fluid to be filtered (which fluid may be contained within a housing), the periphery of the filter members carry retentate restriction means for restricting the flow of retentate out of the fluid filtration gaps into the body of fluid, and the bottom filter member has an opening through which fluid to be filtered passes upward and into the fluid filtration gaps. In yet other preferred embodiments, the filtration process includes flotation of less dense material that is part of the fluid to be filtered and/or settling of denser material that is part of the fluid to be filtered and withdrawal of the less dense and/or denser material. In yet other preferred embodiments, the device further comprises means for simplified and accurate control of the level of the body of fluid to be filtered, e.g., to keep the vessel holding the fluid to be filtered from overflowing.

As used herein, the term "oppositely disposed" means that, for example, two surfaces are on opposite sides of the same element, for example, the two major faces of a sheet of paper are oppositely disposed, or that two elements face one another across some gap or boundary, for example, the surface of a disc and the surface of a filter on opposite sides of a fluid filtration gap (that is, defining a fluid filtration gap) are oppositely disposed.

The term "substantially parallel" means that the two lines or planes or elements that are "substantially parallel" do not form an angle with each other greater than about 30° ("substantially parallel" is further defined below).

"Closely spaced" means that two lines or planes or elements are not so far apart that they can not interact or work together to perform a desired function. Thus, in the case of the facing surfaces of the disc and the filter, "closely spaced" usually means that those surfaces are not more than about 100 millimeters apart, and in that context, "closely spaced" is further defined below.

One desirable aspect of the invention is that the one or more discs and also preferably the one or more filter members are "suspended from" one or more parts of the device that may be collectively regarded as being "the first member." One or more rotating members (one or more of the disc(s) and the filter(s)) rotate during filtration. Thus, a "rotatable suspension" must be used for rotatably suspending from the first member the rotatable shaft carrying those one or more rotating members. The rotatable suspension may be any suitable means, for example, bearings, lip seals, dynamic seals, bushings, packing, or packing glands. However, the rotatable suspension will preferably be above the normal level of the fluid to be filtered, thereby eliminating the need for rotary seals and allowing a generally simpler, less costly, and less critical type of rotatable suspension (e.g., a simple rotary bearing) to be used.

In some cases the rotatable suspension may be the bearings in or associated with a gear box, motor, or other motive means. For example, a device may have filter members that do not rotate and that are suspended from the inner surface of the top of a rotary disc filtration device, the discs may all be attached to a vertical rotatable shaft, the shaft may be connected directly or indirectly to a motor or other motive means that is attached to the upper surface of the top of the device, and the rotatable shaft may pass through a simple hole cut in the top of the device. In that case, the rotatable suspension would be the mechanism that rotatably suspends the shaft, namely, the bearings in the motor or other motive means. If instead of the shaft passing through the simple hole in the top of the device, a second additional bearing or the like were used at that location below the bearing of the motor other motive means (as it might be so that during rotation the shaft did not excessively move laterally), that bearing would also be a "rotatable suspension" and would preferably be above the normal level of the fluid to be filtered.

The term "suspended from" should be understood to include being attached to, being secured to, depending from, and/or hanging from; should also be understood to include cantilevered suspension; and should also be understood to include suspension that results in any spatial orientation (whether vertical, horizontal, or diagonal) of the discs and filters; and should also be understood to include both direct and indirect suspension (e.g., where a first filter member is directly suspended from the first member and the second filter member is directly suspended only from the first filter member and not from the first member, in which case the second filter member is said to be indirectly suspended from the first member).

For a device in which the discs and filter members are suspended from the same unitary member, it is clear that they are suspended from "the first member." However, for some devices, two or more parts (e.g., plates, structural beams, gear box, motor) of the device (some or all of which may or may not be fastened together) may constitute "the first member."

One indication of whether two or more parts of the device collectively constitute "the first member" is whether they can be (but do not necessarily have to be) removed together from one or more other significant parts of the device (e.g., the rest of the device or the rest of the housing or the vessel portion of the device that holds the fluid to be filtered) to remove the disc and filter members together from the other parts of the device. Accordingly, if the discs and filter members can be removed together from the device by removing together the one or more device parts from which the discs and filter members are suspended, those one or more device parts from which the discs and filter members are suspended can collectively be regarded as "the first member" and the discs and filter members in this device are "suspended from the first member." Furthermore, in this device "the first member" is considered to be "removable." "Removability" of the first member can allow the filter members and discs to be removed as a unit, e.g., for maintenance and without having to disassemble the rest of the device.

There is another way to consider whether the discs and/or filter members are "suspended from the first member," which can be used, for example, for a device in which the discs and filter members are suspended from one or more parts of the device and those one or more parts of the device are generally not removable from other significant parts of the device. Such a device, for example, may be one where the discs and filter members hang from the top of a device and the top (which may comprise one or more parts) is non-removable from the rest of the device, including the several legs on which it stands (e.g., stands in a lake or other body of fluid). In this device, the discs and filter members are also considered to be "suspended from the first member" because the discs and filters are all suspended in cantilevered fashion in "generally the same direction" (because they all hang down from the top).

The direction of suspension is the overall direction of suspension from the supporting member to the supported member, which direction ignores any curves or bends. By "generally the same direction" is meant that the direction of suspension of the discs and the direction of suspension of the filter members are at no more than an acute angle to each other, i.e., an angle less than 90°, desirably less than 45°, more desirably less than 30°, preferably less than 15°, and most preferably are not at an angle to each other exceeding 5°. Accordingly, a device having a filter member suspended only from a support rising vertically from the bottom of a vessel and a disc attached to a rotatable shaft hanging down vertically from the top of the device would not have the two directions of suspension in "generally the same direction" because the two directions would be diametrically opposite, i.e., at 180° to each other and thus the filter member and disc would not both be "suspended from the first member."

In some cases, the two ways to consider the issue (i.e., the issue of whether the discs and filter members are suspended from the first member) overlap. For example, consider a device where the discs are fixedly attached to a vertical rotatable shaft that is attached to the rotor shaft of a motor that itself rests on and is attached to an upper plate of the top of the device, and the filter members hang down from four equally spaced diagonal rods attached to a lower plate of the top of the device (the rods being at an angle of 50° to the lower plate), and the upper and lower plates (which are part of the top) are separated by several intervening members (e.g., spacers), and the top is removable from the rest of the device (which rest of the device includes the vessel portion holding the fluid to be filtered). In that case the upper plate, the lower plate, and the appropriate sections (or entireties) of the intervening parts may be collectively regarded as "the first member" under the first test because removal of the upper plate, lower plate, and intervening parts together removes the discs and filter members together. Under the second test, which ignores whether the first plate, second plate, and intervening members are removable from any other part of the device, the discs and filter members are "suspended from the first member" because the discs and filter members are suspended in cantilevered fashion from the top in generally the same direction.

The advantages of suspending the discs or filter members (and preferably both) from the first member are numerous. Removal of the first member can readily remove the discs and the filter members as a unit without having to disassemble the rest of the device. Conversely, initial placement or replacement of the first member can readily correctly position the discs and filter members in the device. Such initial placement, removal, and replacement require access to the vessel (or body of fluid) from only one side. Thus, for example, for a device in which the first member is the top, initial placement of the discs and filters in the device and their subsequent removal and replacement require access only to the top of the device and not to any other side (including the bottom) of the device. This configuration allows the essential elements of the filtration device (the discs and filters, which together define the fluid filtration gap), to be easily positioned in a body of liquid (e.g., a fermentation vessel) in which there is normally access from only one side. This configuration makes initial assembly and maintenance (e.g., for replacing a filter) simpler and therefore less expensive and allows the discs and filter members to be properly positioned with respect to one another before they are placed in the vessel or body of fluid.

Suspension of discs or filter members from the first member is not inconsistent with the discs, the filter members, the assemblage of discs and filter members, and/or the shaft carrying the discs from contacting or being stabilized by or being attached in some way directly or indirectly to another part of the device or to a part of the "natural vessel" (e.g., the bottom of a lake) holding the fluid to be filtered. For example, in the devices of FIGS. 8 and 10 (described below), a filter member 44 (e.g., the bottommost filter member) may have legs, arms, or one or more other members that project downward to contact the bottom of the vessel and/or project radially to contact the inside of the vessel wall to help position (e.g., center) the disc/filter member assemblage during assembly of the device, to reduce or prevent vibration or other movement of the disc/filter member assemblage during filtration, etc. As another example, the shaft on which the disc(s) are mounted for rotation may be longer than shown in FIGS. 8 and 10 and may extend through the bottom of the disc/filter member assemblage so that the bottom end of the shaft is proximate the bottom of the vessel and rides in (is rotatably mounted in) a well or centering collar or bearing located on the inside of the bottom of the vessel. That would help position (e.g., center) the shaft during assembly and reduce or prevent the effects of flexing or other radial movement of the shaft during filtration. Such a well or centering collar or bearing would be particularly useful to prevent undesirable radial movement of a shaft carrying a radially unbalanced load or to prevent the undesirable radial movement of a non-vertical shaft whose otherwise unsupported end would bend downward because of gravity (e.g., due to the weight of the discs it would otherwise be carrying in cantilevered suspension). The discs and filter members are still suspended from the first member even though additional contacting/positioning/stabilizing/attaching means are used. Thus, for example, any such attaching means could be released/detached/removed and the first member thereafter removed from the rest of the device to withdraw the disc(s) and filter member(s) suspended from the first member.

Another important aspect of the invention (which may be but is not necessarily used with suspending both the one or more discs and the one or more filter members from "the first member") is that one or more of the filter members defining a fluid filtration gap can have restriction means for restricting (and also directing) the flow of retentate out of that fluid filtration gap into the body of fluid. Without any restriction means, the retentate leaving the one or more fluid filtration gaps flows into the body of fluid more radially distant from the axis of rotation than the outer periphery of the discs and filter members. The rotational velocity component of the retentate moving radially outside of the fluid filtration gap (s), which rotational component is imparted by the rotation of the one or more discs or filters, causes the fluid in the body of fluid radially outside the fluid filtration gap(s) to rotate in the same direction as the discs or filters rotate. Rotation of that radially distant fluid, which rotation can be quite vigorous, in turn tends to make it more difficult to accomplish flotation of less dense materials or settling of denser materials in the same vessel. The rotation of that radially distant fluid also tends to cause gas (e.g., air) to be sucked into the fluid to be filtered.

Consequently, controlling the effluent flow of retentate from the fluid filtration gap(s) is generally desirable. Such control may be accomplished by creating a barrier or dam near the outer periphery of the filter member(s) to significantly restrict the egress of retentate from the fluid filtration gap(s) into the radially distant liquid. A complete barrier would prevent any retentate from leaving the gaps and would substantially prevent any rotation of the radially distant liquid. Because it is usually desirable to allow some retentate to leave the gap(s), openings may be placed in the barrier or dam. However, the retentate passing outward through even a few small radial openings may still cause rotation of the radially distant liquid because of the rotational velocity component of the retentate effluent. Accordingly, it has been found that directing the flow retentate effluent against the direction of rotation will tend to counteract that rotational velocity component and decrease the tendency of the radially distant fluid to mix or rotate. Means for directing the retentate effluent flow may be openings or nozzles in or on the barrier pointed against the direction of rotation. The openings or nozzles or other means may direct the retentate effluent in any other suitable direction. Using the barrier or dam tends to prevent undue agitation (e.g., swirling) of the body of fluid and allows establishing quiescent zones in the vessel, e.g., to allow flotation of less dense material and settling of denser material.

In a particularly desirable configuration, retentate effluent leaving the fluid filtration gaps and passing through the restriction means is fed back (i.e., recycled) to the fluid filtration gaps, desirably via one or more openings in a sleeve surrounding the rotatable shaft (the annular space between the sleeve and the shaft may be in fluid communication with the fluid filtration gaps). That flow scheme, along with a bottom baffle near the inlet to the opening in the filter member farthest from the first member, provides a particularly quiet zone outside the fluid filtration gaps to thereby facilitate flotation and/or settling and decrease the likelihood of entraining gas in the feed fluid.

The advantages of using restriction means for restricting the flow of retentate out of the fluid filtration gap are numerous. The restriction means tend to prevent undue agitation of the body of fluid and allow quiescent zones to be established in the body of feed fluid to permit flotation and/or settling of less dense and/or more dense materials. Thus, the restriction means separates different flow regimes, i.e., separates fluid in the fluid filtration gaps, which desirably has sufficient motion to provide the required filter cleaning action, from fluid in the body of feed fluid, which desirably is relatively quiescent.

The restriction means can also separate fluid regimes of significantly different pressure. Broadly speaking, for a given device geometry (i.e., the geometry of the fluid filtration gap and of the surfaces defining the fluid filtration gap) and for a given fluid (which has certain physical properties), increasing the relative rotational speed of the disc and filter defining the fluid filtration gap tends to increase the pressure in the fluid filtration gap. Under the appropriate conditions, the pressure in the fluid filtration gap can be made to reach 3, 5, 10, or 20, or even more psi (0.21, 0.35, 0.69, 1.38, or more bars) above what the pressure is in the fluid filtration gap when there is no rotation. Thus, the restriction means can separate this higher pressure zone (in the fluid filtration gaps) from a regime of lower pressure (outside the restriction means).

The pressure in the fluid filtration gap is the upstream pressure on the filter. The pressure on the downstream side of the filter may be approximately atmospheric and it can be decreased by, for example, using a vacuum pump to remove permeate. Whether or not a permeate vacuum pump is used, it is the pressure differential across the filter that drives the filtration. Thus, in some cases it may be desirable to increase the upstream pressure on the filter (and perhaps also to use a permeate vacuum pump) to obtain as high as transmembrane pressure as possible. Because the restriction means can separate the higher pressure regime (in the fluid filtration gaps) from the lower pressure regime (inside the body of fluid to be filtered but outside the fluid filtration gaps), increasing the pressure inside the fluid filtration gaps (by, for example, increasing the rotational speed or changing the disc geometry) does not require that the vessel containing the body of fluid be designed for pressure. Thus, the vessel containing the body of fluid to be filtered may remain a simple non-pressure vessel (e.g., a simple metal drum) even as the pressure in the fluid filtration gap is made as high as possible. If the pressure in the fluid filtration gap is made high enough, the pressure of the permeate (on the downstream side of the filter) may be high enough so that a pump is not needed to remove permeate from the system.

Thus, the restriction means may also be thought of as not only substantially decoupling the flow pattern in the fluid filtration gap from the flow pattern in the body of feed fluid but also substantially decoupling the pressure in the fluid filtration gap from the pressure in the body of feed fluid.

Thus, control of the pressure in the fluid filtration gaps does not depend upon the design of the vessel containing the body of fluid to be filtered. For example, the vessel does not have to be a thick-walled pressure vessel (or have a thick-walled housing), thereby reducing cost.

Another desirable aspect of the invention concerns "fluid management," which includes control of the level of liquid in the body of fluid to be filtered, control of permeate removal, and control of the feed of fluid into the body of fluid to be filtered. In a preferred embodiment, a feed tube is used to deliver feed fluid into the body of fluid and a second (overflow) tube, whose lower end is set at the desired height of fluid in the vessel, is used to remove any fluid that rises above that desired height. The feed is delivered through the feed tube into the draft tube, whose bottom opening is close enough to the bottom of the vessel to facilitate settling of any solids in the feed. One or more separate pumps may be used to deliver feed to the feed tube (and thus into the vessel), to withdraw any overflow liquid (via the overflow tube) from the vessel, and to withdraw permeate. Desirably, a single three-headed peristaltic pump is used to handle the three flows. A separate pump or a fourth head on the peristaltic pump may be used to remove any less dense liquid (e.g., oil) floating on the top of the body of fluid to be filtered. With this flow scheme and by appropriate adjustment of the relative flow rates of the pumps or pump heads, simplified and accurate fluid management can be achieved, without the need for complicated and costly level controllers and sensors.

Another desirable aspect of the invention is the use of filter members that can be easily put into or removed from their position with respect to the rotating discs to avoid the need to remove the discs from the shaft to allow removal of the filter members. Such easily removable filter members may have any shape but will be generally be D-shaped or circular in plan view. In either case, a cut-out can provide clearance, e.g., for the rotatable shaft on which the one or more discs are mounted. Two generally D-shaped filter members may be put into position (proximate a disc) so that their straight sides are facing one another, thereby together forming a generally circular assemblage. In that case, each filter member will have located in the middle of its straight side a generally semi-circular cut-out for the shaft or suspending sleeve. A generally circular easily removable filter member will usually have a radial cut-out that extends from the periphery to the center of filter member to provide the necessary clearance for the shaft or sleeve. No matter what the shape of the filter member, two or more filter members may be mechanically connected to permit them to be moved as a unit (a filter member cartridge) into and out of position with respect to the discs. The advantages of such filter members and of such filter member cartridges include facilitating initial assemblage of the device and facilitating its maintenance.

All of these and other advantages afforded by this invention will be apparent to those skilled in the art from this disclosure.

BRIEF DESCRIPTION OF THE DRAWINGS

To facilitate further description of the invention, the following drawings are provided in which:

FIG. 5 is an enlarged plan view of the bottom major face of the disc of FIG. 1;

FIG. 6 is a cross-sectional view of the disc taken along line 6—6 of FIG. 5;

FIG. 18 is an enlarged cross-sectional elevational view taken along line 18—18 of FIG. 17;

FIG. 19 is an enlarged cross-sectional elevational view taken along line 19—19 of FIG. 17;

FIG. 20 is an enlarged detail plan view of a section of the permeate collection means of the filter member of FIG. 17;

FIG. 21 is a bottom view of one of the two ear portions of the filter member of FIG. 17;

Figure 1:
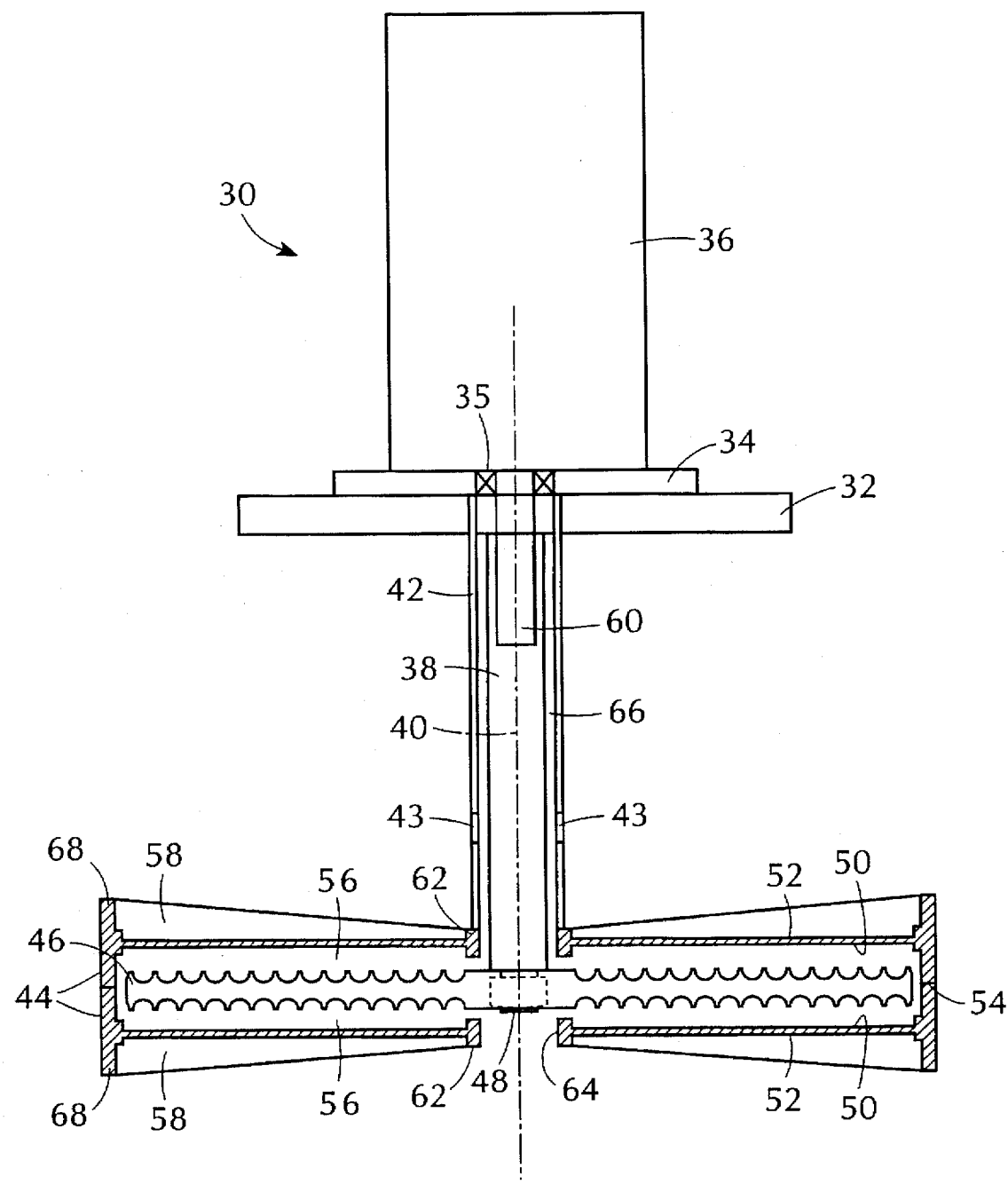
FIG. 1 is an elevational view of a member from which two filter members and a disc are suspended.

These drawings are provided for illustrative purposes only and should not be used to unduly limit the scope of the invention.

DETAILED DESCRIPTION OF THE INVENTION

The design of the rotary filtration device of this invention is not critical and any design may be used so long as the device meets the requirements of the claims and affords the benefits of this invention. Thus, it is within the scope of this invention to have a rotating disc surface itself also be at least in part a filter surface. It is also within the scope of the invention to have two oppositely disposed closely spaced filtration surfaces define the fluid filtration gap and to have one or the other or both of the surfaces rotate, in which case one of the filtration surfaces would be considered to be the disc. Accordingly, use of the term "disc" does not preclude its surface facing and helping to define the filtration gap from also being a filter surface. Similarly, use of the term "filter" to refer to an element through which permeate passes and whose surface is the second surface facing and helping to define the fluid filtration gap does not preclude the filter surface from rotating. Preferably, however, only the discs rotate, the discs do not have filtration capability, the filters (and filter members, which carry the filters) are not rotatably suspended and therefore do not rotate; and all filtration capability resides in the filters.

If the filter facing and helping to define the fluid filtration gap is to have any grooves or blades or other protuberances, the filter should be rigid enough to hold the requisite shape. In that case, rigid filter materials such as metal (e.g., sintered metal), ceramics, or glass might be suitable. It is preferred, however, that the filter itself not contain any groove or blades and that the disc surface helping to define the fluid filtration gap contain any grooves or blades that are used.

The filter may be made of any material so long as the filter can perform the functions required in accordance with this invention and is otherwise chemically and physically suitable under its respective operating conditions. Accordingly, the filter may be polymeric, metallic, ceramic, or of glass, and may be of any form or shape. Thus, the filter may be formed of particles or of a film or of fibers or of a combination of all three. The filter may be woven or non-woven. Generally, non-woven metal filters have certain advantageous features as compared with polymeric filters: they are easier to sterilize; generally have superior chemical and heat resistance; may be cleaned more easily; and have significantly better structural integrity and rigidity. If two or more filters are used in a device, they may be of the same or different material and filtration or sieving characteristics.

The filter used may be an asymmetric surface filter. An asymmetric surface filter is a filter whose two major faces have different distributions of pore sizes such that the average or median pore size on one face is significantly smaller than the average or median pore size on the other face. Desirably, the asymmetric surface filter is oriented in a device of this invention with the face having the smaller average or median pore size facing the fluid filtration gap and the face with the larger average or median pore size facing away from the gap. A preferred metal filter of this type is the DYNALLOY fiber metal filter marketed by Fluid Dynamics of DeLand, Fla. The use of a metal filter may be advantageous if one or more electric fields are also being used in the device or if the filter is to carry a charge.

One or more electric fields may be applied in axial, or radial, or non-radial non-axial directions. The fields may be useful in aiding separation and can be applied using known technology. As used herein, "axial" means along or parallel to the axis of rotation of the one or more rotating members and "radial" means along or parallel to a radius of the plane of a disc or filter (i.e., perpendicular to the axis of rotation of the one or more members). The field may be the result of direct or alternating voltage, e.g., a high frequency alternating potential. One or more fields in different directions may be applied, which together will result in a single imposed field. One or more fields may be varied as a function of time, e.g., one radial field and one axial field in interleaved on/off synchronization. Thus, the term "an electric field" as used herein should be understood to include all of the foregoing.

The key function of a filter is to freely pass the permeate and not pass the retentate. To do that efficiently, the permeate should adequately "wet" the filter. One indicator of wetting is the contact angle a drop of permeate forms when placed on the filter surface (see U.S. Pat. Nos. 4,906,379 and 5,000,848). Generally speaking, the lower the contact angle, the greater the wetting, and, conversely, the larger the contact angle, the lesser the wetting.

A drop of permeate recovered using a device of this invention will usually have a contact angle on the filter used in that device of less than 45°, desirably less than 40°, more desirably less than 35°, most desirably less than 30°, preferably less than 25°, more preferably less than 20°, and most preferably less than 15°. The contact angle is measured using the method described in U.S. Pat. No. 4,906,379 (see, e.g., column 10, line 42 et seq.) and 5,000,848 (see, e.g., column 12, line 46 et seq.).

Because water is a high energy liquid, principally because of hydrogen bonding, and because water is often a permeate in filtration processes, hydrophilic filters are preferred for use in the device of this invention. Filters whose surface energy has been increased to increase their hydrophilicity may be used. Thus, filters having a high surface energy (e.g., those of regenerated cellulose and those in accordance with U.S. Pat. No. 4,906,379) are a preferred class of filters. Such filters are more easily wet by polar substances, such as water, but resist wetting by non-polar substances such as organic compounds. Such high energy filter surfaces also have a reduced tendency to become fouled by materials having low energy properties, such as proteins and other organic substances. Preferred filters used in this rotary disc invention are made in accordance with U.S. Pat. No. 4,906,379 and are marketed by Membrex, Inc. under the trademark Ultra-Filic®. The UltraFilic® membrane is made of modified polyacrylonitrile (PAN) and its surface is chemically modified to be extremely hydrophilic ("hyperhydrophilic").

A device of this invention using a filter that allows water to pass (permeate) but rejects oil will find particular use in separating water from oil, e.g., in cleaning up oil spills or in recycling aqueous cleaning solution in a parts washing system. Alternatively, a filter that is relatively hydrophobic (low surface energy) and allows oil to pass and rejects water may be used. Other especially advantageous combinations of the device of this invention and filters having certain inherent properties (e.g., high rejection rate of certain materials but rapid and easy permeation of their co-components in the feed fluid) will be apparent to those skilled in the art. Use of such filters in combination with the device of this invention will provide advantages that may not be achievable without the combination.

The filter may have pores of any size or shape provided they are appropriate for the feed fluid and the permeate and can provide the separation desired. The filter may have a narrow or broad or other distribution of pore sizes and shapes and may be asymmetric and used as an asymmetric surface filter. The filter may have a relatively sharp molecular weight cut-off point.

The filter matrix, and particularly a polymeric filter matrix, may also have ligands attached to it for selective sorption applications (e.g., ion exchange/sorption, affinity sorption, and chelation). Suitable ligands include any ligand capable of attaching to the matrix or to a precursor or a derivative of the matrix.

Preferred ligands comprise (a) ion-selective affinity groups (such as chelator and cage types) that selectively bind inorganic ions and (b) bio-selective affinity groups that selectively bind biologically active substances. The inventory of affinity ligands is large and rapidly increasing. Most often, such ligands are derived from nature (i.e., substances of biological origin) while others are wholly or partially synthetic (i.e., bio-mimic substances). Preferred ligands, preferred methods for attaching ligands to membrane filters, and preferred membrane filters are taught in U.S. Pat. No. 4,906,379. Other useful ligands and methods for attaching the ligands to the filter will be known to those skilled in the arts of affinity sorption, enzyme immobilization chelation, and the like. As used herein the term "selective sorption ligands" includes all of the foregoing ligands.

Almost any fluid to be filtered can be filtered using a device of this invention, but it finds particular use in filtering feeds having high solids content, mixed phase fluids, and biological fluids.

High solids content fluids may be, for example, biological fluids, fluids containing affinity particles (e.g., selective sorption affinity particles), particles of ion exchange resin, catalyst particles, adsorbent particles, absorbent particles, and particles of inert carrier. The inert carrier particles may themselves carry catalyst, resin, reactants, treating agents (e.g., activated charcoal), etc. Mixed phase fluids include liquid/solid, liquid/liquid, and liquid/gas systems. The fluid may contain more than two phases. The liquid phases may all be aqueous or non-aqueous or may be one or more aqueous phases and one or more non-aqueous phases together. The phases may be immiscible, e.g., two aqueous phases that are immiscible because each phase has a different solute. The fluid may have gaseous, liquid, and solid phases. Reaction and/or heat transfer may accompany the filtration process of this invention and take place inside or outside a device of this invention.

Biological fluids are fluids that originate from or contain materials originating from biological organisms (e.g., from the animal or plant kingdoms) or components thereof, including living and non-living things (e.g., viruses). Thus, the term "biological fluids" includes blood; blood serum; plasma; spinal fluids; dairy fluids (e.g., milk and milk products); fluids containing hormones, blood cells, or genetically engineered materials; fluids from fermentation processes (including fermentation broths and reactant, intermediate, and product streams from beer-making and wine-making, and waste water treatment streams); fluids containing or consisting of microbial or viral material, vaccines, plant extracts, or vegetable or fruit juices (e.g., apple juice and orange juice); fluids containing microorganisms (e.g., bacteria, yeast, fungi, viruses); and so forth. The device is particularly useful with fluids containing pressure-sensitive or shear-sensitive components, e.g., cells (blood cells; mammalian hybridomas; pathogens, e.g., bacteria in a fluid sample that are being concentrated to allow detection; etc.). It is useful for filtering fluids containing drugs and precursors and derivatives thereof. It is also useful for filtering organic compounds in general (including oils of all types, e.g., petroleum oil and food oil) as single or mixed phases (e.g., oil/water). It is also useful for filtering fluids containing surfactants, emulsions, liposomes, natural or synthetic polymers, waste waters from deburring and polishing operations (e.g., tumbling and grinding fluids), industrial and municipal waste waters, and aqueous, semi-aqueous, and solvent-based cleaners.

A plurality of discs and/or a plurality of filter members, which carry the filters, may be used in a device according to this invention. Thus, it is within the scope of the invention to have a single disc disposed between two filters, thereby defining two filtration gaps. In such a device, one or both of the major faces of the disc would desirably each have at least one spiral groove. It is also within the scope of this invention for such a device to have several interleaved discs and filters, that is, discs and filters in alternating arrangement, so that several filtration gaps are defined. In that case, the discs could be mounted on a common shaft for rotation in unison and the permeate from the filters could flow to a common manifold for collection. In a device having a plurality of interleaved discs and filters, each surface defining a fluid filtration gap may have one or more spiral grooves.

Regardless of which elements (that is, the filter(s), the disc(s), or combinations thereof) rotate, rotation may be at a constant speed or at varying speeds and in a single direction or in alternating directions. If two or more members rotate, they may rotate in the same or different directions and at the same or different speeds. The rotating member(s) may periodically reverse its or their direction(s) of rotation (i.e., oscillate). At least one of each disc and filter pair defining each fluid filtration gap should rotate with respect to the other. Thus, the filter and disc defining a fluid filtration gap should not rotate in the same direction and at the same speed. Preferably the filter or filters (and therefore the filter member or filter members) are stationary and the disc or discs rotate and only in a single direction of rotation. Withdrawal of permeate that passes through the filters is simplified if the filter members are stationary during filtration.

The disc(s) and/or filter(s) may translate axially (reciprocate) approximately perpendicular to the plane of rotation) whether or not it or they are the rotating element(s). The disc(s) and/or filter(s) also may be vibrated or oscillated to aid filtration.

Each filter is desirably mounted on a filter member, which functions to support the filter and/or to provide a collection network for the permeate. Such a support is desirable, particularly if the filter does not itself have substantial structural rigidity. Preferably, a network of permeate collection passageways is disposed in the filter member in fluid communication with the downstream side of the filter (facing away from the fluid filtration gap) so that permeate passing through the filter flows into the permeate collection passageways. Any method of mounting the filter on the filter member may be used provided it does not unduly hinder operation of the device. Preferably, the method of mounting the filter does not significantly reduce the active area of the filter but such reduction may be necessary in some cases.

The filter member may have any size or shape provided that the advantages of the invention can be achieved. Two or more filter members may be arranged in a plane to form a filter member assemblage that helps define a fluid filtration gap. Thus, for example, two D-shaped members (with semi-circular cut-outs for the shaft, etc.) may be placed with their straight sides near each other to define a filter member assemblage having a circular outer periphery.

Desirably, each of the one or more of the filter members defining a fluid filtration gap can have near its periphery restriction means for restricting (and also directing) the flow of retentate out of that fluid filtration gap into the body of fluid. If the restriction means are high enough (i.e., extend sufficiently away from the plane of the filter member, e.g., perpendicularly or diagonally away from the plane of the filter member), they may come close to or touch the adjacent filter member. In that case, the restriction means may be thought of as forming a wall separating a regime of more intense shear and fluid movement (the fluid between the discs and filter members, and the fluid between the peripheries of the discs and filter members and the inside surface of the restriction means) from a regime of less intense shear and fluid movement (the rest of the body of fluid, including the volume radially distant from the outside surface of the restriction means and the volume axially remote from, i.e., axially outside of or beyond, the two outer filter members).

The restrictions means can also be used to separate a region of higher pressure (an inner region whose outer boundary is the restrictions means and, for example, the two outer filter members) from a region of lower pressure (the region outside of the inner region, i.e., the body of fluid to be filtered). A higher pressure can be developed in the fluid filtration gap for a given fluid by adjusting the geometry of the device and the rotation speed. The geometry of the device includes the size and shape of the two surfaces defining the gap, the smoothness of those surfaces, the width of the gap, whether there are any grooves or blades or other concavities or convexities on either surface, and, if so, their number, size, shape, and relative position.

If the fluid in the appropriate parts of the regime of less intense shear and fluid movement moves slowly enough and if the fluid properties (e.g., surface tension, viscosity, and density) are satisfactory, flotation and settling may be conducted in this regime. That is useful, e.g., in the separation subsystem of an aqueous parts washing system, where oil removed from the parts by the cleaning solution and particles (e.g., metal filings) carried by the cleaning solution into the separation subsystem can be separated by flotation (the oil) and by settling (the metal filings) from the aqueous cleaner.

The design of the restriction means (if used) is not critical and any configuration, shape, location, or size may be used so long as the restriction means can perform its intended function. Although restriction means unattached to any filter member could be placed in the device (e.g., a hollow cylindrical member interposed between the periphery of the filter members and the rest of the body of fluid to be filtered, i.e., between the periphery of the filter members and the cylindrical wall of the housing), it is preferable for the restriction means to be carried by the filter members (i.e., for the filter members to have the restriction means), for example, so that the restriction means can be removed as a unit with the filter members. Restriction means not carried by the filter members (e.g., a cylindrical wall) may be suspended from the first member or may be attached to another vessel wall (e.g., the sidewall or bottom of the vessel).

The restriction means may comprise a circular dam or lip located near the outer periphery of the filter member that projects a sufficient distance from the plane of the filter member. Thus, the lip may project in only one direction away from the plane of the filter member (e.g., above) or it may project in both directions away from the plane of the filter member (i.e., both above and below). Desirably, the filter members will carry restriction means and those means will substantially isolate the fluid in the high-shear zone from the fluid in the quiescent zone. Compressible means may optionally be used between the restriction means of one filter member and the appropriate portion of the adjacent filter member to provide a fluid-tight seal. If the restriction means is carried by the filter member(s), the restriction means may be but need not be located at the periphery of the filter member(s); the restriction means should however be radially distant enough to perform the desired function. For example, if the fluid filtration gap is 100 millimeters wide, each filter member may carry restriction means and those means may project above and below the plane of the filter member approximately 80 millimeters. Alternatively, the restriction means could project 100 millimeters above the plane of the filter member and not at all below the plane of the filter member.

In most cases, it is desirable for retentate to remix with the rest of the body of fluid to be filtered. That remixing may occur, for example, in the body of fluid to be filtered outside the retentate flow restriction means, or just prior to being fed to the fluid filtration gap (e.g., in the annular region between the disc rotating shaft and the sleeve supporting the filter members), or in the fluid filtration gap itself. Such remixing is desirable for several reasons, including preventing extreme concentration gradients from arising and "washing out" from the fluid filtration gap the solids or other materials that might otherwise tend to accumulate and more rapidly blind or clog the filter.

If the restriction means prevents substantial remixing, it may be necessary to provide retentate flow effluent means (e.g., openings) in the "inner wall" formed by the restriction means to allow the retentate to leave the high shear regime. It may also be desirable to provide retentate flow directing means to direct the flow of the retentate leaving the high shear regime to counteract any undue agitation (e.g., swirling) of liquid in the radially distant volume that would otherwise occur because of the rotation of the rotating members (usually the discs). Accordingly, openings in the inner wall formed by the restriction means may be angled against the direction of rotation of the rotating members or nozzles oriented against the direction of rotation may be provided. Those openings and/or nozzles may also be oriented so that the retentate flow out of them is at an angle to the plane of rotation (e.g., perpendicularly) to achieve other flow patterns within the fluid regime of less shear.

The restriction means for a fluid filtration gap will often block a significant portion of the nominal area occupied by the restriction means. Thus, the percentage of the nominal area blocked by the restriction means will often be at least 85%, usually at least 90%, desirably at least 92%, more desirably at least 94%, most desirably at least 95%, preferably at least 96%, more preferably at least 97%, most preferably at least 98%, and sometimes as much as 99% of the nominal area occupied by the restriction means. In other words, the open area defined by the openings in the restriction means will often be less than 15%, usually less than 10%, desirably less than 8%, more desirably less than 6%, most desirably less than 5%, preferably less than 4%, more preferably less than 3%, most preferably less than 2%, and sometimes less than 1% of the nominal area occupied by the restriction means. For this purpose, the nominal area occupied by the restriction means for a fluid filtration gap is taken to be the inner periphery of the restriction means (which in the case of cylindrical restriction means is its inner circumference) multiplied by the height of the fluid filtration gap. The height of the fluid filtration gap will be taken as the distance from the mid-plane of the disc to the mid-plane of the oppositely disposed filter member defining that gap.

Feed fluid may be introduced into the fluid filtration gap continuously or in batches. Permeate may be removed continuously or in batches. Retentate may be removed continuously or in batches. Retentate containing one or more species concentrated from the feed fluid may be the desired product, e.g., for testing. The permeate product may be feed fluid from which particulate or other matter that would interfere with subsequent testing has been removed by the filtration device. Testing of the retentate and/or permeate may be for the presence of or concentration of any chemical or biological species or for one or more physical or chemical properties (e.g., pH, temperature, viscosity, extent of reaction, specific gravity, chloride ion, antibodies, bacteria, viruses and other microorganisms, e.g., Cryptosporidium oocysts and Giardia cysts, DNA fragments, sugars, ethanol, and toxic metals, toxic organic materials, and the like). Thus, a device of this invention may further comprise means for physically and/or chemically testing the retentate and/or the permeate, e.g., for one or more of the foregoing species and/or properties (characteristics).

Any method may be used to place fluid to be filtered into the one or more fluid filtration gaps. For example, feed fluid may flow through the rotatable shaft or the sleeve and pass out into the fluid filtration gaps through ports in the shaft or the sleeve, or one or more gaps may be immersed in a natural body of fluid (e.g., a pond or lake) or in a body of fluid contained in a vessel (or housing), or two or more of those and other flow schemes may be used.

In a particularly desirable configuration, the retentate leaving one or more fluid filtration gaps is recycled to the fluid filtration gaps. For example, retentate leaving the fluid filtration gaps may be piped to the annular region between (i) the rotatable shaft by which the discs are rotated and (ii) a sleeve around the shaft that supports the filter members, which annular region may be in fluid communication with one or more of the fluid filtration gaps. The restriction means and suitable piping may be arranged to accomplish that recycle of retentate to the fluid filtration gaps, and some or all of the retentate leaving the fluid filtration gaps may be recycled. Fresh (nonrecycle) feed (from the body of fluid to be filtered) can enter the fluid filtration gaps by any suitable means, including by passing through entry ports in the sleeve (if a sleeve is used and is fluidly connected to the fluid filtration gaps) or by passing through an opening in one or more filter members (e.g., the filter member farthest from the first member) or by any combination of those and other means. Fresh feed and any recycle retentate may or may not be mixed before entering the fluid filtration gaps. For example, such mixing may occur in the annular region between the sleeve and the shaft or just before entry into one of the fluid filtration gaps.

The vessel or housing to hold the fluid may be part of the device. The housing (including the bottom, top, and/or sides) may be of any size or shape and of any material so long as the housing does not adversely affect performance of the device of this invention. Generally, the housing will be no larger than is reasonably required (1) to house and/or suspend the disc(s) and the filter(s), and (2) to provide a sufficiently large body of fluid to be filtered (if the housing is used to hold the fluid), and (3) to provide sufficient volume for flotation and/or settling (if flotation and/or settling are to be accomplished in the same vessel). A housing need not be used at all or the housing or a part of its bottom, top, and/or sides may be open and the device with the housing may be placed into a body of fluid (e.g., a lake, a fermentation tank) to produce a permeate and/or retentate product, e.g., for testing. Partial or complete immersion of the device can allow fluid to flow into the fluid filtration gap. The pumping action of the device (e.g., caused by the rotation of the disc(s)) can also be used to move the feed fluid into the filtration gap from the body of feed fluid.

A device of this invention may be used in many different ways, e.g., for monitoring a reaction (e.g., by testing, or for producing a testable fluid from, the reaction medium in a reactor or a reactor effluent stream), or as an integral part of a reactor scheme (e.g., for separating catalyst from a reactor effluent stream for recycling to the reactor or for regeneration, or for continuously removing product and/or by-products and/or continuously replenishing nutrients in a cell culture reactor, or in biological waste water treatment (e.g., for retaining the activated sludge used to digest organic matter)), or as part of a recovery scheme (e.g., for separating products, by-products, contaminants, etc. from a reaction or process stream). The device may be located in situ in any type of process vessel (e.g., reactor) or pipeline (e.g., reactor effluent piping or slip-stream piping) for any purpose (e.g., producing a testable fluid) where filtration needs to be performed continuously or intermittently.

Although there are no theoretical upper or lower limits on the diameter of the discs and filters, because of the speed of rotation, which may vary anywhere from under 100 rpm to 1000 rpm or higher, and because of engineering, fabrication, and cost constraints, the rotating member(s) of the filtration device will rarely be more than one or two meters in diameter. Accordingly, to increase the capacity of a device of this invention beyond the capacity provided by discs and filters approximately one or two meters in diameter, it is preferred that the filtration capacity be increased by adding additional discs and/or filters as needed. Regardless of the disc and filter diameters, capacity can always be increased by adding more discs and filters to a single device or by connecting two or more devices in series or parallel.

Discs and/or filter members may be mounted on a plurality of different suspension means in a common housing, hanging from a common member (e.g., a top), etc. Thus, for example, a housing for containing the body of fluid to be filtered could have two or more rotatable shafts in it, where one or both shafts are suspended from the top or side of the device and each shaft carries one or more discs, and/or one or more sets of filter members could be suspended from the top or side of the device. A framework (e.g., a top mounted on several legs for standing in a reaction vessel or a lake) could carry two or more rotatable shafts on which two different sets of discs are mounted.

The disc may be made of any material and have any design or shape provided it has the requisite physical and chemical properties so that it can perform its function according to the present invention. Because the disc may be rotated according to the present invention and because it is desirable that the disc not deform during the filtration process, the disc requires a certain minimum structural rigidity. Also, the disc preferably should be relatively inert chemically to the feed fluid. Generally, the disc will be made of metal although other materials such as ceramics, glass, and polymers may be used.

Preferably, the surface of the disc facing the filtration gap, including the inner surface(s) of any grooves in the disc, is relatively smooth. Preferably, the surface of the filter, including any grooves used in the filter, is relatively smooth. A rough surface favors the onset of turbulent flow in the fluid in the filtration gap at lower rotation rates, which flow is energy inefficient and may adversely affect one or more components of the fluid being filtered. Thus, desirably the flow of fluid in the fluid filtration gaps is substantially non-turbulent, preferably essentially non-turbulent, and most preferably completely non-turbulent.

Generally, the periphery of the disc and of the filter and of the filter member will be circular, although other shapes may be used. The center of the filter will desirably coincide with the center of the filter member, the center of the disc will desirably coincide with the center of the filter and the centers will desirably lie on the axis of rotation of the rotating element(s). The peripheries of the disc and of the filter member will usually be approximately the same radial distance from the axis of rotation. Usually one disc surface will face a single filter member and the peripheries of each will be approximately the same distance from the axis of rotation.

Preferably, the surface of the filter is substantially planar. Depending on the type of filter and its surface, the surface may have microconcavities and microconvexities; however, their presence is not inconsistent with the filter surface being considered to be substantially planar. Furthermore, if the filter surface contains one or more grooves and even if those grooves occupy almost the entire filter surface and have depths of 5 millimeters or more, that will still not prevent the filter surface from being considered to be substantially planar.

Similarly, the disc surface helping to define the fluid filtration gap is preferably also substantially planar, and the presence of microconcavities, microconvexities, and grooves with depths of 5 to 10 millimeters or more will still not prevent the filter surface from being considered to be substantially planar.

Although the disc and filter surfaces are preferably planar (e.g., for ease of fabrication), they need not be planar. For example, either or both may have axial cross-sections that are conical, trapezoidal, or curved. In fact, any shape may be used provided the benefits of this invention can still be achieved. Because the width of the fluid filtration gap may vary radially (i.e., as the distance from the axis of rotation, which is the longitudinal axis of the rotating shaft, varies), the two surfaces defining the gap may, for example, be closer to each other at their centers or at their peripheries. If both surfaces have the same cross-sectional size and shape, they may be oriented so that the gap width is constant, e.g., as where both disc and filter are conical and are nested.

It is preferred that neither the disc nor the filter have any significant non-spiral protuberances (e.g., non-spiral blades or vanes) extending into the fluid filtration gap because their presence will tend to adversely affect, for example, energy efficiency by favoring the onset of turbulence at lower rates of rotation.

Preferably, the disc surface and the filter surface defining the fluid filtration gap will be substantially parallel, that is, the planes of the two surfaces will not be at an angle to each other exceeding approximately 30°, desirably 20°, more desirably 15°, preferably 10°, and most preferably will not be at an angle to each other exceeding 5°. Even if a member (disc or filter) is, strictly speaking, non-planar (e.g., conical discs and filters), the member still will be considered to have a major plane of its general orientation, and it is that plane which should be used in determining whether the planes are substantially parallel.

A device according to this invention may be oriented horizontally, vertically, or diagonally, that is, the axis of rotation of the disc and/or rotatable filter members (if any) may be horizontal, vertical, or diagonal. In a vertically oriented device having one disc and one filter, the disc may be above the filter or the filter may be above the disc. Regardless of the number of discs and filters and the orientation of the device, it is desirable that the fluid filtration gap be kept filled with fluid during filtration.

Rotation of the disc(s) and/or filter member(s) may be achieved using any direct or indirect means, for example, an electric motor, a motor coupled via pulleys and drive belt or by gear transmission, or a magnetic drive. Thus, the rotating members (e.g., the discs) need not be mounted on a shaft that rotates them. Axial translation of the disc(s) or filter member (s) and vibratory movement may be accomplished using known technology.

In contrast to classic cross-flow filtration devices, the shear rate near the filtration surface and the transmembrane pressure or transmembrane pressure differential ("TMP") in a device of this invention may be made substantially independent of one another. (Despite the fact that the filter used herein need not be a membrane, the term "transmembrane pressure" is used because it is a common term.) A filter system of this invention enables precise control over the separation and can be operated and controlled in a variety of ways. For instance, for a given feed fluid, device geometry, filter, and rate of rotation of the rotating member, the permeate flow can be controlled by a permeate withdrawal (metering) pump (e.g., a peristaltic pump) and the retentate concentration (bulk concentration) controlled by setting the ratio of feed to permeate flow rates. Control of the system can also be achieved with flow control valves and pressure control valves. Some of the advantages of this invention are made possible by the fact that key operating parameters (shear rate, transmembrane pressure, and feed, retentate, and permeate rates) can to a substantial extent be independently controlled and manipulated.

The control system for the filtration device may provide for continuous or batch addition or withdrawal of feed fluid and/or permeate and/or retentate. The design of the peripheral equipment used with the filtration device is not critical. Off-the-shelf technology may be used for the addition, collection, and withdrawal of fluid, for the control system, the rotary drive means, etc. The design and selection of all of this peripheral equipment are within the skill of the art.

Generally, the operating pressure and transmembrane pressure in the device can be any values that do not interfere with the filtration process or adversely affect the feed or product fluids. Thus, a transmembrane pressure only slightly above atmospheric pressure may be used or the transmembrane pressure may be substantially higher. Generally, lower transmembrane pressures are preferred because they tend to minimize solids build-up on the surface of and within the filter. Also, lower operating pressures are generally preferred because they tend to make the equipment less costly. However, in some cases it may be desirable to use higher operating pressures to aid filtration. For instance, when processing carbonated beverages, the operating pressure must be kept sufficiently high to prevent degassing. Higher pressures in the fluid filtration gap may also be desirable to help drive the filtration. Higher pressure in the fluid filtration gap may also allow dispensing with a vacuum pump for removing permeate. It may also be desirable to use other forces, for example, electromotive force, to aid filtration in certain cases.

Desirably one or more spiral grooves are used on one or more of the surfaces defining each fluid filtration gap, and preferably the disc defining each gap rotates and carries one or more spiral grooves and the filter defining each fluid filtration gap does not rotate and does not have any groove.

A groove is a long narrow channel or depression. It may also be thought of as an elongate concavity or depression whose length lies in a plane parallel to the surface in which the groove is located. The term "spiral" may be defined in many ways but one simple definition is that a spiral is the path of a point in a plane moving around a central point in the plane while continuously receding from or advancing toward the central point.

The spiral grooves used herein preferably are but need not be continuous. A surface may have more than one spiral, in which case the spirals may start and/or end at different distances from the center of the surface. If more than one spiral groove is used on a surface, the grooves may cross each other and need not have the same shape or curvature or central point or transverse cross-sectional shape or area. The spirals need not end at the periphery of the surface. The spirals need not be on the rotating member(s). Preferably, however, the one or more spiral grooves used are located on the surface of the disc, the disc rotates, feed is introduced to the fluid filtration gap at or near the axis of rotation, the grooves are true spirals, start near the axis of rotation, extend to the periphery of the disc, and do not cross over each other.

Preferably the grooves are oriented on the surface and the surface is rotated in a direction so that the outer peripheral end of each groove points or faces away from the direction of rotation. That tends to reduce the force of impact of fluid exiting the groove.

The grooves desirably used herein are generally concave in transverse cross-section and usually do not have any convexities. Preferably the inner surface of the transverse cross-section of the groove is a smooth continuous curve, for example, a section of an ellipse or circle or combinations thereof. The groove may also have straight walls and be, for example, triangular, rectangular, or square in cross-section. The transverse cross-section may also have straight and curved portions. A groove used herein preferably is of constant width and depth but those dimensions may vary along the length of the groove.

The ratio of groove width to disc (or filter) radius will usually be from 0.001 to 0.6, preferably from 0.01 to 0.5, and most preferably from 0.01 to 0.4. The width may vary along the groove path length such that the ratio of groove width to radial location changes. Ratios of groove width to disc (or filter) radius outside the range of 0.001 to 0.6 may be used if the other parameters (e.g., speed of rotation) can be adjusted so that the benefits of this invention are achieved.

The separation between the two surfaces defining the filtration gap and the speed of rotation affect the cleaning action or shear and, hence, the flux. The cleaning action, generally speaking, is inversely related to the gap width. The effect of varying the gap, at least within a certain range, has a measurable but relatively small effect on flux, that is, the relationship between gap width and wall shear (i.e., shear rate at the membrane surface) is not strong. In any case, at some point, the filtration surface and its oppositely disposed disc will be too far apart for rotation of at least one of the members to have any beneficial effect on flux. On the other hand, because of engineering tolerances, among other things, at some point the two surfaces defining the filtration gap will be too close together to allow rotation of one or the other or both members. Accordingly, there is a useful working range of gap widths for any particular filtration device for a given feed fluid. The two oppositely disposed surfaces defining the fluid filtration gap should be "closely spaced" and thus the gap width will usually be within the range of 1 to 100 millimeters, often 1 to 50 millimeters, desirably 1 to 25 millimeters, preferably 1 to 15 millimeters, and most preferably 1 to 10 millimeters. Spacings outside the range of 1 to 100 millimeters may be used if the other parameters can be adjusted so that the benefits of this invention are obtained. The gap width for a given device may vary, e.g., in the case where the disc(s) and/or filter(s) are not planar (for example, two conical surfaces that point towards or away from each other). In other words, the fluid filtration gap can vary radially. Such variation may be useful to help maintain constant average shear stress as feed viscosity increases as a result of concentrating one or more species (e.g., as in dewatering).

The speed of rotation affects the flux: higher rotation rates increase the cleaning action and lower rotation rates decrease the cleaning action. Any speed of rotation may be used that is consistent with the design of the equipment and the shear-sensitivity of the fluid being processed. The speed will usually be from 50 to 2000 rpm, desirably from 100 to 1500 rpm, preferably from 100 to 1200 rpm, and most preferably from 100 to 1100 rpm. Values outside the range of 50 to 2000 rpm may be used provided the benefits of this invention can still be achieved.

Other variables affecting the performance of the device of this invention include, e.g., the number of spiral grooves on the surface, the length, width, and depth of the grooves, their cross-sectional shape, the smoothness of the surfaces defining the filtration gap, and the parameters defining fluid rheology, including fluid viscosity, density, whether it contains particles (e.g., cells), and the size, shape, and concentration of those particles. As explained in U.S. Pat. No. 5,143,630, the angle subtended by a spiral groove (angle Y in FIG. 1 of that patent) and the curvature of the groove (relating to angle T in FIG. 2 of that patent) also affect performance.

Still other variables affecting the performance include the size, shape, and location of any retentate flow restriction means, the number, size, shape, and location of any retentate flow directing means, and whether some or all of the retentate effluent passing through the restriction means is recycled to the fluid filtration gap(s) and, if so, how that is accomplished.

With this background, we turn to the accompanying drawings, which illustrate various embodiments of the present invention.

With reference to FIGS. 1–4, rotary disc filtration device 30 comprises first plate 32, second plate 34, motor 36, shaft 38 having longitudinal axis 40, sleeve 42, two filter members 44, and rotary disc 46. Nut 48 at bottom of shaft 38 locks disc 46 to shaft 38. There are two fluid filtration gaps 56, which are parallel to each other. Each gap is defined by filter 50, which rests on circular plate 52 (which is the major part of filter member 44), and the corresponding oppositely disposed major face of disc 46.

Each filter member 44 has circumferential peripherally located lip 68, which projects above and below plate 52 of filter member 44. The two lips 68 on the adjacent filter members meet along a circular path that is radially distant from longitudinal axis 40. Compressible member (e.g., O-ring) 54 lies along that circular path and provides a substantially fluid-tight seal between the two lips 68. Alternatively, lip 68 on one filter member can be designed to nest within an adjacent filter member to provide a barrier or fluid-tight seal to restrict the retentate flow. The nesting mechanism may also be used to aid in aligning the filter members in the proper configuration during assembly of the filter member/disc assemblage or during assembly of a cartridge of filter members (described below). A compressible member (e.g., the O-ring) need not be used.

During normal operation, rotation of disc 46 will cause circulation of fluid within each fluid filtration gap 56. The varying pressure differences across (perpendicular to) plates 52 as a function of radial distance from longitudinal axis 40 will tend to cause plates 52 to deform, which in turn will cause the width of the fluid filtration gaps to vary radially. Ribs 58 (also see FIG. 2) tend to prevent this flexing (deformation) of plates 52 and thereby tend to maintain relatively constant fluid filtration gap widths. Alternatively, ribs may project radially from the sleeve to thereby limit deformation (flexing) of the filter members.

Drive column 60, which is part of shaft 38, is connected at its upper end to the rotor of motor 36 and is fixedly attached at its lower end to the rest of shaft 38. Annular gap 66 lies between shaft 38 and sleeve 42. Because sleeve 42 is centered with respect to the longitudinal axis of rotation of shaft 38 (i.e., axis 40) and because upper filter member 44 is connected to and centered with respect to the sleeve, the topmost filter member is centered with respect to the axis of rotation of the shaft and disc. The lower filter member is aligned with and connected to the upper filter member and through its connection to the upper filter member is connected (indirectly) to sleeve 42. Therefore both filter members are connected to the "first member," which comprises plates 32 and 34. Sleeve 42 does not rotate. Thus, the filter members remain stationary and the disc rotates with respect to them when motor 36 rotates shaft 38 on which the disc is fixedly mounted. The rotatable suspension of the rotating member (the disc) from the "first member" is indicated by reference numeral 35 and is above the normal level of the fluid to be filtered when device 30 is placed in the body of fluid to be filtered.

Rotatable suspension 35 is for convenience depicted in FIG. 1 and the other figures as a rotary bearing mounted in a plate (here, second plate 34); however, the rotatable suspension will often (and sometimes preferably) be the rotary bearing or bearings in the gear box, motor, or other motive means that rotate drive column 60 (which is part of shaft 38) and there will be no rotatable suspension in any of the plates (i.e., the drive column or shaft will pass through a hole in the plates without any bearing being located at that point).

Holes 43 in the sidewall of sleeve 42 (typically four holes, only two of which are shown, but more or less may be used) allow fluid to flow into and/or out of gap or annular region 66 between sleeve 42 and shaft 38 from and/or to the body of fluid in which the device is immersed. Annular region 66 is in fluid communication with upper fluid filtration gap 56 and, via means discussed below, is also in fluid communication with lower fluid filtration gap 56.

Centrally located circular opening 64 in each of filter members 44 is defined by its inner rim 62. Shaft 38 extends through opening 64 in the upper filter member 44, and opening 64 in lower filter member 44 allows the fluid to be filtered to enter the upper and lower fluid filtration gaps 56. Fluid entering through opening 64 in the bottom filter member flows readily into the lower fluid filtration gap 56. Holes (not shown) in disc 46 connecting the two faces of the disc allow fluid to pass from the lower fluid filtration gap into the upper fluid filtration gap and from the upper gap to the lower gap. The annular region between the periphery of disc 46 and the inner surface of the "inner wall" formed by lips 68 on the two filter members 44 also allows fluid from the lower filtration gap to flow upward and fluid from the upper filtration gap to flow downward. The holes connecting the two faces of the disc are generally located near the central portion of the disc, although some or all of them may be located radially more distant.

Figure 2:
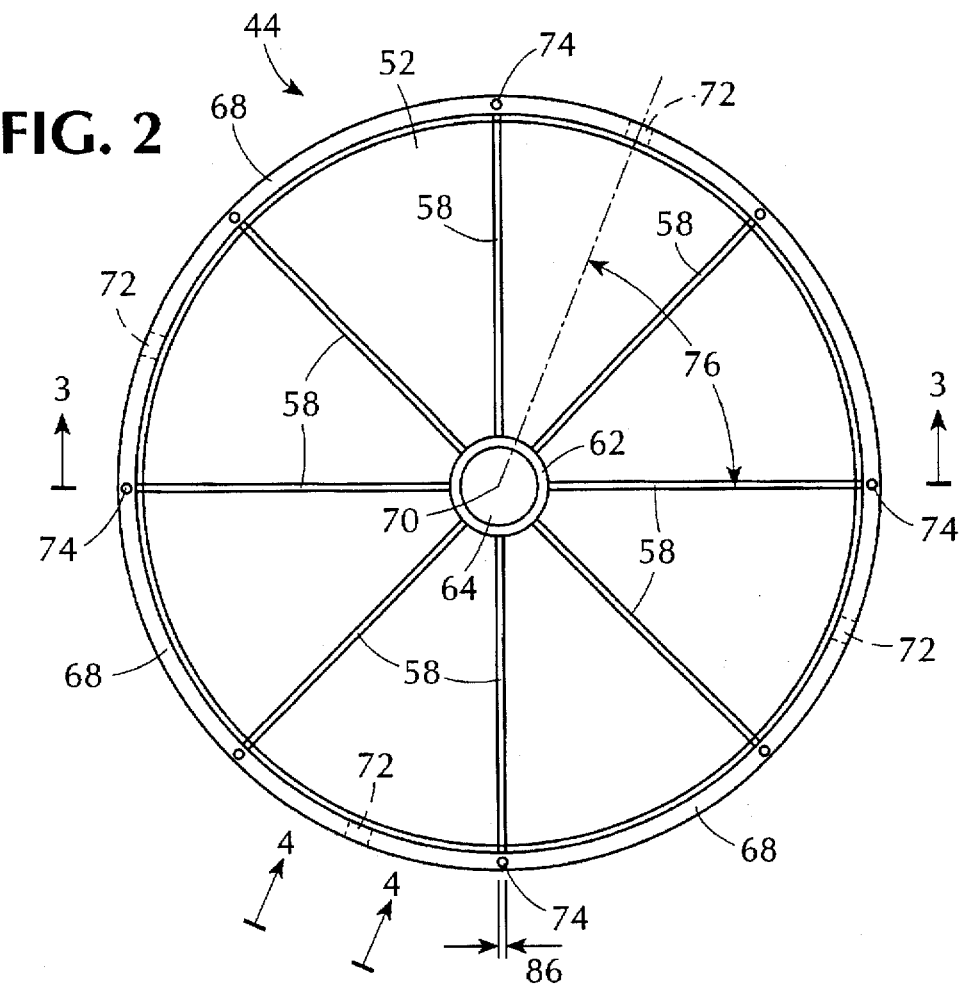
FIG. 2 is a plan view of the upper filter member of FIG. 1.

FIG. 2 is a top plan view of the upper filter member 44 of rotary filtration device 30. Opening 64, which is defined by inner rim 62, has center 70, which coincides with longitudinal axis 40 of shaft 38. The lower filter member 44 is a mirror image of the upper filter member 44. Semicircular openings 72 in the upper filter member are aligned with identical openings 72 in the lower filter member to form four circular openings in the "inner wall" formed when the two filter members lie adjacent to one another with compressible member 54 in between as shown in FIG. 1. The four openings formed by the matching semicircular openings 72 (see also FIG. 4) in peripheral lips 68 when the two filter members lie adjacent one another in the correct position allow retentate to leave fluid filtration gaps 56 (see FIG. 1). There may be a gap in compressible member 54 at each of the four circular openings formed by semicircular openings 72 so that the four circular openings are not partially blocked by compressible member 54 (which would otherwise horizontally bisect them).

With reference to FIG. 1, inner rim 62 of upper filter member 44 is attached to sleeve 42. That attachment may be made using any suitable semi-permanent fastening means (for example, pins, bolts, or screw threads) or any permanent fastening means, if desired (e.g., adhesive), although semi-permanent fastening means are preferred so that the upper filter member can be detached from the sleeve. Lower filter member 44 is maintained adjacent to upper filter member 44 with openings 72 in the two filter members aligned properly by bolts (not shown) that pass through corresponding bolt holes 74 located in lip 68 of each of the two filter members (see FIG. 2). The four openings 72 in each of the two filter members are evenly spaced around peripheral lip 68. The eight ribs 58 are also evenly spaced around the filter member. Each of the eight ribs is 45° away from each of its two adjacent ribs, and angle 76 (FIG. 2) is 67.5 degrees.

Figure 3:
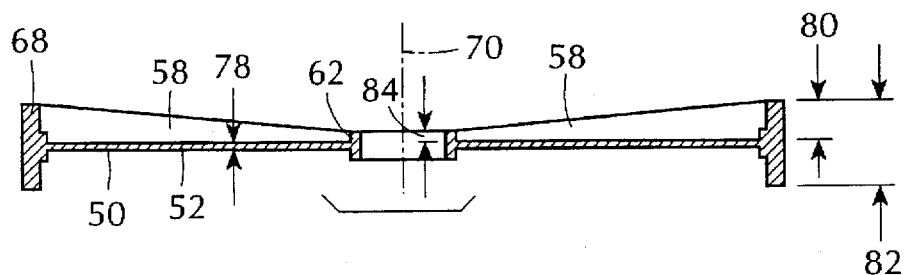
FIG. 3 is a cross-sectional view taken along line 3—3 of FIG. 2.

One embodiment of the device of FIG. 1 has the following approximate dimensions. The nominal filter area of the device of FIG. 1 is approximately 2 square feet (approximately 0.19 square meters). In FIG. 3, dimension 78 (the thickness of plate 52) is approximately 0.125 inches (approximately 3.2 millimeters). Dimension 80 (the height of lip 68 above the top of plate 52) is 0.75 inches (approximately 19.1 millimeters), and the lip extends as far below plate 52 as it extends above plate 52. Thus, the total height of lip 68 (dimension 82 in FIG. 3) is 1.625 inches (approximately 41.3 millimeters). The height of inner rim 62 above the top of plate 52 (dimension 84), is 0.188 inches (approximately 4.8 millimeters).

The diameter of filter member 44 is 15 inches (approximately 381 millimeters). The width of lip 68 is approximately 0.313 inches (approximately 7.9 millimeters). The outer diameter of inner rim 62 is 2 inches (approximately 50.8 millimeters), and opening 64 defined by inner rim 62 is 1.5 inches (approximately 38.1 millimeters) in diameter, making the thickness of the wall of the inner rim 0.25 inches (approximately 6.4 millimeters). Opening 72 has a radius of 0.25 inches, making the circular opening when the two filter members are properly aligned and joined together (as in FIG. 1) 0.5 inches (approximately 12.5 millimeters) in diameter. The thickness of ribs 58 (dimension 86 in FIG. 2) is 0.125 inches (approximately 3.2 millimeters).

Figure 7:
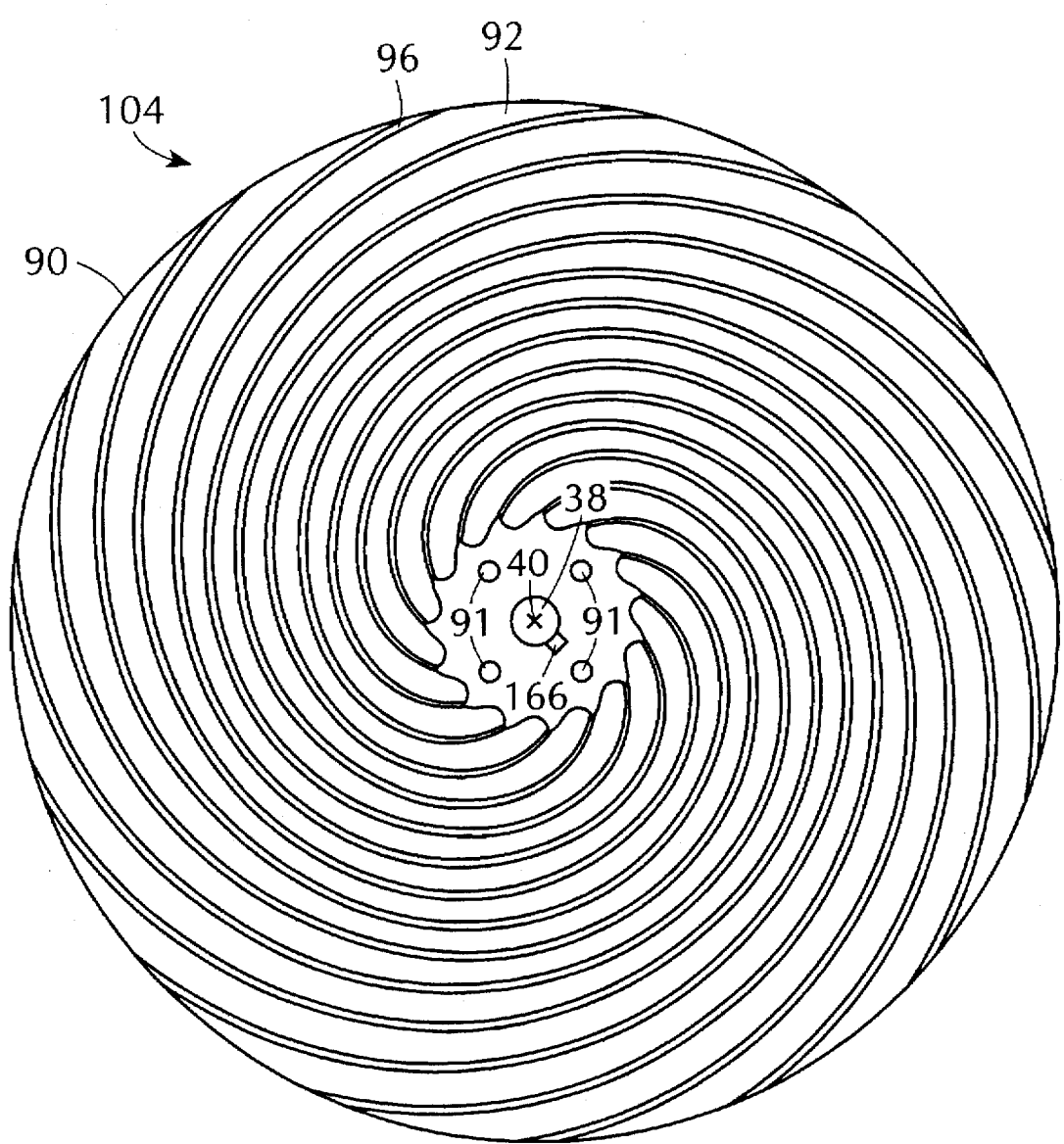
FIG. 7 is an enlarged plan view of the top major face of the disc of FIG. 1.

FIG. 5 shows bottom face 106 of disc 46 of FIG. 1, FIG. 6 is a cross-sectional view of that disc, and FIG. 7 shows top face 104 of that disc. Disc 46 having rim 90 is attached to the bottom of shaft 38 (FIG. 1) by nut 48. Center 102 of disc 46 coincides with center 70 of each of the two filter members 44 and longitudinal axis 40 of shaft 38 (FIGS. 1 and 2) and has four through-holes 91, which fluidly connect the two faces of the disc, and keyway 166, which coincides with key 164 (see FIG. 16). Bottom face 106 and top face 104 each have 15 equally spaced spiral grooves 52 spaced 24° apart. Dotted line 94 indicates the bottom of one of the spiral grooves, which are separated from each other by lands 96. Spiral grooves 92 terminate at one end at rim 90 and at the other end at ungrooved central portion 98. Disc 46 has an outer diameter of 14 inches (approximately 355.6 millimeters), is generally symmetrical about mid-plane 108 (with one major exception noted below), and its thickness (dimension 110 in FIG. 6) is 0.625 inches (approximately 15.9 millimeters). The grooves are approximately 0.125 inches wide at the surface of each face (approximately 3.2 millimeters) and are approximately 0.0625 inches (approximately 1.6 millimeters) deep.

One major difference between the two faces of disc 46 is that cavity 100 terminates before reaching top face 104 of disc 46, otherwise nut 48 would not be able to secure disc 46 to the bottom of shaft 38. Cavity 100 for nut 48 is 0.547 inches (approximately 13.9 millimeters) deep measured from the bottom face.

Figure 8:
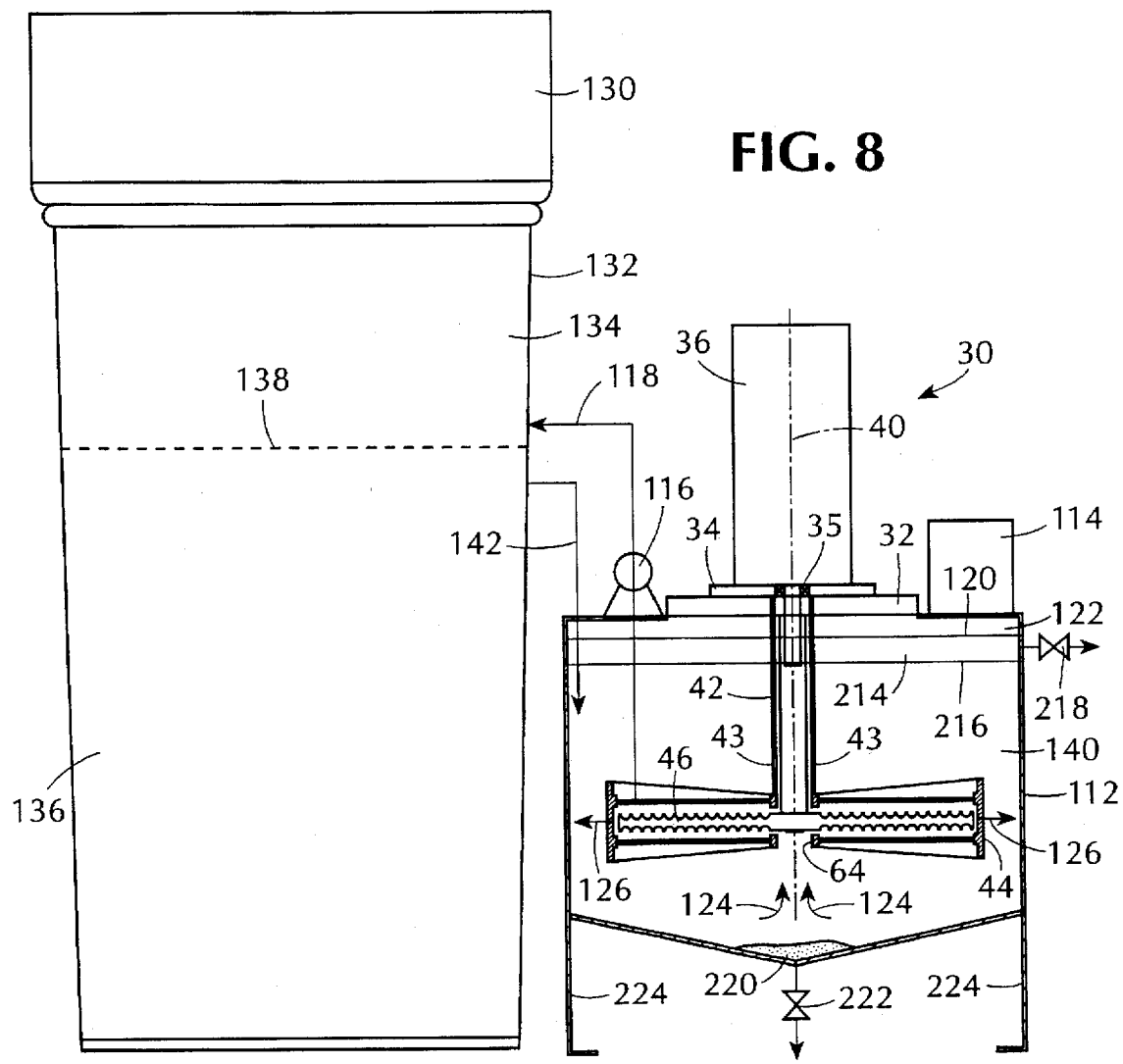
FIG. 8 is an elevational view of a aqueous cleaner parts washing system incorporating the apparatus of FIG. 1.

FIG. 8 shows device 30 used inside vessel 112, which together comprise the separation sub-system of a parts washing system. The parts washing system also comprises parts washer 128, which itself comprises wash tank 130 and drum 132. In the separation sub-system, first plate 32 and second plate 34 together comprise the "first member" in accordance with both of the considerations discussed above. With respect to the first consideration, removal of plates 32 and 34 together from the top of vessel 112 would remove disc 46 and filter members 44 together. With respect to the second consideration, disc 46 and filter members 44 are suspended by cantilever suspension from plates 32 and 34. That is because disc 46 is fixedly attached to the bottom of rotatable shaft 38, which in turn is fixedly attached to the bottom of drive column 60, which is part of shaft 38 (see FIG. 1), and because lower filter member 44 is fixedly attached near its outer rim to upper filter member 44 by bolts passing through bolt holes 74, the lower end of non-rotating sleeve 42 is attached to inner rim 62 of upper filter member 44, and the upper end of sleeve 42 is non-rotatably mounted to plates 32 and 34. Rotatable suspension means 35 is above uppermost liquid level 120 in the vessel.

Control unit 114 sits atop the separator, as does permeate pump 116. Vessel 112 stands on legs 224 and has a conical bottom so that solids present in the quiescent zone (outside the filter members) in body 140 of the feed fluid that settle can fall to the central part of the conical bottom and be withdrawn. Those solids are denser than the average density of fluid 140 in the vessel. Similarly, materials less dense than the body of feed fluid 140 are allowed to rise to the top of the vessel by the relative quiescence of the fluid in this regime outside the two filter members. As explained below, the relative quiescence of this fluid is attributable to the "inner wall" around the fluid filtration gaps formed by lips 68 carried by filter members 44 (see FIG. 1).

Parts washer 128 comprises wash tank 130 sitting atop drum 132. Parts that have been machined (not shown) are often covered with cutting oil, dirt, and metal filings. Those parts are placed in wash tank 130, where they are contacted with a stream of cleaning solution from a nozzle (not shown) above tank 130. Spent cleaning solution (containing the oil it has removed from the parts, the dirt, and the metal filings) runs down through openings (not shown) in the bottom of wash tank 130 into drum 132. When level 138 of liquid 136 in drum 132 below headroom 134 rises high enough, stream 142 of spent solution flows by gravity into vessel 112.

Figure 9:
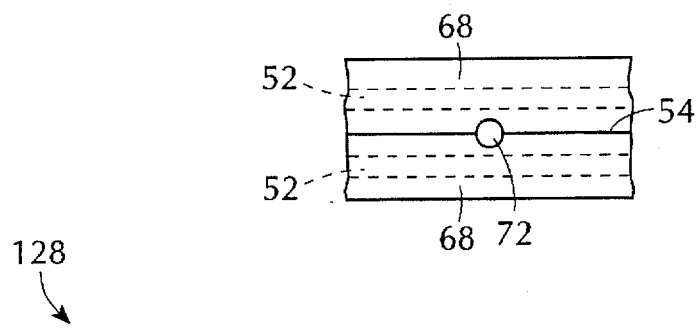
FIG. 9 is an enlarged elevational detail view of the two filter members of the device of FIG. 8.

Because of environmental concerns, the cleaning solution is desirably an aqueous cleaning solution, e.g., an aqueous alkaline cleaning solution. In vessel 112 the feed fluid, containing cleaners in a water solvent and the materials removed from the parts in wash tank 130, flows upward (as shown by arrows 124) through opening 64 in the bottom of the lower filter member 44 and enters the fluid filtration gaps in the manner previously described. Feed fluid from the body of fluid to be filtered may also enter the fluid filtration gap through ports 43 in sleeve 42. The filters are desirably Membrex, inc.'s UltraFilic® membranes, which reject hydrophobic materials (e.g., oil) to a high degree. Dirt, oil, and metal filings do not pass through filters 50 (FIG. 1), but some of the aqueous cleaning solution does and may be collected in a manner to be described and pumped by permeate pump 116 back to drum 132 as permeate stream 118. Retentate leaves the regime of intensive mixing through the circular holes formed by the four pairs of semicircular openings 72 in the upper and lower filter members (FIG. 9), as shown by retentate flow arrows 126. Thus, retentate leaves the regime of intensive mixing/high shear and flows through openings 72 into the quiescent region outside the filter members where flotation and settling can occur because of the relative quiescence. In other words, the "inner wall" formed by the adjacent and aligned lips 68 of the two filter members isolates to a substantial degree the regime of intensive mixing/high shear from the rest of the body of fluid in vessel 112 (with the help of the two filter members, which provide upper and lower boundaries for the region of intensive mixing/high shear). The retentate exiting through openings 72 mixes with the rest of body 140 of feed fluid. This retentate effluent contains dirt, oil, and metal filings that were rejected by the filters, as well as the water solvent and water-soluble cleaners that also did not pass through the filters. Instead of the retentate exiting through openings 72 mixing with the rest of the feed fluid in the manner described, piping (not shown) may be used to conduct (recycle) some of all of that retentate back to the fluid filtration gaps, e.g., by being fed to annular gap 66 through one or more of ports 43.

In the zone of relative quiescence, the oil, which is less dense than the average density of the liquid in vessel 112, floats to the top of the liquid in vessel 112 and forms oil-rich layer 214. That layer is defined at its bottom by oil layer/ water layer interface 216 and at its top by upper liquid level 120, which itself is below gas (e.g., air) headroom 122. Valve 218 when open allows the oil-rich layer to be withdrawn. Dirt and metal filings fall to the bottom of the tank and slide down to the central portion of the bottom of the tank. The resulting collection of solids 220 may be withdrawn through valve 222. Rotatable suspension 35 of the disc is above uppermost liquid level 120 of the fluid in the body of fluid to be filtered.

The width of the annular region between the inside of the vessel sidewall and the outside of the continuous "inner wall" formed by lips 68, the size of opening 64, the distance from the bottom of the tank to opening 64, and other dimensions desirably are chosen to allow at least some of the dirt and metal filings to fall to the bottom of vessel 112 without being drawn up through opening 64. Accordingly, the distance from opening 64 in the lower filter member to the bottom of vessel 112 (where solids 220 collect) will generally be at least 6 inches (approximately 152 millimeters) for a device having 2 square feet (approximately 0.19 square meters) of filter surface. For that device, the sidewall of vessel 112 will be about 12 inches (approximately 305 millimeters) high and vessel 112 will be about 18 inches (approximately 457 millimeters) in diameter.

Figure 10:
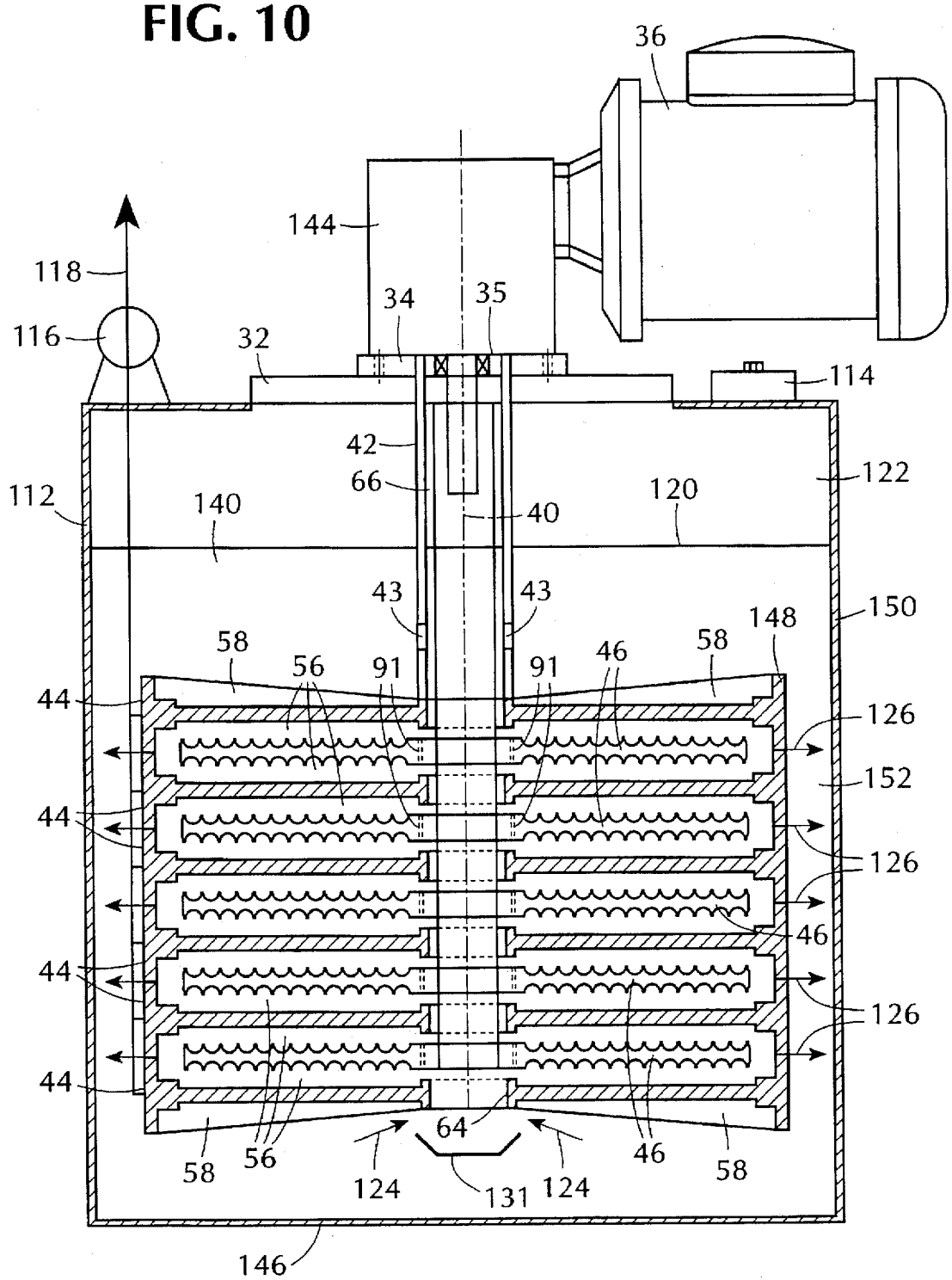
FIG. 10 is an elevational view of another device of this invention, which device utilizes a plurality of interleaved rotary discs and filter members.

In FIG. 10, the removable top portion ("first member") comprising plates 32 and 34 on which motor 36 and gear box 144 are mounted, the six filter members 44, and the five discs 46 are removable from the rest of the device when plates 32 and 34 are unfastened from the rest of the housing. Vessel 112 has bottom 146 and sidewall 150. The bottom face of topmost filter member 44 and the top of the uppermost disc 46 define the topmost fluid filtration gap 56 of the ten fluid filtration gaps in this device. The capacity of this device has been increased over that of the device of FIG. 8 by adding four additional centrally located filter members 44 and four additional discs 46, all sandwiched between the uppermost filter member 44 and the bottommost filter member 44.

The four centrally located filter members 44 do not have ribs 58 because they do not need them. Rotation of the five discs 46 tends to cause only the uppermost filter member and the lowermost filter member to flex, and thus stiffening ribs 58 are required on only those two filter members. The four centrally located filter members tend not to flex because the pressure on both sides of plate part 52 of each of those four centrally located filter members is essentially balanced (there are rotating discs and fluid filtration gaps on both sides of those four centrally located filter members).

As with the device of FIG. 1, only the topmost filter member is connected (non-rotatably connected at its centrally located inner hub) to sleeve 42 surrounding the shaft driven by the motor. The other five filter members are bolted to the topmost filter member and are thereby indirectly connected to the sleeve, which itself is non-rotatably mounted to the removable top plates of the device. Annular gap 66 is fluid connected to all of the ten fluid filtration gaps in the following manner. It is directly fluidly connected to the uppermost of the ten fluid filtration gaps and that uppermost gap is in turn fluidly connected to the other nine gaps through holes 91 in the five discs and through the clearance around the periphery of each disc.

Gear box 144 is mounted on top of those plates and, as with the device of FIG. 1, is connected to the shaft to which all five discs 46 are connected. Accordingly, removal of the central top portion of the device removes all of the discs and all of the filter members at the same time from vessel 112.

Rotatable suspension 35 of the rotatable members (the discs) is above the highest liquid level 120 in vessel 112. Because the liquid level is kept below rotatable suspension 35 (e.g., bearings) for the rotatable shaft, there is no need for a rotary seal to be employed in the device. That reduces initial cost and maintenance, as well as eliminating possible leakage and contamination caused by the seal or its failure.

As in the device of FIG. 8 and as indicated by retentate flow arrows 126, retentate flows out of the continuous cylindrical "inner wall" 148, which is formed by the adjacent connected six peripheral lips of the six filter members. Retentate leaving the high-flow/high-shear regime inside inner wall 148 flows out into annular region 152 defined by the inside of the sidewall 150 of vessel 112 and the outside of inner wall 148. As described above, some of all of that exiting retentate may be recycled to the fluid filtration gaps, e.g., by being piped to one or more of ports 43.

Switch 114 controls the device, pump 116 withdraws permeate stream 118 from the assemblage of filter members (which are fluidly connected in any suitable manner), and flow arrows 124 indicate the flow of feed fluid from body of feed fluid 140 through opening 64 in the bottommost filter member 44.

As with the device of FIG. 1, holes 91 may be provided in some or all of the discs 46 to allow feed fluid to pass upward into the fluid filtration gaps 56. Alternatively or additionally, the rotatable shaft may have vertical fluid passageways in it that allow feed fluid to flow along the length of the shaft and openings in the shaft (e.g., at the height of each fluid filtration gap) could allow feed fluid in those passageways to flow into the fluid filtration gaps. Any other suitable means for placing feed fluid into the fluid filtration gaps may be used.

Anti-swirl baffle 131, which is located below opening 64 in bottommost filter member 44, acts to break up any swirling flow pattern that has developed in the body of feed fluid in the vessel. Swirling fluid entering the fluid filtration gaps can carry with it entrained gas and/or solids and decrease filtration efficiency. The anti-swirl baffle may be connected to the bottommost filter member, e.g., by rods, or to the bottom of the vessel. The design of the anti-swirl baffle is not critical and any design may be used that allows achieving the goal of significantly reducing or eliminating swirling while not significantly reducing inflow through opening 64. Use of the anti-swirl baffle in combination with the recycle of retentate to annular gap 66 inside the sleeve supporting the filter members can result in the body of feed fluid in the vessel being substantially quiescent, thereby allowing any desired flotation and settling to occur and also preventing and substantial entrainment of gas in the feed liquid.

Figure 11:
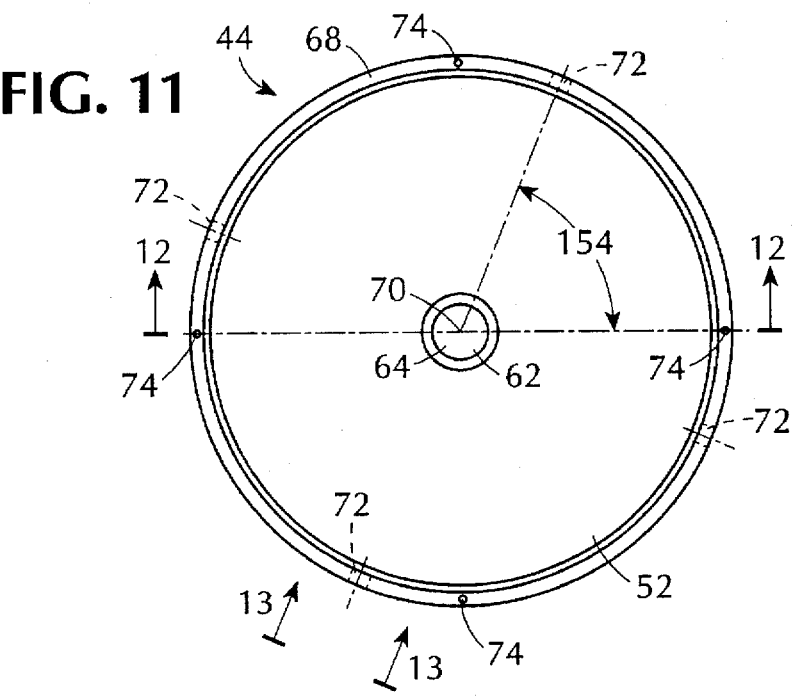
FIG. 11 is a plan view of a center filter member of the device of FIG. 10.
Figure 12:
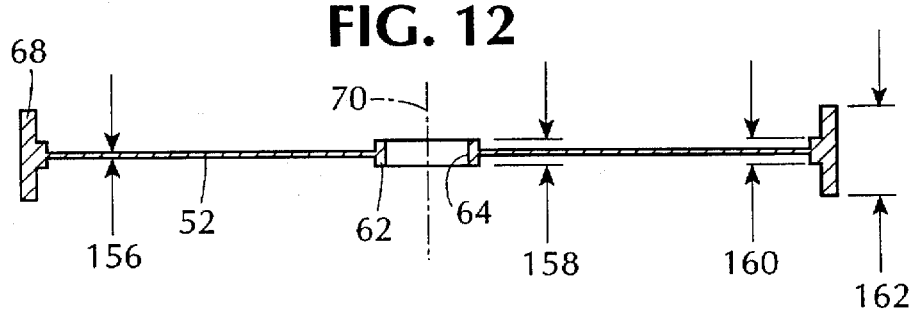
FIG. 12 is a cross-sectional view of the filter member of FIG. 11 taken along line 12—12 of FIG. 11.
Figure 13:
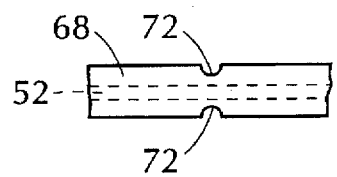
FIG. 13 is a sectional elevational view taken along line 13—13 of FIG. 11.

FIGS. 11, 12, and 13 show one of the four centrally located filter members 44 of the device of FIG. 10. These four centrally located filter members have four equally spaced openings 72, angle 154 is 67.5°, the outer diameter of the filter member is 15 inches (approximately 381 millimeters), the width of plate 52 of the filter member (dimension 156) is 0.125 inches (approximately 3.2 millimeters), the height of inner rim 62 (dimension 158) is 0.5 inches (approximately 12.7 millimeters), and the height of retentate restriction means (lip) 68 (dimension 162) is 1.625 inches (approximately 41.3 millimeters). At the place of attachment of lip 68 to plate 52 of filter member 44, a circumferential enlargement is provided for a number of reasons, including strength. The height of that circumferential enlargement (dimension 160) is 0.5 inches (approximately 12.7 millimeters).

Figure 4:
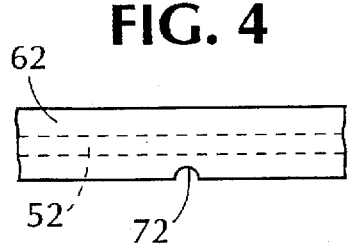
FIG. 4 is a sectional elevational view taken along line 4—4 of FIG. 2.

In these four centrally located filter members, lip 68 has semicircular openings 72 at both its top and bottom, whereas lip 68 of the topmost and bottommost filter members has semicircular openings 72 along just one edge of the lip (compare FIGS. 4 and 13). That is because each of the four centrally located filter members 44 defines two fluid filtration gaps but the topmost and bottommost filter members 44 each define only one fluid filtration gap (one gap is defined in part by the lower face of the uppermost filter member and the other gap is defined in part by the upper face of the lowermost filter member). The upper major face of the uppermost filter member and the bottom major face of the bottommost filter member do not face (are not oppositely disposed from) any rotary discs and therefore those major faces do not help define fluid filtration gaps from which to allow retentate to flow. The upper major face of the uppermost filter member and the bottom major face of the bottommost filter member are in contact with the body of feed fluid.

Figure 14:
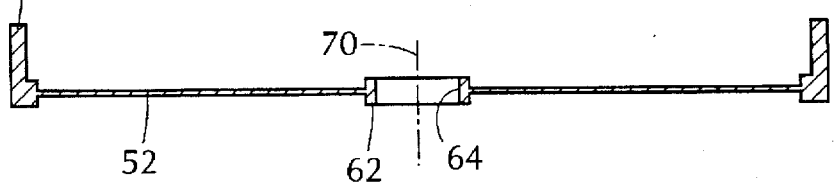
FIG. 14 is a cross-sectional view of an alternative filter member.
Figure 15:
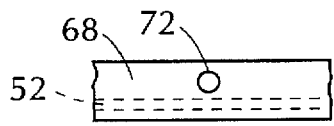
FIG. 15 is a sectional elevational view similar to that of FIG. 13 but for the filter member of FIG. 14.

FIGS. 14 and 15 show an alternative central filter member in which the major portion of circumferential lip 68 projects above the plane of plate 52 rather than being equally above and below the plane of plate 52 as in FIG. 12. With the configuration shown in FIG. 14, circular opening 72 for allowing retentate to leave the regime of high mixing and high shear is contained entirely within lip 68 rather than being a semicircular cut-out as in FIG. 13. A compressible member (e.g., an O-ring) may also be used on the top of each such lip to provide a fluid-tight seal between the lip and the bottom of the adjacent filter member.

Figure 16:
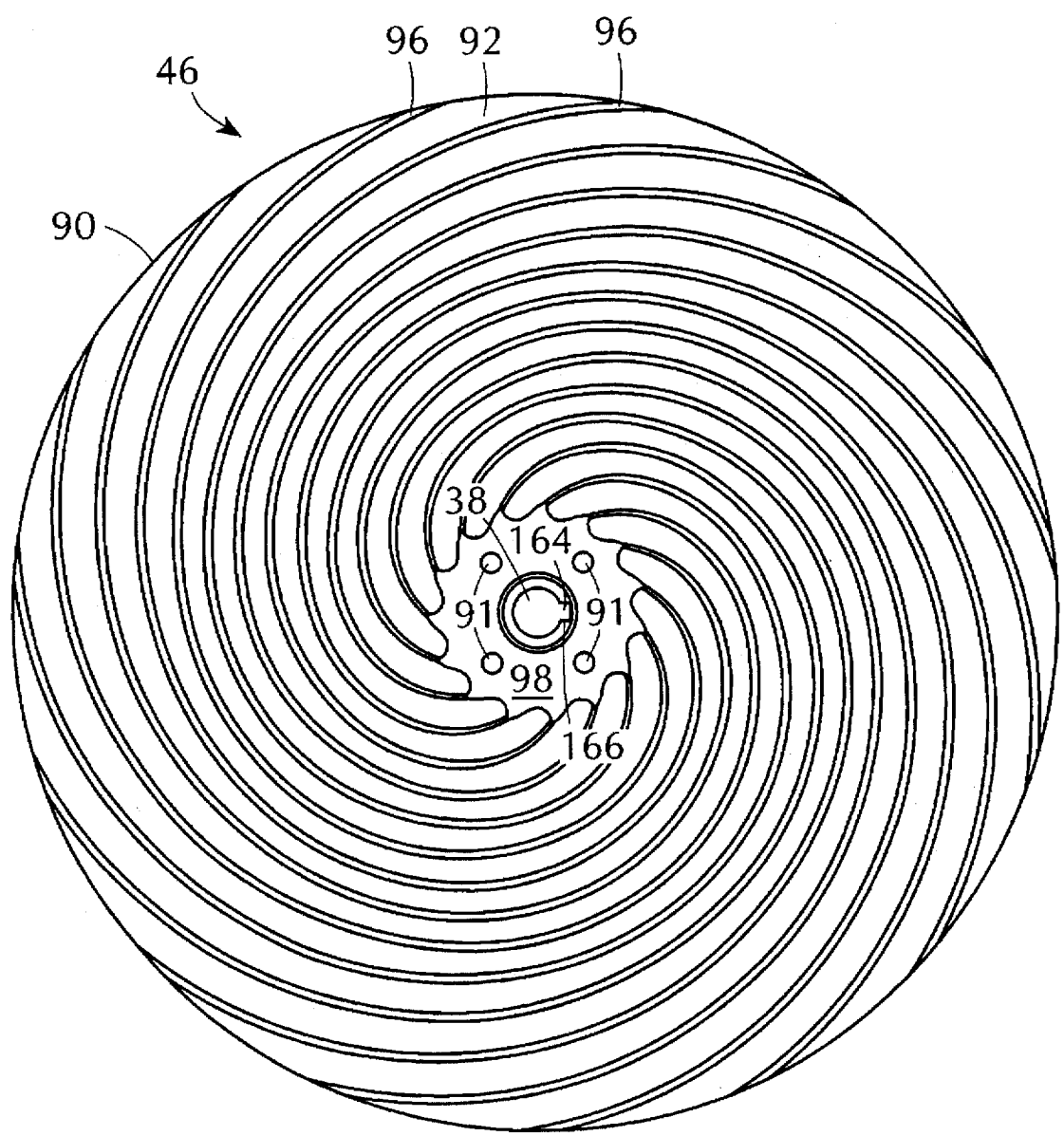
FIG. 16 is an enlarged plan view of a disc of the device of FIG. 10.

FIG. 16 shows disc 46 mounted on shaft 38. Keyway 166 meshes with longitudinal key 164 on shaft 38 to prevent rotation of disc 46 with respect to shaft 38. Thus, key 164 in keyway 166 rotationally locks disc 46 to the shaft in the plane of rotation of the disc. Use of the key and keyway locking means allows disc 46 to be readily slid onto and off of shaft 38 during assembly and disassembly of the interleaved disc/filter member assemblage.

To disassemble the device of FIG. 10, motor 36 and gear box 144 are optionally removed, the permeate collection system is detached from pump 116, and the "first member" (plates 32 and 34) is removed from the top of vessel 112. That removes as a unit the entire assemblage of the interleaved six filter members and five discs from vessel 112. (Depending on the size of the opening covered by the first member and the size and shape of the disc/filter member assemblage, it may be necessary to tilt the assemblage to allow it to be withdrawn from the vessel.) A nut (not shown) analogous to nut 48 in FIG. 1 at the bottom of the rotatable shaft is removed. The bolts that pass through bolt holes 74 to connect the filter members together and sandwich the discs in between the filter members are removed. The bottommost filter member 44 is then detached from the immediately adjacent filter member (just above it in the orientation shown in FIG. 10), the bottom disc is then removed from the shaft, the next higher filter member is then removed from the filter member immediately above it, the next higher disc is then slid from the shaft, etc.

After the lower five filter members 44 and all of the five rotary discs 46 have been removed, the only filter member remaining is the filter member that is uppermost in the orientation shown in FIG. 10. As in the device of FIG. 1, the uppermost filter member 44 is connected to the sleeve surrounding the shaft driven by the motor. After that topmost filter member is removed from the sleeve, only the shaft and sleeve remain attached to the "first member" (comprising the combination of plates 32 and 34). That filter member is connected at its inner rim to the bottom of the sleeve by any suitable means, e.g., by screw threads, bolts, or Cotter pins. The connection will usually be (but need not be) fluid-tight. Alternatively, the filter may be connected indirectly to sleeve 66 at outer rim 44 via one or more cantilevered arms or support members.

In these drawings, the devices depicted are all vertically oriented, it is the topmost filter member that is attached (directly or indirectly) to the "first member," and the topmost member is attached to a sleeve around the shaft that rotates the one or more discs. However, as previously noted, the device need not be vertically oriented. Furthermore, it need not be the first filter member in the assemblage of filter members and discs that is attached to the first member and the one or more filter members need not be attached to such a sleeve.

For example, four rods could be attached to the "first member," with each attached at an angle other than a right angle, and those four rods could be connected to the filter member that is farthest from the "first member." The rods could also be attached to an intermediate (not the farthest or closest) filter member. The other filter members could then be connected to the filter member that is connected by the rods to the "first member," e.g., by bolts passing through aligned holes (e.g., holes 74) in the filter members. It is also possible to have each of the filter members connected directly to the "first member." The filter members may be connected to each other by any suitable means, e.g., the bolts used in bolt holes 74, by latches, by spring locks, by dogs or ears using Cotter pins, or by glues, adhesives, or plastic welding techniques.

The filter members need not touch one another or touch each other to any significant degree (e.g., they need not form a fluid-tight seal). Thus, if retentate flow restriction means (e.g., lips 68) are used, those lips need not touch each other. However, if too large a gap is left between adjacent filter members, the flow of retentate out of the one or more fluid filtration gaps may be too high and the liquid outside the fluid filtration gap(s) may not be quiescent enough for some of the benefits of this invention to be achieved.

Returning to FIG. 10, the lowest disc in FIG. 10 is vertically fixed along the shaft by a nut (not shown), which is analogous to nut 48 in FIG. 1. The top four discs are maintained at the correct height or distance along the shaft by any suitable means, for example, screws, Cotter pins, or splines, and are removed from the shaft or otherwise released to free the respective rotary disc during the disassembly process. Disassembly may be required to replace the filters or for some other reason.

Reassembly of this disc/filter member assemblage proceeds in the reverse order, that is, the topmost filter member is reattached to the sleeve around the shaft, the topmost disc is slid onto the shaft and fixed in place by the appropriate means, the second topmost filter member is positioned next to the topmost filter member and held in place by the bolts passing through holes 74, etc. The nut holding the lowest disc to the shaft is put in place, and the bolts passing through holes 74 are tightened to secure the filter members to one another, to lock them around the discs, and to secure the disc/filter member assemblage to the first member. The permeate collection system is reattached to pump 116, and the entire assemblage connected to plates 32 and 34 (the "first member") is put back on top of vessel 112 and fixed in place. Gear box 144 and motor 36 are reattached, if necessary. Alternative filter member designs (discussed below) may simplify the assembly and disassembly procedures by allowing several filter members to be moved as a unit towards and away from the longitudinal axis of the shaft so that the discs do not have to be removed from the shaft to allow removal of the filter members.

Figure 17:
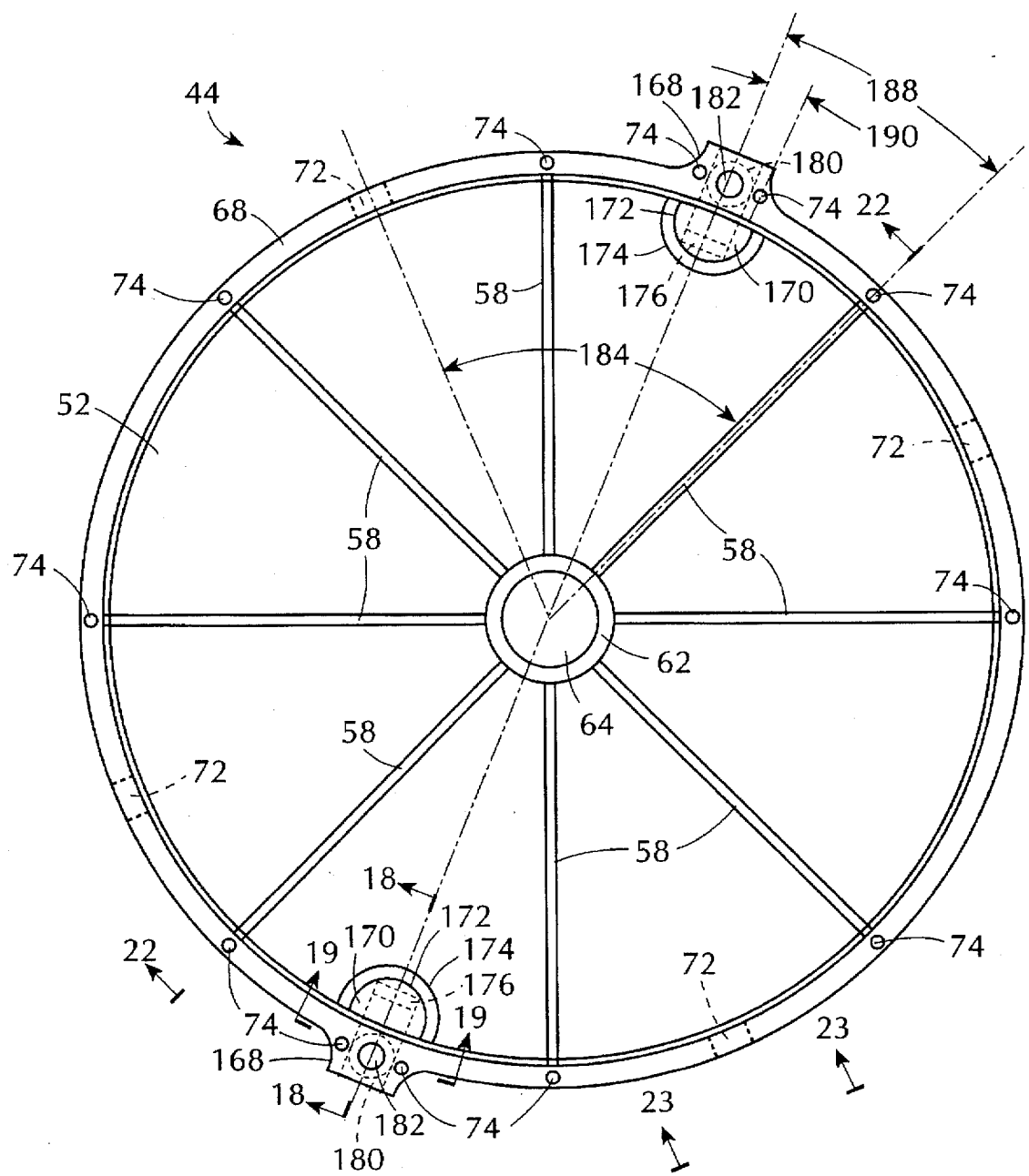
FIG. 17 is a plan view of an alternative filter member.
Figure 22:
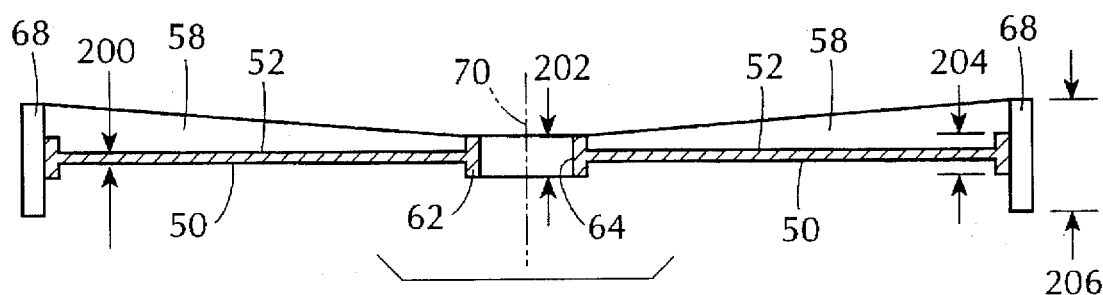
FIG. 22 is a cross-sectional view of the alternative filter member taken along line 22—22 of FIG. 17.

In FIGS. 17–23, filter member 44 is similar to the filter member shown in FIG. 2, the major difference being the addition of two ears 168 and the associated internal permeate collection piping. Disc 44 of FIG. 17 has two raised portions 170 defined by curves 172 and 174. Raised portion 170 allows permeate passageways to be molded or machined into filter member 44 without the filter member losing sufficient structural strength and rigidity (which would otherwise tend to be a problem if filter member 44 is fabricated from plastic, as is usually desirable). Filter member 44 in FIG. 17 is the topmost filter member in a stack of filter members and therefore has stiffening ribs 58 on its top face and no filter on its top face. Accordingly, permeate needs to be collected only from its lower face because only its lower face carries a filter and defines a fluid filtration gap.

Filter 50 and an underlying porous permeate collection mesh (in the form of a sheet), which during filtration lie on the bottom major face of filter member 44, are not shown in FIG. 18. The porous permeate collection mesh lies between filter 50 and plate 52 of the filter member (see also FIG. 1). Therefore, part of the porous permeate collection mesh lies adjacent permeate opening 176 (FIG. 18). Permeate passing through the filter at any point flows into the porous permeate collection mesh and the only two places the permeate can leave the mesh are at the two openings 176 (one in each enlarged portion 170). Permeate from opening 176 passes into permeate passageway 178 and then into permeate plenum 180.

Permeate flows from plenum 180 into riser 182 for collection. Permeate from all of the filter members flows into the elongate passageway formed by aligned individual risers 182. If the filter members of FIG. 17 and a single permeate removal pump 116 are being used, additional piping (not shown in FIG. 10) is used to connect the two elongate passageways formed by the two sets of risers 182 for permeate removal.

Circular recess 186 is provided in the bottom of each ear 168 around permeate riser 182 for an O-ring to provide a fluid-tight seal between adjacent ears to separate permeate from the environment (usually the body of feed fluid to be filtered). There are two bolt holes 74 on either side of O-ring recess 186 for bolts, which bolts when tightened compress the O-rings to insure that the seal between adjacent ears around permeate risers 182 is fluid-tight.

The various dimensions of this filter member of FIGS. 17–23, which has the same outer diameter as the filter members of FIG. 1, are as follows. The outer diameter of the filter member is 15 inches (approximately 381 millimeters), angle 184 is 67.5°, angle 188 is 22.5°, dimension 190 is approximately 0.52 inches (approximately 13.1 millimeters), dimension 192 is approximately 0.375 inches (approximately 9.5 millimeters), dimension 194 is 0.875 inches (approximately 22.2 millimeters), dimension 196 is 0.25 inches (approximately 6.4 millimeters), dimension 198 is 1.125 inches (approximately 28.6 millimeters), dimension 200 is approximately 0.188 inches (approximately 4.8 millimeters), dimension 202 is approximately 0.563 inches (approximately 14.3 millimeters), dimension 204 is also approximately 0.563 inches (approximately 14.3 millimeters), and dimension 206 is approximately 1.688 inches (approximately 42.9 millimeters).

Figure 23:
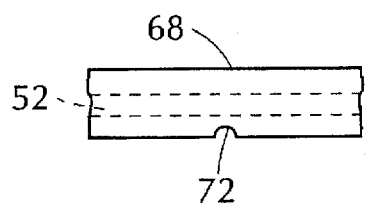
FIG. 23 is a sectional elevational view taken along line 23—23 of FIG. 17.

FIG. 23 is similar to FIG. 4 in that lip 68 extends equally above and below plate 52. Because FIG. 23 depicts a portion of the filter member of FIG. 17, which is the topmost filter member in an assemblage of discs and filter members, opening 72 for the escape of retentate from the fluid filtration gap is provided only in the lower edge of lip 68 (because there is no fluid filtration gap defined by the upper surface of the topmost filter member in the assemblage of discs and filter members).

As previously discussed, the rotation of the one or more rotating members tends to cause the liquid radially distant from (outside or beyond) the periphery of the discs and filter members to swirl in the same direction as the direction of rotation of the one or more rotating members (which are usually one or more discs) and to otherwise be undesirably agitated. Swirling and the other movement imparted to that radially distant liquid and to the liquid axially distant from the outermost filter members is energy inefficient because some of the energy needed to rotate the rotating members is imparted to fluid that is not in any fluid filtration gap. Furthermore, the swirling and other movement of the radially and axially distant liquid (axially distant from the outermost filter members) mixes the body 140 of feed liquid, which tends to prevent flotation of less dense materials for withdrawal and settling of more dense materials for withdrawal. The swirling and other undesirable movement of the radially and axially distant liquid can also draw gases (for example, air) from the headroom above the top of the liquid in the vessel (or above a lake, pond, or other body of fluid in which a device of this invention has been placed) down into the liquid. The thus-entrained gas can then interfere with the filtration process by, for example, becoming trapped in a fluid filtration gap.

Ignoring for the moment other important considerations, completely blocking the flow of retentate out of the fluid filtration gaps would significantly reduce undue agitation (e.g., swirling) and resulting problems. However, for reasons explained above, it is also desirable in most instances to allow retentate to leave the fluid filtration gap. Movement of retentate out of the fluid filtration gap tends to carry along any entrained solids, gel-forming material, and other potentially occluding substances that could significantly blind or clog the filter or otherwise interfere with the filtration process.

A solution according to this invention that satisfies these conflicting requirements is to sufficiently control the outward flow of retentate out of the assemblage of discs and filter members. Thus, adding lip 68 with openings 72 solves the problem to a large extent but the rotational component of liquid leaving radially oriented openings 72 may still impart unacceptable rotational and other movement to liquid outside the disc/filter member assemblage. Accordingly, this invention provides additional means to further solve the problem, which are described in connection with FIGS. 24–27.

Figure 24:
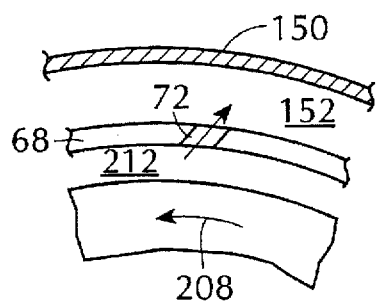
FIGS. 24–27 are enlarged sectional views showing alternative means for allowing retentate to flow from the fluid filtration gap into the annular region between the outer peripheral lip (retentate restriction means) of the filter members and the wall of the vessel containing the body of fluid to be filtered.

FIGS. 24–27 show various means for allowing retentate to flow from the regime of high shear to the radially more distant annular fluid region of relatively less shear. In these figures, arrow 208 indicates the direction of rotation of disc 46. Annular space 212 is the space between the outer periphery of the disc and the inner surface of lip 68 having opening 72. In FIG. 24, retentate flowing from radially closer annular space 212 into radially more distant annular space 152 (between lip 68 and sidewall 150) does not flow in a radial direction but rather is angled back against the direction of rotation of the disc (as represented by arrow 208). Thus, retentate leaving annular region 212 tends to oppose the swirling of fluid in annular space 152 that would otherwise be in the same direction as shown by arrow 208. In another embodiment, two nozzles in the restriction means through which retentate leaves the fluid filtration gap may be oriented so that their effluents flow towards and thereby counteract each other.

Figure 25:
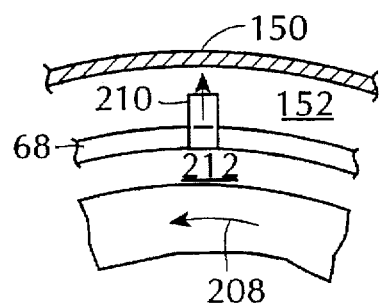

In FIG. 25, retentate nozzle 210 releases retentate from annular region 212 close to the inner surface of wall 150 but still in a direction lying within the plane of rotation of the disc. Releasing the retentate radially but sufficiently close to wall 150 may be sufficient in some cases to substantially reduce the swirling and associated problems.

Figure 26:
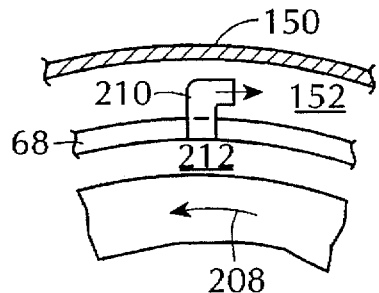

In FIG. 26, nozzle 210 releases the retentate in a direction directly opposite the direction of rotation of the disc.

Figure 27:
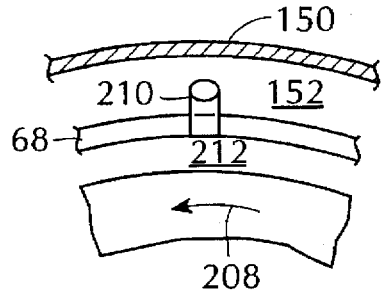

In FIG. 27 the outer end of nozzle 210 is oriented in a direction perpendicular to the plane of rotation of the disc (downward as seen in FIG. 27). Thus, retentate leaving the fluid filtration gap flows downward. That may be useful where flotation but not settling is required.

Various other restriction means and retentate flow directing means may be used for containing the retentate within the region of the fluid filtration gap(s), for isolating that region to the degree desired from a region of relative fluid quiescence, and for releasing the retentate in one or more directions that counteract to the degree desired the swirling and other undesirable movement of the radially and axially distant fluid that would otherwise occur because of rotation of the rotated members.

Figure 28:
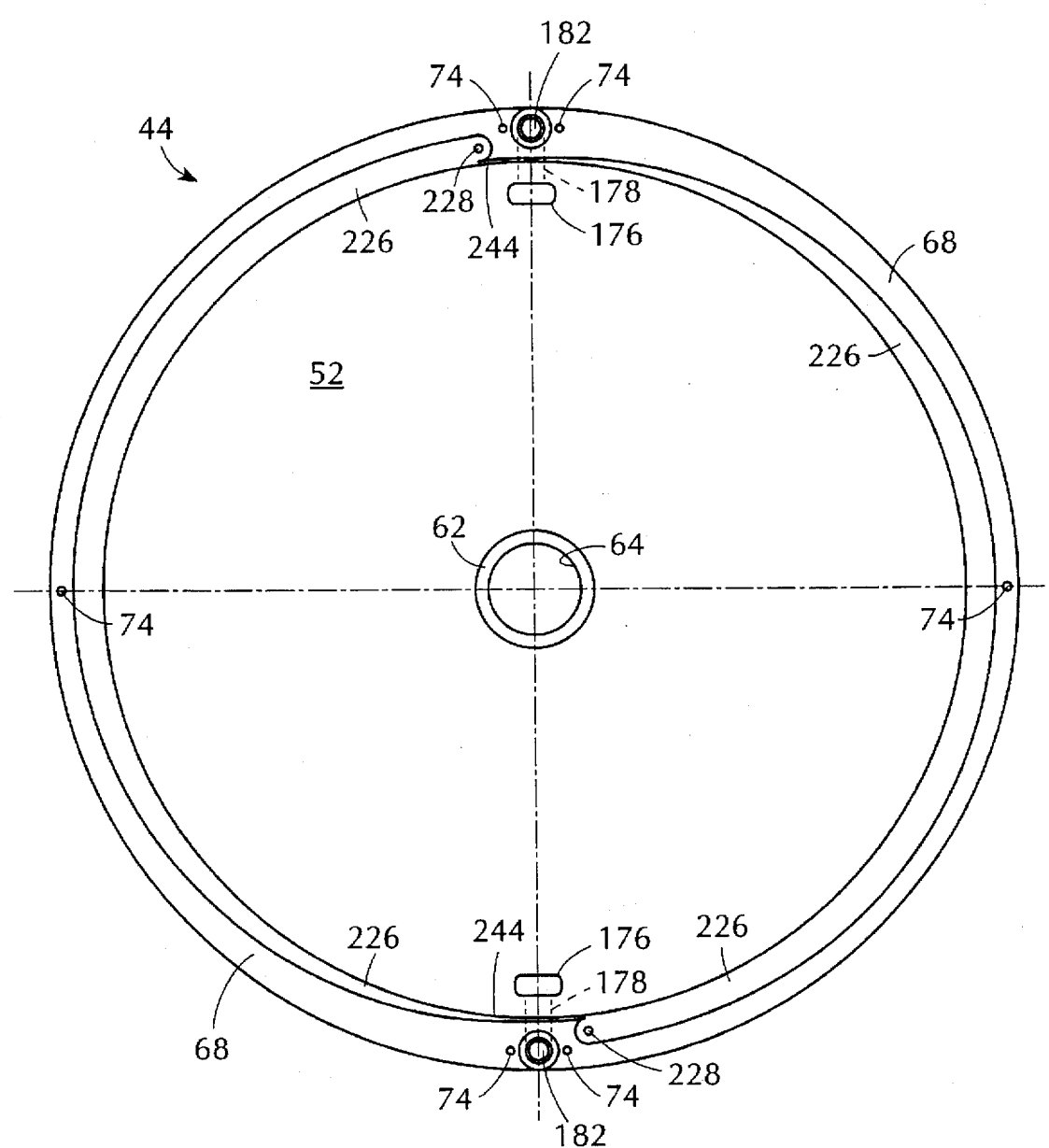
FIG. 28 is a plan view of a preferred filter member, which has internal permeate removal passageways.

FIG. 28 is a plan view of preferred filter member 44, the design of which is similar to the design of the filter member of FIG. 17, but with two major differences. First, in FIG. 28 permeate riser 182 has been moved to a location within the circular periphery of the filter member rather than being located in ear 168 as in FIG. 17. Second, in FIG. 28 retentate riser (retentate flow or removal port) 228 has been added, which allows retentate to flow between filtration gaps within the regime of high shear, i.e., without the retentate's passing into the body of feed fluid in the "outer" vessel (outside of the restriction means). With the filter member of FIG. 17 in a device there is no way for retentate to flow from stage to stage and all retentate exiting the fluid filtration gaps must flow out into the body of feed fluid.

Filter member 44 of FIG. 28 has two elevational planes above the base plane of plate 52, which occupies the largest area of the filter member. The plane (inner rim) indicated by reference numeral 226 has an elevation somewhat above the plane of plate portion 52, is roughly circular, and as seen in FIG. 28 is of varying width. The width varies from being fairly narrow at two points indicated by reference numeral 244 to being several times as wide. Each of the two retentate risers 228 is located at each of the two points of maximum width of inner rim 226.

The top surface of outer rim (lip or restriction means) 68 has a planar elevation above that of inner rim 226, is also roughly circular, and is of varying width. Two permeate risers 182 are oppositely disposed on filter member 44 in the two widest parts of outer rim (restriction means) 68. Permeate flows through the filter (not shown), through any filter support (permeate collection mesh) under the filter, through either of the two permeate openings 176 in plate 52, through permeate passageways 178, and then into permeate risers 182. Each riser 182 is surrounded by a circular gasket and bolts (not shown) pass through bolt holes 74 to maintain adjacent filter members aligned and tightly against one another so that the permeate path is fluidly sealed from retentate (which is present inside the inner wall formed by the restriction means) and from the body of feed fluid (which is outside, i.e., radially distant from) the restriction means).

Figure 29:
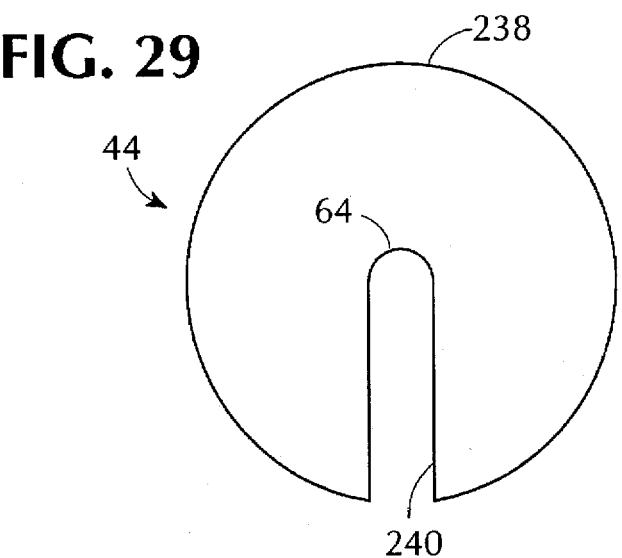
FIG. 29 is a schematic plan view of a preferred filter member, which is generally circular.

FIG. 29 shows a schematic plan view of one possible filter member having generally circular periphery 238 and radial cut-out 240 terminating at its inner end in opening 64. The radial cut-out allows the filter member to be moved in a direction generally perpendicular to the sleeve and shaft on which the discs are mounted, as described in U.S. Pat. No. 5,254,250. Thus, after the first member and suspended disc(s) and filter member(s) are removed as a unit from the rest of a device of this invention, each filter member can be detached from and removed from the assemblage of discs and filter members without having to remove the discs and filter members in alternating sequence as described in connection with FIG. 10. Permeate can be removed using any of the permeate flow schemes previously described or any other suitable scheme (e.g., any of the schemes disclosed in U.S. Pat. No. 5,254,250).

Figure 30:
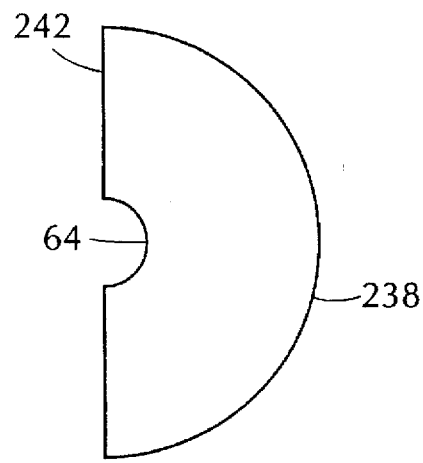
FIG. 30 is a schematic plan view of a preferred filter member, which is generally D-shaped.

FIG. 30 is a schematic plan view of another possible filter member used in the present invention. This D-shaped filter member has generally circular outer periphery 238, centrally located circular cut-out 64, and straight portion 242. Two such D-shaped filter members may be arranged as in FIG. 31 with their straight sides near to or contacting one another (a gap between the two straight sides would allow retentate to flow from stage to stage). This D-shaped configuration also allows each of the filter members to be added to or removed from the assemblage of discs and filter members without having to remove any of the discs from the shaft. Thus, the filter members need not be unitary members as in FIG. 2 and any size and shape may be used to form the filter member surface that supports a filter defining a fluid filtration gap (with its oppositely disposed disc).

Figures 32, 33:
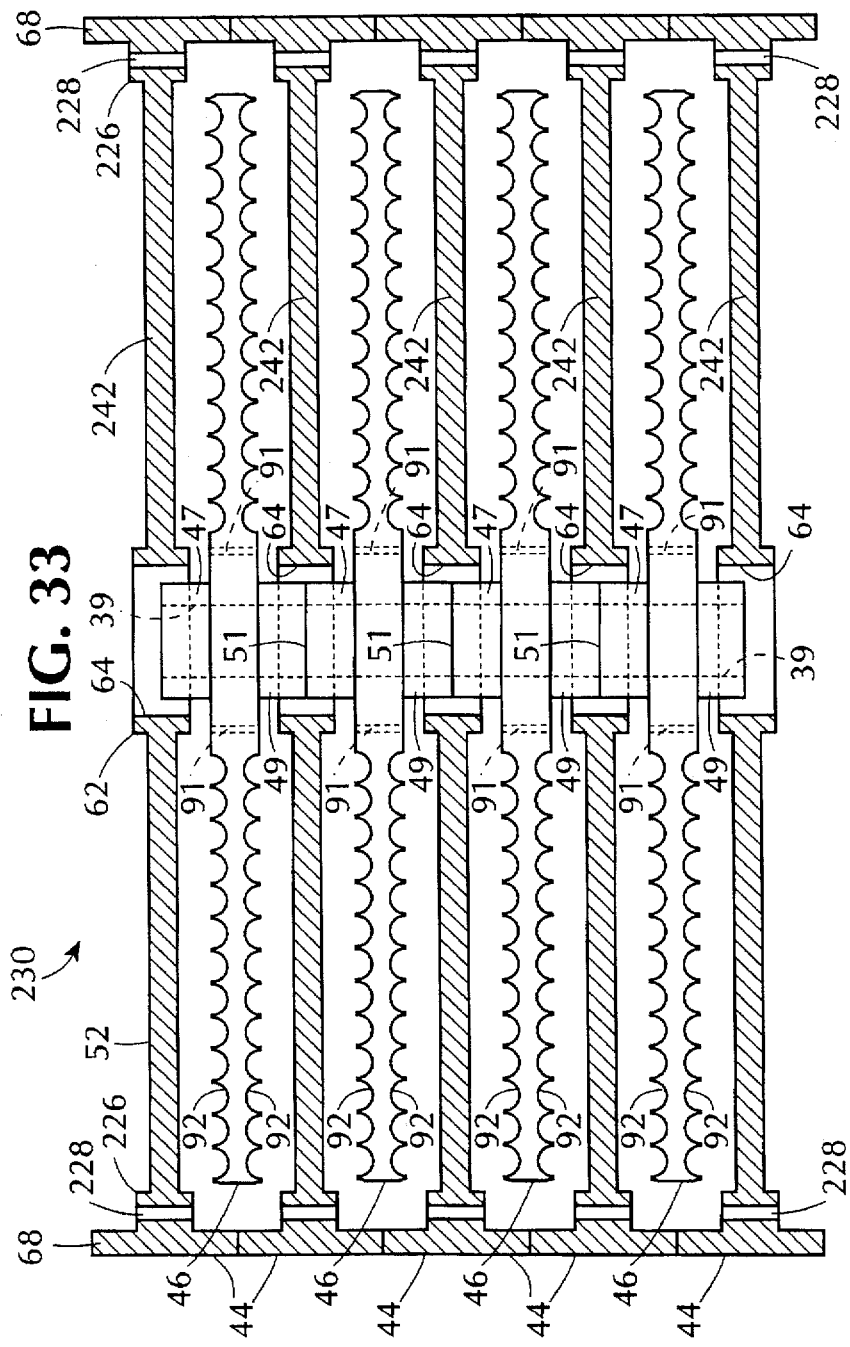
FIG. 32 is an elevational view, partially in cross-section, of a preferred disc.
FIG. 33 is an elevational view of five D-shaped filter members mechanically connected together to form a D-shaped filter member cartridge, with four discs of FIG. 32 assembled in interleaved fashion with the five filter members of the cartridge to form a passageway for the rotatable shaft that will rotate the discs.

FIG. 32 is an elevational view, partially in cross-section, of a preferred disc having through holes 91 and grooves 92. Circular upper hub 47 and circular lower hub 49 are affixed to planar disc 46 (e.g., by being attached to the planar portion of the disc 46 after the three parts have been made or by being formed integrally with the planar portion of the disc). Circular centered cut-outs through hub 47, disc 46, and hub 49 together define passageway 39 for the rotating shaft.

FIG. 33 shows assemblage (cartridge) 230 of five D-shaped filter members of FIG. 30 that has been moved as a unit into position with four discs of FIG. 32 (shaft 38 and the rest of the device are not shown). Each D-shaped member has straight side 242. Each disc has centrally located circular upper hub 47 and lower hub 49, and the lower hub of the topmost disc lies proximate the upper hub of the disc that is just below it, the two hubs meeting at the circular area of contact indicated by topmost reference numeral 51. Similar circular areas of contact between the hubs of adjacent discs are indicated by the other two reference numerals 51. The rotatable shaft will be located in passageway 39 defined by the circular holes through the four discs and their integral hubs. Thus, retentate can leave most of the fluid filtration gaps by passing through retentate risers 228 or through the annular region between the sleeve (not shown) and the hubs through which the shaft (not shown) passes.

Figure 34:
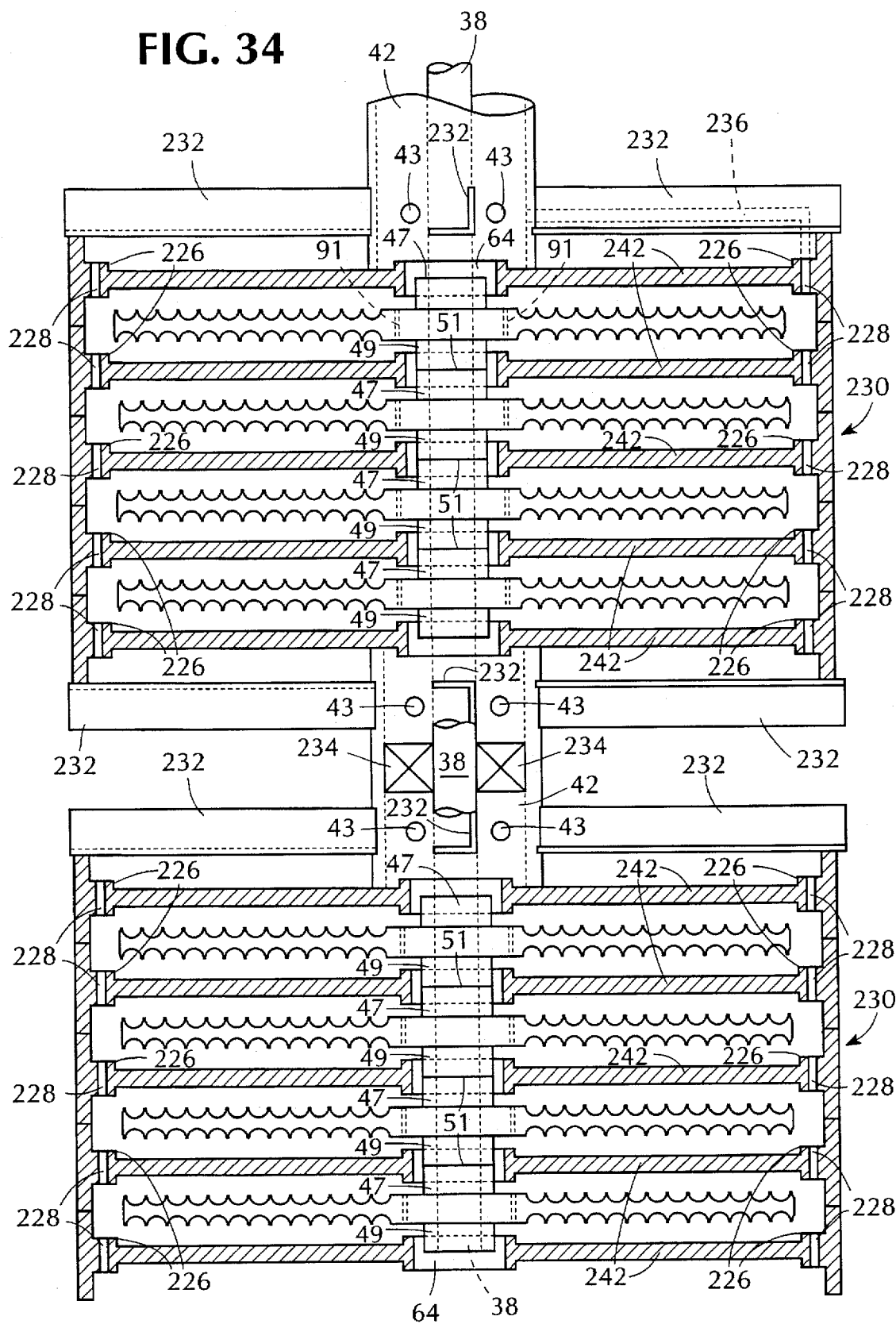
FIG. 34 is an elevational view of two of the filter member/disc assemblages of FIG. 33 connected to an upper sleeve for suspension from a first member and connected to each other by a second sleeve and in which the discs are mounted on the rotatable shaft for rotation.

FIG. 34 shows two of the filter member cartridges of FIG. 33 mounted in a device. The two cartridges are mechanically and fluidly connected to each other by a centrally located sleeve 42 and two sets of angle irons 232. The sleeve is attached towards its top and around its periphery to four pieces of angle iron 232, only three of which are shown. That sleeve is also attached towards its bottom to four pieces of angle iron 232, only three of which are shown. The four angle irons near the top of the centrally located sleeve 42 are attached to the bottom of the upper filter member cartridge 230. The four angle irons near the bottom of the centrally located sleeve 42 are attached to the top of the lower filter member cartridge 230. In this and similar embodiments, the angle irons (or other suitable support structures) replace the integral ribs in the filter members shown in FIGS. 1–4.

The upper filter member cartridge 230 is attached at its top to four angle irons 232 (only three of which are shown), which in turn are attached to upper sleeve 42. That sleeve is attached towards its top to a first member (not shown), from which it is suspended. Thus, the attachment of the first member to upper sleeve 42 mechanically connects the first member to both filter member cartridges 230 and all filter members are therefore suspended from the first member. If a third filter member cartridge were to be used, it would be suspended by two additional sets of angle irons attached to another sleeve projecting downward from the bottom of the lower filter member cartridge shown in FIG. 34. The annular region with the upper sleeve is fluidly connected to the fluid filtration gaps via holes 91 in the discs and retentate risers 228.

Holes or ports 43 in both of sleeves 42 allow fluid to flow into and/or out the annular region within each sleeve. Retentate risers 228 in each of the filter members and holes 91 in the discs allow retentate to flow from one fluid filtration gap to another within the same filter member cartridge 230.

In the upper filter member cartridge 230, the topmost riser 228 at the right of the drawing is shown in phantom line as it can be fluidly connected via pipe 236 to one of the ports in upper sleeve 42. Fluid cannot leave the uppermost fluid filtration gap by flowing upward unless it flows up out of the topmost risers 228 or unless it flows up through the annular space defined by opening 64 and upper hub 47 on the topmost disc. Pipes similar to pipe 236 running from the topmost or bottommost risers 228 in each cartridge to one of the ports 43 may be added so that all or some portion of the retentate leaving each cartridge is recycled to the annular region within one or the other sleeve. Because the sleeves are fluidly connected to the fluid filtration gaps, recycling retentate to the annular regions within the sleeves constitutes recycling retentate to the fluid filtration gaps.

Not all of the ports 43 in each sleeve will necessarily be connected to a riser 228 to allow retentate recycle. Thus, fluid may flow into or out of an unpiped port (i.e., a port in a sleeve where the port is not fluidly connected to a retentate riser), depending on the relative pressure on the two sides of the sleeve around the port. If the assemblage of FIG. 34 is immersed in the body of fluid to be filtered, fluid may flow into or out of the body of fluid from or to the annular region through one or more of the unpiped ports.

Shaft 3B passes through passageway 39 (see FIGS. 32 and 33) defined by the circular openings in all of the discs and their associated upper and lower hubs 47 and 49. Shaft 38 is rotatably suspended by rotatable suspension (not shown) that is connected to (or that is part of) the first member (not shown). Shaft 38 passes through upper sleeve 42 (thereby defining an annular region within the upper sleeve), through the passageway formed by the discs and disc hubs in the upper cartridge 230, through rotary bearing 234 in lower sleeve 42 (thereby defining an annular region within the lower sleeve), and then through the passageway formed by the discs and disc hubs in the lower cartridge 230.

The discs with their upper and lower hubs are attached to the shaft by any suitable means so that they do not move up and down on the shaft. Because the shaft and upper sleeve are both suspended from the first member, because all the filter members are attached directly or indirectly to the upper sleeve, and because all of the discs are attached to the shaft, all of the discs and filter members are suspended from the first member.

The D-shaped filter members within each cartridge 230 in FIG. 34 are mechanically connected by bolts (not shown) passing through bolt holes 74 (not shown; see, e.g., FIG. 28, which shows the same kind of bolt holes). That allows each filter member cartridge to be moved as a unit into position with respect to the discs helping to define the fluid filtration gaps within each cartridge 230.

If the assemblage of FIG. 34 is placed at least partially within the body of feed fluid, fresh feed fluid (i.e., fluid not recycled via piping 236) can flow through opening 64 in the bottommost filter member to the lowest fluid filtration gap and from there to the fluid filtration gaps above it (via holes 91 in the discs, the area beyond the peripheries of each disc, and retentate risers 228).

Figure 31:
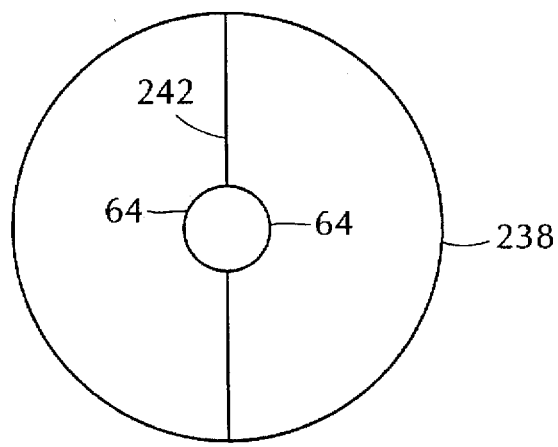
FIG. 31 is a schematic plan view of two preferred D-shaped filter members assembled together to form a generally circular assemblage.

After the two D-shaped cartridges 230 have been attached in the manner shown, two additional D-shaped cartridges may each be moved as a unit into position so that the straight sides of the adjacent filter members are proximate each other (as shown schematically in FIG. 31). Thus, assembly and disassembly of the disc/filter member assemblage is greatly simplified because all ten of the filter members may be moved into or out of position with respect to the discs by moving four D-shaped cartridges 230 and without removing any discs from the shaft.

Fluid management of the feed into the vessel and of permeate from the vessel can be controlled with three positive displacement pumps. Desirably, each of the three pumps can be driven by a single drive mechanism. A three-head peristaltic pump can be arranged in that way, with the pumping rate of each pump head controlled by the size of the tubing and the rotation rate of the tube rollers. If the same size tubes are used in each of the heads, the liquid level in the vessel will remain stationary as the permeate flow rate from the filters is equalled by the feed flow rate into the vessel.

Desirably, an outlet tube for overflow is used and the inlet tube for the feed and the outlet tube for the overflow line are shielded by a draft tube. This allows the feed to be delivered near the bottom of the vessel, thus minimizing the time required for any influent (entering) solids to settle to the bottom. This arrangement also ensures that if an overflow situation occurs, any less dense liquid accumulating at the top of the body of feed fluid in the vessel will not be sucked up through the overflow tube into, e.g., a parts washer that is removing an oily residue from parts using aqueous solvent cleaning.

Figure 35:
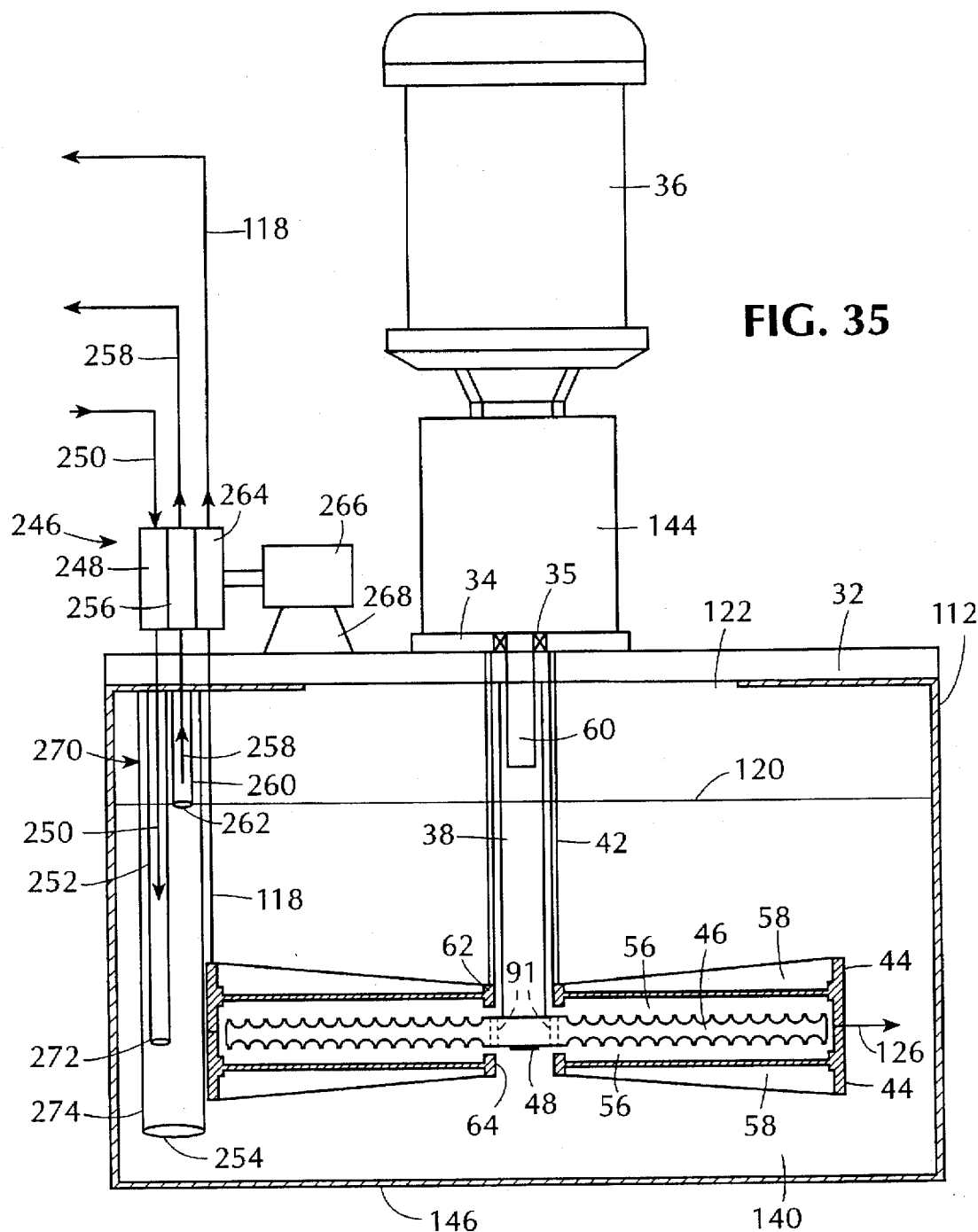
FIG. 35 is a schematic elevational view of a preferred rotary disc filtration device of this invention including a three-head peristaltic pump and draft tube system for controlling the liquid level of the body of fluid in the vessel to be filtered.

In FIG. 35, body of feed fluid 140 with uppermost liquid level 120 just below gaseous (air) head space 122 is located in vessel 112 having bottom 146, first plate 32, and second plate 34. Drive column 60, which is part of rotatable shaft 38, is rotatably suspended in and by rotatable suspension 3S, which for convenience is shown mounted in second plate 34. Motor 36 rotates shaft 38 through gear box thereby rotating disc 46. Disc 46 and the two filter members which have stiffening ribs 58, define two fluid filtration gaps 56. Fluid is free to move between the two fluid filtration gaps by passing around the outer periphery of disc 46 or by passing through holes 91 located near the center of the disc.

Top filter member 44 is connected at its inner rim 62 to sleeve 42 and lower filter member 44 is connected by any suitable means near its outer periphery to the upper filter member (e.g., by bolts passing through bolt holes 74 (not shown—see FIG. 11)). Plates 32 and 34 comprise at least part of the first member (motor 36 and gear box 144 may also be considered to be part of the first member). Shaft 38 is rotatably suspended from the first member and sleeve 42 is connected near its upper end to the first member. Accordingly, disc 46 is rotatably suspended from the first member and filter members 44 are non-rotatably suspended from the first member.

Retentate flow arrow 126 indicates the effluent flow of retentate out of the fluid gaps. That retentate may pass directly into body 140 of fluid to be filtered (through the circular "wall" formed by the restriction means of the two filter members). Alternatively, some of all of the retentate may be recycled to the fluid filtration gaps, for example, by being fed into the annular space between shaft 38 and sleeve 42 (recycle piping not shown—see retentate recycle piping 236 in FIG. 34).

Liquid level control means 270 constitutes means for maintaining liquid level 120 at the predetermined level shown in FIG. 35. Level control means 270 comprises peristaltic pump 246 and draft tube 274 having within it feed fluid tube 252 and overflow fluid withdrawal tube 260. The three heads (indicated by reference numerals 248, 256, and 264) of peristaltic pump 246 are driven by motor 266, which is attached to first plate 32 through mounting 268. The three head are adjusted to move essentially the same volumetric amount of liquid.

Feed fluid (indicated by arrow 250) is pumped by first head 248 of peristaltic pump 246 into body of feed fluid 140 through feed fluid tube 252 having lower end 272. Because feed tube 252 is within draft tube 274, whose lower end 254 is located near bottom 146 of vessel 112, any solids in the feed fluid can settle more quickly (e.g., because they are shielded by feed tube 252 and draft tube 274 from crosscurrents within the vessel during much of their journey towards the bottom of the vessel) and any turbulence caused by the introduction of the feed fluid is kept closer to the bottom of the vessel and away from the top of the vessel (where flotation of less dense materials may be occurring).

Overflow tube 260 has lower open end 262, which is set at the predetermined desired level of liquid in the vessel. If any liquid rises as high as opening 262, that liquid (overflow liquid, whose flow is indicated by arrow 258) is sucked through tube 260 by second head 256 of peristaltic pump 246 until the level is restored to the predetermined level (liquid level 120). Feed liquid flowing downward in feed tube 252 tends to prevent any less dense liquid from entering and accumulating within tubes 252 or 274. Accordingly, overflow liquid 258 withdrawn through tube 260 tends not to contain any less dense liquid that may be accumulating at the top of body 140 of liquid.

Permeate leaving the assemblage of the disc and filter members is indicated by reference numeral 118. That permeate is drawn upward by third head 264 of peristaltic pump 246. First head 248 and third head 264 may be adjusted so that their volumetric flow rates (feed 250 and permeate 118) are essentially the same (e.g., within just 1% or 2% of each other). In that case, the liquid level in the vessel will remain essentially constant at whatever level the liquid level exists at the time the feed (influent) and permeate (effluent) flows are made essentially the same. If for some reason the feed flow becomes greater than the permeate flow, the liquid level will rise. For example, a blockage may develop in the permeate removal system (e.g., filters may become sufficiently fouled to significantly reduce the permeate flux through them). At some point the rising liquid will reach lower open end 262 of overflow withdrawal tube 260 and the surplus liquid will be drawn out of the vessel to restore liquid level 120 to the level of lower open end 262. As long as the condition of feed flow being significantly greater than permeate flow persists, overflow liquid will be drawn up overflow tube 260.

In addition to the foregoing advantages for the fluid management scheme shown in FIG. 35, the system is simpler and less costly because complicated and costly electrical level controllers and sensors are not needed to operate the system on a continuous basis. Level sensors and controller are known to fail and are thus unreliable in aggressive water treatment environments.

A further advantage of multiple or stackable pumps for fluid management is that a fourth pump may be used to continuously skim any less dense liquid, e.g., oil, from the top of the liquid level in the vessel. As such less dense liquid accumulates in the vessel, the height of the liquid outside of the draft tube will rise a level slightly higher than the level within the draft tube. Therefore, the inlet to the skim pump would be located outside of the draft tube and placed at a level slightly higher than the overflow control height (i.e., bottom 262 of overflow tube 260). As such less dense liquid rose to that level, it would be removed from the vessel automatically. Alternatively, an automatic skimmer could be used to remove the upper less dense layer in the vessel.

The many advantages of this invention should be apparent to those skilled in the art. For example, as compared to existing devices the rotary disc filtration device of this invention is relatively simpler and less expensive to manufacture (e.g., because of simpler design and fewer parts requiring manufacture to high tolerances); is relatively simpler and less expensive to maintain (e.g., because of simpler design); is relatively simpler to assemble and disassemble (e.g., for initial production and maintenance); need not use mechanical seals or can use low-cost seals (because the seal if present need not be wetted by process fluid), because the liquid level can be set below the place the seal is or would otherwise be, in which case the rotary shaft on which the discs are mounted may be carried in a simple rotary bearing and fluid (e.g., permeate) need not be removed through the shaft; is multi-functional, allowing filtration with concomitant flotation and/or settling (which is useful if the feed fluid contains solids, such as metal particles, and/or oil, e.g., in a system for cleaning machined parts where the cleaner is to be separated from the dirt and grease and recycled); does not need additional equipment to pump feed fluid into the disc/filter member assemblage or into the fluid filtration gaps; provides a simpler, less costly, and more reliable system for fluid management; and can have some or all of these features and can be used for in situ processing (e.g., for sampling or producing a stream for testing). If a vessel to hold the fluid to be filtered is part of the device, the vessel may be a relatively simple non-pressure (i.e., atmospheric) vessel.

Variations and modifications will be apparent to those skilled in the art and the following claims are intended to cover all variations and modifications falling within the true spirit and scope of the invention.

We claim:

1. A rotary disc filtration device for filtering fluid from a body of fluid having an uppermost fluid level into permeate and retentate, the device comprising:

(a) a first member;

(b) one or more discs, each disc being suspended from the first member;

(c) one or more filter members, at least one filter member having a filter, each filter being oppositely disposed to a disc to define a fluid filtration gap therebetween in which gap the fluid to be filtered is placed during filtration, there being one or more fluid filtration gaps, fluid passing through each filter from a fluid filtration gap being the permeate and fluid not passing from a fluid filtration gap through a filter being the retentate, each filter member being suspended from the first member;

(d) rotating means for rotating at least one of each disc and filter defining a fluid filtration gap with respect to each other; and (e) rotatable suspension means for suspending from the first member the one or more discs or filter members so that at least one of each disc and filter defining a fluid filtration gap can rotate with respect to each other, the rotatable suspension means being above the uppermost fluid level of the body of fluid to be filtered.

2. The device of claim 1 wherein the device has a top and the first member comprises the top of the device.

3. The device of claim 1 wherein the first member is a removable member.

4. The device of claim 1 further comprising means for placing fluid from the body of fluid into one or more fluid filtration gaps, said means comprising (i) an opening in at least one filter member for the inflow of fluid from the body of fluid, (ii) means for fluidly connecting the opening in the at least one filter member with at least one fluid filtration gap, and (iii) means to position the first member proximate the body of fluid so that fluid to be filtered can flow from the body of fluid through the opening in the at least one filter member to the at least one fluid filtration gap.

5. The device of claim 1 further comprising means for placing fluid from the body of fluid into one or more fluid filtration gaps, said means comprising means to place at least one of the one or more fluid filtration gaps within the body of fluid.

6. The device of claim 1 comprising two or more filter members and one or more discs arranged to form a plurality of fluid filtration gaps.

7. The device of claim 6 wherein a first filter member of the one or more filter members is suspended directly from the first member and the other filter members of the one or more filter members are suspended indirectly from the first member by being suspended from the first filter member.

8. The device of claim 1 further comprising means to remove permeate from the device during filtration.

9. The device of claim 1 wherein the rotating means rotates the discs and the rotating means comprises a shaft having a longitudinal axis on which shaft the one or more discs are mounted.

10. The device of claim 9 wherein the one or more filter members are substantially centered with respect to the longitudinal axis of the shaft.

11. The device of claim 9 further comprising a sleeve around the shaft to which sleeve the one or more filter members are connected, thereby defining an annular space between the shaft and the sleeve.

12. The device of claim 11 wherein the sleeve comprises first means for allowing fluid to flow to at least one fluid filtration gap for filtration.

13. The device of claim 12 wherein the annular space is in fluid communication with at least one fluid filtration gap and the first means comprises at least one hole in the sleeve for allowing fluid that is to be filtered to flow into the annular space and from there into at least one fluid filtration gap.

14. The device of claim 1 further comprising restriction means for restricting the flow of retentate out of at least one of the one or more fluid filtration gaps.

15. The device of claim 14 comprising two or more filter members and one or more discs, wherein a first filter member of the one or more filter members is suspended directly from the first member and the other filter members of the one or more filter members are suspended indirectly from the first member by being suspended from the first filter member.

16. The device of claim 15 further comprising filter member securing means for releasably securing the filter members to one another.

17. The device of claim 15 wherein at least one of the one or more filter members has restriction means for restricting the flow of retentate out of at least one of the one or more fluid filtration gaps and that restriction means is proximate the adjacent filter member.

18. The device of claim 17 wherein two adjacent filter members have restriction means for restricting the flow of retentate out of at least one of the one or more fluid filtration gaps and the restriction means of one of the filter members is proximate the restriction means of the adjacent filter member.

19. The device of claim 17 further comprising retentate sealing means to substantially fluidly seal the restriction means of one of the filter members to the adjacent filter member so as to substantially restrict the flow of retentate out of at least one of the one or more fluid filtration gaps.

20. The device of claim 14 further comprising retentate flow directing means for directing the flow of retentate leaving at least one of the one or more fluid filtration gaps.

21. The device of claim 20 wherein at least some of those retentate flow directing means are oriented to direct the retentate against the direction of rotation of the one or more discs or filters.

22. The device of claim 20 wherein the retentate flow directing means directs the flow of retentate back to at least one fluid filtration gap.

23. The device of claim 1 further comprising means for permitting the settling and withdrawal from the device of materials carried in the fluid to be filtered that are denser than the average density of the fluid to be filtered.

24. The device of claim 1 further comprising means for permitting the flotation and withdrawal from the device of materials carried in the fluid to be filtered that are less dense than the average density of the fluid to be filtered.

25. The device of claim 1 comprising at least two filter members wherein those filter members are mechanically connected so that they can be moved as a unit into position with respect to the one or more discs to define fluid filtration gaps.

26. The device of claim 1 wherein the one or more filter members are generally D-shaped.

27. The device of claim 1 wherein the one or more filter members are generally circular and have a radial cut-out.

28. The device of claim 1 further comprising level control means for maintaining at a predetermined level the uppermost fluid level of the body of fluid.

29. The device of claim 28 further comprising level control means for maintaining at a predetermined level the uppermost fluid level of the body of fluid.

30. The device of claim 29 wherein the level control means comprises feed fluid means for feeding fluid to the body of fluid at a predetermined rate and permeate withdrawal means for withdrawing permeate at essentially the same rate.

31. The device of claim 30 wherein the level control means further comprises overflow fluid withdrawal means for withdrawing fluid from the body of fluid if the uppermost level of the body of fluid rises above the predetermined level.

32. The device of claim 31 wherein the feed fluid means, permeate withdrawal means, and overflow fluid withdrawal means further comprise three heads of a pump that are operated in parallel.

33. The device of claim 31 wherein the overflow fluid withdrawal means comprises an overflow fluid withdrawal tube whose lower end is at the predetermined level.

34. The device of claim 33 wherein the feed fluid means comprises a feed fluid tube that delivers feed fluid into the body of fluid at a level below the predetermined level.

35. The device of claim 34 wherein the overflow fluid withdrawal tube is located within the feed fluid tube.

36. The device of claim 28 wherein the level control means comprises feed fluid means for feeding fluid to the body of fluid at a predetermined rate and permeate withdrawal means for withdrawing permeate at essentially the same rate.

37. The device of claim 36 wherein the level control means further comprises overflow fluid withdrawal means for withdrawing fluid from the body of fluid if the uppermost level of the body of fluid rises above the predetermined level.

38. The device of claim 37 wherein the overflow fluid withdrawal means comprises an overflow fluid withdrawal tube whose lower end is at the predetermined level.

39. The device of claim 38 wherein the feed fluid means comprises a feed fluid tube that delivers feed fluid into the body of fluid at a level below the predetermined level.

40. The device of claim 39 wherein the overflow fluid withdrawal tube is located within the feed fluid tube.

41. The device of claim 37 wherein the feed fluid means, permeate withdrawal means, and overflow fluid withdrawal means further comprise three heads of a pump that are operated in parallel.

42. A rotary disc filtration device for filtering fluid from a body of fluid having an uppermost fluid level into permeate and retentate, the device comprising:

(a) a first member;

(b) one or more discs, each disc being suspended from the first member;

(c) one or more filter members, at least one filter member having a filter, each filter being oppositely disposed to a disc to define a fluid filtration gap therebetween in which gap the fluid to be filtered is placed during filtration, there being one or more fluid filtration gaps, fluid passing through each filter from a fluid filtration gap being the permeate and fluid not passing from a fluid filtration gap through a filter being the retentate, the filter member defining at least one fluid filtration gap having restriction means for restricting the flow of retentate out of at least one fluid filtration gap into the body of fluid;

(d) rotating means for rotating at least one of each disc and filter defining a fluid filtration gap with respect to each other; and (e) rotatable suspension means for suspending from the first member the one or more discs or filter members so that at least one of each disc and filter defining a fluid filtration gap can rotate with respect to each other.

43. The device of claim 42 wherein the device has a top and the first member comprises the top of the device.

44. The device of claim 42 wherein the first member is a removable member.

45. The device of claim 42 further comprising feed fluid means for placing fluid from the body of fluid into one or more fluid filtration gaps, the feed fluid means comprising (i) an opening in at least one filter member for the inflow of fluid from the body of fluid, (ii) means for fluidly connecting the opening in the at least one filter member with at least one fluid filtration gap, and (iii) means to position the at least one filter member proximate the body of fluid so that fluid to be filtered can flow from the body of fluid through the opening in the at least one filter member to the at least one fluid filtration gap.

46. The device of claim 42 further comprising means for placing fluid from the body of fluid into one or more fluid filtration gaps, said means comprising means to place at least one of the one or more fluid filtration gaps within the body of fluid.

47. The device of claim 42 comprising two or more filter members and one or more discs arranged to form a plurality of fluid filtration gaps.

48. The device of claim 47 wherein a first filter member of the one or more filter members is suspended directly from the first member and the other filter members of the one or more filter members are suspended indirectly from the first member by being suspended from the first filter member.

49. The device of claim 42 wherein the rotating means rotates the discs and the rotating means comprises a shaft having a longitudinal axis on which shaft the one or more discs are mounted, the rotatable suspension means being above the uppermost fluid level of the body of fluid to be filtered.

50. The device of claim 49 further comprising means for maintaining the one or more filter members substantially centered with respect to the longitudinal axis of the shaft.

51. The device of claim 49 further comprising a sleeve around the shaft to which sleeve the one or more filter members are connected, thereby defining an annular space between the shaft and the sleeve.

52. The device of claim 51 wherein the sleeve comprises first means for allowing fluid to flow into at least one fluid filtration gap for filtration.

53. The device of claim 52 wherein the annular space is in fluid communication with at least one fluid filtration gap and the first means comprises at least one hole in the sleeve for allowing fluid that is to be filtered to flow into the annular space and from there into at least one fluid filtration gap.

54. The device of claim 42 comprising two or more filter members and one or more discs, wherein a first filter member of the one or more filter members is suspended directly from the first member and the other filter members of the one or more filter members are suspended indirectly from the first member by being suspended from the first filter member.

55. The device of claim 42 wherein the restriction means comprises a lip located near the periphery of the filter member having the restriction means.

56. The device of claim 42 further comprising retentate flow directing means for directing the flow of retentate leaving at least one of the one or more fluid filtration gaps.

57. The device of claim 56 wherein at least some of those retentate flow directing means are oriented to direct the retentate against the direction of rotation of the one or more discs or filters.

58. The device of claim 56 wherein the restriction means for restricting the flow of retentate out of at least one of the one or more fluid filtration gaps carry the retentate flow directing means.

59. The device of claim 56 wherein the retentate flow directing means direct the flow of retentate back to at least one fluid filtration gap.

60. The device of claim 42 further comprising means for permitting the settling and withdrawal from the device of materials carried in the fluid to be filtered that are denser than the average density of the fluid to be filtered.

61. The device of claim 42 further comprising means for permitting the flotation and withdrawal from the device of materials carried in the fluid to be filtered that are less dense than the average density of the fluid to be filtered.

62. The device of claim 42 comprising at least two filter members wherein those filter members are mechanically connected so that they can be moved as a unit into position with respect to the one or more discs to define the fluid filtration gaps.

63. The device of claim 42 wherein the one or more filter members are generally D-shaped.

64. The device of claim 42 wherein the one or more filter members are generally circular and have a radial cut-out.

65. A rotary disc filtration device for filtering fluid from a body of fluid having an uppermost fluid level into permeate and retentate, the device comprising:

(a) a first member;

(b) one or more discs, each disc being suspended from the first member;

(c) one or more filter members, at least one filter member having a filter, each filter being oppositely disposed to a disc to define a fluid filtration gap therebetween in which gap the fluid to be filtered is placed during filtration, there being one or more fluid filtration gaps, fluid passing through each filter from a fluid filtration gap being the permeate and fluid not passing from a fluid filtration gap through a filter being the retentate;

(d) rotating means for rotating at least one of each disc and filter defining a fluid filtration gap with respect to each other;

(e) rotatable suspension means for suspending from the first member the one or more discs or filter members so that at least one of each disc and filter defining a fluid filtration gap can rotate with respect to each other;

(f) means for locating at least one of the one or more fluid filtration gaps within the body of fluid, the filter member defining that fluid filtration gap having restriction means for restricting the flow of retentate out of that fluid filtration gap into the body of fluid; and (g) feed fluid means for placing fluid from the body of fluid into one or more fluid filtration gaps, the feed fluid means comprising (i) an opening in at least one filter member for the inflow of fluid from the body of fluid, (ii) means for fluidly connecting the opening in the at least one filter member with at least one fluid filtration gap, and (iii) means to position the at least one filter member in the body of fluid so that fluid to be filtered can flow from the body of fluid through the opening in the at least one filter member to the at least one fluid filtration gap.

66. The device of claim 65 wherein the device has a top and the first member comprises the top of the device.

67. The device of claim 65 wherein the first member is a removable member.

68. The device of claim 65 comprising two or more filter members and one or more discs arranged to form a plurality of fluid filtration gaps wherein a first filter member of the two or more filter members is suspended directly from the first member and the other filter members of the two or more filter members are suspended indirectly from the first member by being suspended from the first filter member.

69. The device of claim 65 further comprising retentate flow direction means for directing the flow of retentate leaving at least one of the fluid filtration gaps.

70. The device of claim 69 wherein the retentate flow directing means directs the flow of retentate back to at least one fluid filtration gap.

71. The device of claim 65 wherein the rotating means rotates the discs and the rotating means comprises a shaft having a longitudinal axis on which shaft the one or more discs are mounted, the rotatable suspension means being above the uppermost fluid level of the body of fluid to be filtered.

72. The device of claim 65 further comprising a sleeve around the shaft to which sleeve the one or more filter members are connected, thereby defining an annular region between the shaft and the sleeve.

73. The device of claim 72 wherein the annular region is fluidly connected to at least one fluid filtration gap.

74. The device of claim 73 further comprising retentate flow directing means for directing the flow of retentate leaving at least one of the one or more fluid filtration gaps to the annular region so that at least some of the retentate is recycled to the fluid filtration gap.

75. The device of claim 65 wherein the one or more filter members are non-rotatably mounted in the device.

76. The device of claim 65 further comprising means for permitting the settling and withdrawal from the device of materials carried in the fluid to be filtered that are denser than the average density of the fluid to be filtered.

77. The device of claim 65 further comprising means for permitting the flotation and withdrawal from the device of materials carried in the fluid to be filtered that are less dense than the average density of the fluid to be filtered.

78. The device of claim 65 comprising at least two filter members wherein those filter members are mechanically connected so that they can be moved as a unit into position with respect to the one or more discs to define fluid filtration gaps.

79. The device of claim 65 wherein the one or more filter members are generally D-shaped.

80. The device of claim 65 wherein the one or more filter members are generally circular and have a radial cut-out.

81. The device of claim 65 further comprising level control means for maintaining at a predetermined level the uppermost fluid level of the body of fluid.

82. The device of claim 81 wherein the level control means comprises feed fluid means for feeding fluid to the body of fluid at a predetermined rate and permeate withdrawal means for withdrawing permeate at essentially the same rate.

83. The device of claim 82 wherein the level control means further comprises overflow fluid withdrawal means for withdrawing fluid from the body of fluid if the uppermost level of the body of fluid rises above the predetermined level.

84. The device of claim 83 wherein the feed fluid means, permeate withdrawal means, and overflow fluid withdrawal means further comprise three heads of a pump that are operated in parallel.

85. The device of claim 83 wherein the overflow fluid withdrawal means comprises an overflow fluid withdrawal tube whose lower end is at the predetermined level.

86. The device of claim 85 wherein the feed fluid means comprises a feed fluid tube that delivers feed fluid into the body of fluid at a level below the predetermined level.

87. The device of claim 86 wherein the overflow fluid withdrawal tube is located within the feed fluid tube.

88. A rotary disc filtration device for filtering fluid from a body of fluid having an uppermost fluid level into permeate and retentate, the device comprising:

(a) a removable first member;

(b) one or more discs, each disc being rotatably suspended from the removable first member by rotatable suspension means, the rotatable suspension means being above the uppermost fluid level of the body of fluid to be filtered;

(c) one or more filter members, at least one filter member having a filter, each filter being oppositely disposed to a disc to define a fluid filtration gap therebetween in which gap the fluid to be filtered is placed during filtration, there being one or more fluid filtration gaps, fluid passing through each filter from a fluid filtration gap being the permeate and fluid not passing from a fluid filtration gap through a filter being the retentate, each filter member being non-rotatably suspended from the removable first member;

(d) rotating means for rotating at least one disc defining a fluid filtration gap, the rotating means comprising a shaft having a longitudinal axis on which shaft the one or more discs are mounted;

(e) means for locating at least one of the one or more fluid filtration gaps within the body of fluid, the filter member defining that fluid filtration gap having near its periphery restriction means for restricting the flow of retentate out of that fluid filtration gap into the body of fluid;

(f) feed fluid means for placing fluid from the body of fluid into one or more fluid filtration gaps, the feed fluid means comprising (i) an opening in at least one filter member for the inflow of fluid from the body of fluid, (ii) means for fluidly connecting the opening in the at least one filter member with at least one fluid filtration gap, and (iii) means to position the at least one filter member in the body of fluid so that fluid to be filtered can flow from the body of fluid through the opening in the at least one filter member to the at least one fluid filtration gap; and (g) means for maintaining the one or more filter members substantially centered with respect to the longitudinal axis of the shaft.

89. The device of claim 88 further comprising retentate flow direction means for directing the flow of retentate leaving at least one of the fluid filtration gaps.

90. The device of claim 89 wherein the retentate flow directing means directs the flow of retentate back to at least one fluid filtration gap.

91. The device of claim 88 further comprising a sleeve around the shaft to which sleeve the one or more filter members are connected, thereby defining an annular region between the shaft and the sleeve.

92. The device of claim 91 wherein the annular region is fluidly connected to at least one fluid filtration gap.

93. The device of claim 92 further comprising retentate flow directing means for directing the flow of retentate leaving at least one of the one or more fluid filtration gaps to the annular region so that at least some of the retentate is recycled to at least one of the fluid filtration gaps.

94. The device of claim 88 comprising two or more filter members and one or more discs arranged to form a plurality of fluid filtration gaps wherein a first filter member of the two or more filter members is suspended directly from the removable first member and the other filter members of the two or more filter members are suspended indirectly from the removable first member by being suspended from the first filter member.

95. The device of claim 88 further comprising means for permitting the settling and withdrawal from the device of materials carried in the fluid to be filtered that are denser than the average density of the fluid to be filtered.

96. The device of claim 88 further comprising means for permitting the flotation and withdrawal from the device of materials carried in the fluid to be filtered that are less dense than the average density of the fluid to be filtered.

97. The device of claim 88 comprising at least two filter members wherein those filter members are mechanically connected so that they can be moved as a unit into position with respect to the one or more discs to define the fluid filtration gaps.

98. The device of claim 88 wherein the one or more filter members are generally D-shaped.

99. The device of claim 88 wherein the one or more filter members are generally circular and have a radial cut-out.

100. The device of claim 88 further comprising means for removing permeate during filtration.

101. The device of claim 88 further comprising level control means for maintaining at a predetermined level the uppermost fluid level of the body of fluid.

102. The device of claim 101 wherein the level control means comprises feed fluid means for feeding fluid to the body of fluid at a predetermined rate and permeate withdrawal means for withdrawing permeate at essentially the same rate.

103. The device of claim 102 wherein the level control means further comprises overflow fluid withdrawal means for withdrawing fluid from the body of fluid if the uppermost level of the body of fluid rises above the predetermined level.

104. The device of claim 102 wherein the feed fluid means, permeate withdrawal means, and overflow fluid withdrawal means further comprise three heads of a pump that are operated in parallel.

105. The device of claim 102 wherein the overflow fluid withdrawal means comprises an overflow fluid withdrawal tube whose lower end is at the predetermined level.

106. The device of claim 105 wherein the feed fluid means comprises a feed fluid tube that delivers feed fluid into the body of fluid at a level below the predetermined level.

107. The device of claim 106 wherein the overflow fluid withdrawal tube is located within the feed fluid tube.

108. The device of claim 1, 42, 65, or 88 further comprising means for increasing the pressure in the one or more fluid filtration gaps during rotation of the one or more discs or filter members so that the pressure in the one or more fluid filtration gaps during such rotation is at least 3 psi higher than when there is no such rotation.

* * * * *

UNITED STATES PATENT AND TRADEMARK OFFICE
CERTIFICATE OF CORRECTION

PATENT NO. : 5,707,517
DATED : Jan. 13, 1998
INVENTOR(S): Philip M. Rolchigo et al.

It is certified that error appears in the above-identified patent and that said Letters Patent is hereby corrected as shown below:

Column 44, line 55; Claim 29, line 1: "claim 28" should read -- claim 42 --;

Column 50, line 41; Claim 104, line 1: "claim 102" should read -- claim 103 --;

Column 50, line 45; Claim 105, line 1: "claim 102" should read -- claim 103 --.

Signed and Sealed this

Seventh Day of April, 1998

*Attest:*

BRUCE LEHMAN

*Attesting Officer*     *Commissioner of Patents and Trademarks*